United States Patent
Suzuki et al.

(10) Patent No.: US 10,412,417 B2
(45) Date of Patent: Sep. 10, 2019

(54) IMAGE PROCESSING DEVICE AND METHOD CAPABLE OF PERFORMING AN ENCODING PROCESS OR A DECODING PROCESS ON AN IMAGE AT HIGH SPEED

(75) Inventors: Teruhiko Suzuki, Tokyo (JP); Masao Sasaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1027 days.

(21) Appl. No.: 14/126,560

(22) PCT Filed: Jun. 29, 2012

(86) PCT No.: PCT/JP2012/066647
§ 371 (c)(1),
(2), (4) Date: Dec. 16, 2013

(87) PCT Pub. No.: WO2013/005659
PCT Pub. Date: Jan. 10, 2013

(65) Prior Publication Data
US 2014/0226712 A1 Aug. 14, 2014

(30) Foreign Application Priority Data

Jul. 7, 2011 (JP) .................... 2011-151186
Aug. 22, 2011 (JP) .................... 2011-180415

(51) Int. Cl.
*H04N 19/13* (2014.01)
*H04N 19/70* (2014.01)
*H04N 19/91* (2014.01)

(52) U.S. Cl.
CPC ............. *H04N 19/70* (2014.11); *H04N 19/13* (2014.11); *H04N 19/91* (2014.11)

(58) Field of Classification Search
CPC ....... H04N 19/00533; H04N 19/00884; H04N 19/00951; H04N 19/70; H04N 19/00121; H04N 19/91; H04N 19/13; H04N 19/44
(Continued)

(56) References Cited

U.S. PATENT DOCUMENTS

2004/0141204 A1* 7/2004 Sakai .................. H04N 1/00352
358/1.16
2006/0228010 A1* 10/2006 Rubbert ................... A61C 7/00
382/128

(Continued)

FOREIGN PATENT DOCUMENTS

JP 2005-223533 8/2005
JP 2009-152990 7/2009

OTHER PUBLICATIONS

Jan. 28, 2016, Japanese Office Action for related JP Application No. 2013-522968.

(Continued)

*Primary Examiner* — Jayanti K Patel
*Assistant Examiner* — Shadan E Haghani
(74) *Attorney, Agent, or Firm* — Paratus Law Group, PLLC

(57) ABSTRACT

The present technique relates to an image processing device and method capable of performing an encoding process or a decoding process on an image at high speed. Similarly, arithmetic coding parameters arranged together in the syntax are subjected to a variable length (fixed length) decoding process together. Similarly, arithmetic coding parameters arranged together in the syntax are subjected to an arithmetic decoding process together. Accordingly, since the alternations of firmware and hardware are performed together, it is possible to improve the processing efficiency of decoding. As a result, it is possible to perform the process at high speed. The present disclosure can be applied to image processing devices, for example.

6 Claims, 33 Drawing Sheets

(58) Field of Classification Search
USPC .................................................. 375/240.02
See application file for complete search history.

(56) References Cited

U.S. PATENT DOCUMENTS

| | | | | |
|---|---|---|---|---|
| 2007/0009047 | A1* | 1/2007 | Shim .................... | H04N 19/70 |
| | | | | 375/240.26 |
| 2008/0240234 | A1* | 10/2008 | Hung .................... | H04N 19/61 |
| | | | | 375/240.02 |
| 2009/0002379 | A1* | 1/2009 | Baeza .................... | G06T 1/20 |
| | | | | 345/522 |
| 2009/0003446 | A1* | 1/2009 | Wu .................... | H04N 19/176 |
| | | | | 375/240.16 |
| 2009/0003447 | A1* | 1/2009 | Christoffersen ....... | H04N 19/61 |
| | | | | 375/240.16 |
| 2009/0251483 | A1* | 10/2009 | Hsu .................... | G09G 3/2055 |
| | | | | 345/589 |
| 2010/0272172 | A1* | 10/2010 | Chiba .................... | H03M 7/40 |
| | | | | 375/240.02 |
| 2011/0310958 | A1* | 12/2011 | Sachdeva .............. | H04N 19/91 |
| | | | | 375/240.02 |
| 2012/0320970 | A1* | 12/2012 | Drugeon .............. | H04N 19/563 |
| | | | | 375/240.02 |
| 2012/0320984 | A1* | 12/2012 | Zhou .................... | H04N 19/50 |
| | | | | 375/240.16 |
| 2013/0003823 | A1* | 1/2013 | Misra .................... | H04N 19/129 |
| | | | | 375/240.02 |
| 2013/0016786 | A1* | 1/2013 | Segall .................... | H04N 19/70 |
| | | | | 375/240.16 |
| 2013/0163677 | A1* | 6/2013 | Sze .................... | H04N 19/70 |
| | | | | 375/240.26 |

OTHER PUBLICATIONS

Advanced video coding for generic audiovisual services, ITU-T Telecommunication Standardization Sector of ITU Series H: Audiovisual and Multimedia Systems, Infrastructure of audiovisual services—Coding of moving video H.264.

Teruhiko Suzuki, Arithmetic coding in high level syntax, Joint Collaborative Team on Video-Coding (JCT-VC) of ITU-T SG16 WP3 and ISO/IEC JTC1/SC29/WG11, Jul. 14-22, 2011, pp. 1-11, 6$^{th}$ Meeting: Torino, IT.

Matthias Narroschke, et al., Restart of CABAC after coding of ALF and SAO slice header data, Joint Collaborative Team on Video-Coding (JCT-VC) of ITU-T SG16 WP3 and ISO/IEC JTC1/SC29/WG11, Jul. 14-22, 2011, pp. 1-6, 6$^{th}$ Meeting: Torino, IT.

Chih-Ming Fu, et al., CE8 Subtest3: Picture Quadtree Adaptive Offset, Joint Collaborative Team on Video-Coding (JCT-VC) of ITU-T SG16 WP3 and ISO/IEC JTC1/SC29/WG11, Jan. 20-28, 2011, pp. 1-10, 4$^{th}$ Meeting: Daegu, KR.

Thomas Wiegand, et al., WD3: Working Draft 3 of High-Efficiency Video Coding, Joint Collaborative Team on Video-Coding (JCT-VC) of ITU-T SG16 WP3 and ISO/IEC JTC1/SC29/WG11, Mar. 16-23, 2011, pp. 1-?, 5$^{th}$ Meeting: Geneva, CH.

Takeshi Chujoh, et al., Block-based Adaptive Loop Filter, ITU—Telecommunications Standardization Sector Video Coding Experts Group (VCEG), Jul. 16-18, 2008, pp. 1-6, 35$^{th}$ Meeting: Berlin, DE.

Jun. 14, 2016, Chinese Office Action for related CN Application No. 201280032052.6.

Jan. 12, 2017, CN communication issued for related CN application No. 201280032052.6.

* cited by examiner

FIG. 18

| 1 | slice_header( ) { | Descriptor |
|---|---|---|
| 2 | lightweight_slice_flag | u(1) |
| 3 | if( !lightweight_slice_flag ) { | |
| 4 | slice_type | ue(v) |
| 5 | pic_parameter_set_id | ue(v) |
| 6 | frame_num | u(v) |
| 7 | if( IdrPicFlag ) | |
| 8 | idr_pic_id | ue(v) |
| 9 | if( pic_order_cnt_type == 0 ) | |
| 10 | pic_order_cnt_lsb /* | u(v) |
| 11 | if( slice_type == P || slice_type == B ) { | |
| 12 | num_ref_idx_active_override_flag | u(1) |
| 13 | if( num_ref_idx_active_override_flag ) { | |
| 14 | num_ref_idx_l0_active_minus1 | ue(v) |
| 15 | if( slice_type == B ) | |
| 16 | num_ref_idx_l1_active_minus1 | ue(v) |
| 17 | } | |
| 18 | } | |
| 19 | ref_pic_list_modification( ) | |
| 20 | ref_pic_list_combination( ) | |
| 21 | if( nal_ref_idc != 0 ) | |
| 22 | dec_ref_pic_marking( ) | |
| 23 | } | |
| 24 | if( entropy_coding_mode_flag && slice_type != I) | |
| 25 | cabac_init_idc | ue(v) |
| 26 | first_slice_in_pic_flag | u(1) |
| 27 | if( first_slice_in_pic_flag == 0 ) | |
| 28 | slice_address | u(v) |
| 29 | if( !lightweight_slice_flag ) { | |
| 30 | slice_qp_delta | se(v) |
| 31 | if( sample_adaptive_offset_enabled_flag ) | |
| 32 | sao_param() | |
| 33 | if( deblocking_filter_control_present_flag ) { | |
| 34 | disable_deblocking_filter_idc | |
| 35 | if( disable_deblocking_filter_idc != 1 ) { | |
| 36 | slice_alpha_c0_offset_div2 | |
| 37 | slice_beta_offset_div2 | |
| 38 | } | |
| 39 | } | |
| 40 | if( slice_type == B ) | |
| 41 | collocated_from_l0_flag | u(1) |
| 42 | if( adaptive_loop_filter_enabled_flag ) { | |
| 43 | if( !shared_pps_info_enabled_flag ) | |
| 44 | alf_param( ) | |
| 45 | } | |
| 46 | } | |
| 47 | } | |

FIG. 19

| 1 | sao_param( ) { | C | Descriptor |
|---|---|---|---|
| 2 | sample_adaptive_offset_flag | 2 | u(1) |
| 3 | } | | |

FIG. 20

| 1 | slice_data( ) { | Descriptor |
|---|---|---|
| 2 | CurrTbAddr = LCUAddress | |
| 3 | moreDataFlag = 1 | |
| 4 | if( adaptive_loop_filter_enabled_flag ) | |
| 5 | alf_cu_control_param( ) | |
| 6 | if ( sample_adaptive_offset_flag ){ | |
| 7 | sao_split_param( 0, 0, 0 ) | |
| 8 | sao_offset_param( 0, 0, 0 ) | |
| 9 | } | |
| 10 | if( adaptive_loop_filter_flag && alf_cu_control_flag ) | |
| 11 | AlfCuFlagIdx = −1 | |
| 12 | do { | |
| 13 | xCU = HorLumaLocation(CurrTbAddr) | |
| 14 | yCU = VerLumaLocation(CurrTbAddr) | |
| 15 | moreDataFlag = coding_tree( xCU, yCU, Log2TbSize) | |
| 16 | CurrTbAddr = NextTbAddress(CurrTbAddr) | |
| 17 | } while(moreDataFlag) | |
| 18 | } | |

FIG. 21

| | | Descriptor |
|---|---|---|
| 1 | slice_header( ) { | |
| 2 | lightweight_slice_flag | u(1) |
| 3 | if( !lightweight_slice_flag ) { | |
| 4 |   slice_type | ue(v) |
| 5 |   pic_parameter_set_id | ue(v) |
| 6 |   frame_num | u(v) |
| 7 |   if( IdrPicFlag ) | |
| 8 |     idr_pic_id | ue(v) |
| 9 |   if( pic_order_cnt_type == 0 ) | |
| 10 |     pic_order_cnt_lsb/* | u(v) |
| 11 |   if( slice_type == P \|\| slice_type == B ) { | |
| 12 |     num_ref_idx_active_override_flag | u(1) |
| 13 |     if( num_ref_idx_active_override_flag ) { | |
| 14 |       num_ref_idx_l0_active_minus1 | ue(v) |
| 15 |       if( slice_type == B ) | |
| 16 |         num_ref_idx_l1_active_minus1 | ue(v) |
| 17 |     } | |
| 18 |   } | |
| 19 |   ref_pic_list_modification( ) | |
| 20 |   ref_pic_list_combination( ) | |
| 21 |   if( nal_ref_idc != 0 ) | |
| 22 |     dec_ref_pic_marking( ) | |
| 23 | } | |
| 24 | if( entropy_coding_mode_flag && slice_type != I ) | |
| 25 |   cabac_init_idc | ue(v) |
| 26 | first_slice_in_pic_flag | u(1) |
| 27 | if( first_slice_in_pic_flag == 0 ) | |
| 28 |   slice_address | u(v) |
| 29 | if( !lightweight_slice_flag ) { | |
| 30 |   slice_qp_delta | se(v) |
| 31 |   if( deblocking_filter_control_present_flag ) { | |
| 32 |     disable_deblocking_filter_idc | |
| 33 |     if( disable_deblocking_filter_idc != 1 ) { | |
| 34 |       slice_alpha_c0_offset_div2 | |
| 35 |       slice_beta_offset_div2 | |
| 36 |     } | |
| 37 |   } | |
| 38 |   if( slice_type == B) | |
| 39 |     collocated_from_l0_flag | u(1) |
| 40 |   if( adaptive_loop_filter_enabled_flag ) { | |
| 41 |     if( !shared_pps_info_enabled_flag ) | |
| 42 |       alf_param( ) | |
| 43 |     alf_cu_control_param( ) | |
| 44 |   } | |
| 45 |   if( sample_adaptive_offset_enabled_flag) | |
| 46 |     sao_param() | |
| 47 | } | |
| 48 | } | |

FIG. 22

| 1 | slice_header( ) { | Descriptor |
|---|---|---|
| 2 | lightweight_slice_flag | u(1) |
| 3 | if( !lightweight_slice_flag ) { | |
| 4 | slice_type | ue(v) |
| 5 | slice_qp_delta | se(v) |
| 6 | pic_parameter_set_id | ue(v) |
| 7 | frame_num | u(v) |
| 8 | if( IdrPicFlag ) | |
| 9 | idr_pic_id | ue(v) |
| 10 | if( pic_order_cnt_type == 0 ) | |
| 11 | pic_order_cnt_lsb /* | u(v) |
| 12 | if( slice_type == P || slice_type == B ) { | |
| 13 | num_ref_idx_active_override_flag | u(1) |
| 14 | if( num_ref_idx_active_override_flag ) { | |
| 15 | num_ref_idx_l0_active_minus1 | ue(v) |
| 16 | if( slice_type == B ) | |
| 17 | num_ref_idx_l1_active_minus1 | ue(v) |
| 18 | } | |
| 19 | } | |
| 20 | ref_pic_list_modification( ) | |
| 21 | ref_pic_list_combination( ) | |
| 22 | if( nal_ref_idc != 0 ) | |
| 23 | dec_ref_pic_marking( ) | |
| 24 | } | |
| 25 | if( entropy_coding_mode_flag && slice_type != I ) | |
| 26 | cabac_init_idc | ue(v) |
| 27 | first_slice_in_pic_flag | u(1) |
| 28 | if( first_slice_in_pic_flag == 0 ) | |
| 29 | slice_address | u(v) |
| 30 | if( !lightweight_slice_flag ) { | |
| 31 | if( deblocking_filter_control_present_flag ) { | |
| 32 | disable_deblocking_filter_idc | |
| 33 | if( disable_deblocking_filter_idc != 1 ) { | |
| 34 | slice_alpha_c0_offset_div2 | |
| 35 | slice_beta_offset_div2 | |
| 36 | } | |
| 37 | } | |
| 38 | if( slice_type == B ) | |
| 39 | collocated_from_l0_flag | u(1) |
| 40 | if( adaptive_loop_filter_enabled_flag ) { | |
| 41 | if( !shared_pps_info_enabled_flag ) | |
| 42 | alf_param( ) | |
| 43 | alf_cu_control_param( ) | |
| 44 | } | |
| 45 | if( sample_adaptive_offset_enabled_flag ) | |
| 46 | sao_param() | |
| 47 | } | |
| 48 | } | |

FIG. 23

| 1 | alf_cu_control_param() { | C | Descriptor |
|---|---|---|---|
| 2 | if( adaptive_loop_filter_flag ) { | | |
| 3 | alf_cu_control_flag | 2 | u(1) |
| 4 | if( alf_cu_control_flag ) { | | |
| 5 | alf_cu_control_max_depth | 2 | ue(v) |
| 6 | alf_length_cu_control_info | 2 | se(v) |
| 7 | for( i = 0; i < NumAlfCuFlag; i++ ) | | |
| 8 | alf_cu_flag[ i ] | 2 | u(1) \| ae(v) |
| 9 | } | | |
| 10 | } | | |
| 11 | } | | | ized
IMAGE PROCESSING DEVICE AND METHOD CAPABLE OF PERFORMING AN ENCODING PROCESS OR A DECODING PROCESS ON AN IMAGE AT HIGH SPEED

CROSS REFERENCE TO PRIOR APPLICATION

This application is a National Stage Patent Application of PCT International Patent Application No. PCT/JP2012/066647 (filed on Jun. 29, 2012) under 35 U.S.C. § 371, which claims priority to Japanese Patent Application Nos. 2011-180415 (filed on Aug. 22, 2011) and 2011-151186 (filed on Jul. 7, 2011), which are all hereby incorporated by reference in their entirety.

TECHNICAL FIELD

The present disclosure relates to an image processing device and method, and in particular, to an image processing device and method capable of performing an encoding process or a decoding process on an image at high speed.

BACKGROUND ART

In a conventional image encoding method based on the H.264/AVC standard, CABAC (Context-Adaptive Binary Arithmetic Coding) and CAVLC (Context-Adaptive Variable Length Coding) are defined as entropy coding. Between these, the CABAC is a binary arithmetic coding method for performing adaptive coding according to the surrounding conditions (context).

In the H.264/AVC standard, when parsing slice data, the CABAC initializes an encoding process engine, a decoding process engine, and the value of context in the head of the slice data (for example, refer to Non-Patent Document 1).

At present, to achieve higher encoding efficiency than that of H.264/AVC, an image encoding technique called HEVC (High Efficiency Video Coding) is being developed as a standard by JCTVC (Joint Collaboration Team—Video Coding), which is a joint standardization organization of ITU-T and ISO/IEC. Non-Patent Document 2 has been issued as a draft of HEVC.

At present, in the draft of the HEVC, an adaptive loop filter (for example, refer to Non-Patent Document 3) and an adaptive offset filter (for example, refer to Non-Patent Document 4) are adopted. In the HEVC, an adaptive offset filter is provided between a deblocking filter and an adaptive loop filter.

CITATION LIST

Non-Patent Documents

Non-Patent Document 1: "ITU-T Recommendation H.264 Advanced video coding for generic audiovisual", March 2010
Non-Patent Document 2: Thomas Wiegand, Woo-jin Han, Benjamin Bross, Jens-Rainer Ohm, Gary J. Sullivian, "WD3: Working Draft3 of High-Efficiency Video Coding", JCTVc-E603_d5 (version 5), May 20, 2011.5.20
Non-Patent Document 3: Takeshi Chujoh, Goki Yasuda, Naofumi Wada, Takashi Watanabe, Tomoo Yamakage, "Block-based Adaptive Loop Filter", VCEG-AI18, ITU—Telecommunications Standardization SectorSTUDY GROUP 16 Question 6Video Coding Experts Group (VCEG) 35th Meeting: Berlin, Germany, 16-18 July, 2008
Non-Patent Document 4: "CE8 Subtest 3: Picture Quality Adaptive Offset", JCTVC-D122, January 2011

SUMMARY OF THE INVENTION

Problems to be Solved by the Invention

In the method proposed in Non-Patent Document 2, however, the timing of an arithmetic coding process or an arithmetic decoding process when parsing the header (performing the arithmetic coding process or the arithmetic decoding process) is not sufficiently taken into consideration. For this reason, when trying to execute the method proposed in Non-Patent Document 2, delay due to the arithmetic coding process or the arithmetic decoding process occurs.

The present disclosure has been made in view of such a situation, and an object thereof is to perform an encoding process or a decoding process on an image at high speed.

Solutions to Problems

An image processing device of a first aspect of the present disclosure includes: a receiving unit that receives an encoded stream, in which arithmetic coding parameters subjected to an arithmetic coding process are arranged together in syntax of an encoded stream obtained by encoding image data in a unit having a hierarchical structure, and the arithmetic coding parameters; and a decoder that performs an arithmetic decoding process on the arithmetic coding parameters received by the receiving unit and decodes the encoded stream received by the receiving unit using the arithmetic coding parameters subjected to the arithmetic decoding process.

Encoding parameters subjected to a variable length coding process or a fixed length coding process can be arranged together in the syntax of the encoded stream, the receiving unit can receive the encoding parameters from the encoded stream, and the decoder can decode the encoding parameters received by the receiving unit and decodes the encoded stream using the decoded encoding parameters.

The arithmetic coding parameters are arranged after the encoding parameters in the syntax of the encoded stream.

Initialization parameters used when initializing the arithmetic coding process or the arithmetic decoding process can be arranged together in the syntax of the encoded stream, the receiving unit can receive the initialization parameters from the encoded stream, and a controller, which performs control to initialize the arithmetic decoding process with reference to the initialization parameters received by the receiving unit, can be further provided.

The arithmetic coding parameters are parameters to control an encoding process or a decoding process at the picture level or a slice level.

The arithmetic coding parameters are parameters of a filter used when performing the encoding process or the decoding process.

A parameter of the adaptive loop filter and a parameter of the adaptive offset filter can be arranged together at a top of slice data of the encoded stream, and the receiving unit can receive the parameter of the adaptive loop filter and the parameter of the adaptive offset filter from the top of the slice data of the encoded stream.

A parameter of the adaptive loop filter and a parameter of the adaptive offset filter can be arranged together at an end of a slice header of the encoded stream, and the receiving unit can receive the parameter of the adaptive loop filter and the parameter of the adaptive offset filter from the end of the slice data of the encoded stream.

The initialization parameters can be arranged near a top of a slice header of the encoded stream, and the receiving unit can receive the initialization parameters from the vicinity of the top of the slice header of the encoded stream.

An image processing method of the first aspect of the present disclosure includes: causing an image processing device to receive, from an encoded stream in which arithmetic coding parameters subjected to an arithmetic coding process are arranged together in syntax of an encoded stream obtained by encoding image data in a unit having a hierarchical structure, the arithmetic coding parameters; and causing the image processing device to perform an arithmetic decoding process on the received arithmetic coding parameters and decode the received encoded stream using the arithmetic coding parameters subjected to the arithmetic decoding process.

An image processing device of a second aspect of the present disclosure includes: an encoder that encodes image data in a unit having a hierarchical structure to generate an encoded stream; an arrangement unit that arranges arithmetic coding parameters, which are subjected to an arithmetic coding process, together in syntax of the encoded stream generated by the encoder; and a transmission unit that transmits the encoded stream generated by the encoder and the arithmetic coding parameters arranged by the arrangement unit.

The arrangement unit can arrange encoding parameters, which are subjected to a variable length coding process or a fixed length coding process, together, and the transmission unit can transmit the encoding parameters arranged by the arrangement unit.

The arrangement unit can arrange the arithmetic coding parameters after the encoding parameters.

The arrangement unit can arrange initialization parameters, which are used when initializing an arithmetic coding process or an arithmetic decoding process, together, and the transmission unit can transmit the initialization parameters arranged by the arrangement unit.

The arithmetic coding parameters are parameters to control an encoding process or a decoding process at the picture level or a slice level.

The arithmetic coding parameters are parameters of a filter used when performing the encoding process or the decoding process.

The arrangement unit can arrange a parameter of the adaptive loop filter and a parameter of the adaptive offset filter together at a top of slice data of the encoded stream, and the transmission unit can transmit the parameter of the adaptive loop filter and the parameter of the adaptive offset filter arranged by the arrangement unit.

The arrangement unit can arrange a parameter of the adaptive loop filter and a parameter of the adaptive offset filter together at an end of a slice header of the encoded stream, and the transmission unit can transmit the parameter of the adaptive loop filter and the parameter of the adaptive offset filter arranged by the arrangement unit.

The arrangement unit can arrange the initialization parameters near a top of a slice header of the encoded stream.

An image processing method of the second aspect of the present disclosure includes: causing an image processing device to generate an encoded stream by encoding image data in a unit having a hierarchical structure; causing the image processing device to arrange arithmetic coding parameters, which are subjected to an arithmetic coding process, together in syntax of the generated encoded stream; and causing the image processing device to transmit the generated encoded stream and the arranged arithmetic coding parameters.

In the first aspect of the present disclosure, an encoded stream, in which arithmetic coding parameters subjected to an arithmetic coding process are arranged together in the syntax of an encoded stream obtained by encoding image data in a unit having a hierarchical structure, and the arithmetic coding parameters are received, and the received arithmetic coding parameters are subjected to an arithmetic decoding process. In addition, the received encoded stream is decoded using the arithmetic coding parameters subjected to the arithmetic decoding process.

In the second aspect of the present disclosure, an encoded stream is generated by encoding image data in a unit having a hierarchical structure. In addition, arithmetic coding parameters subjected to an arithmetic coding process are arranged together in the syntax of the generated encoded stream, and the generated encoded stream and the arranged arithmetic coding parameters are transmitted.

In addition, the image processing device described above may be an independent device, or may be an internal block that configures one image encoding device or image decoding device.

Effects of the Invention

According to the first aspect of the present disclosure, an image can be decoded. In particular, it is possible to perform a decoding process at high speed.

According to the second aspect of the present disclosure, an image can be encoded. In particular, it is possible to perform an encoding process at high speed.

BRIEF DESCRIPTION OF DRAWINGS

FIG. 18 is a diagram showing an example of the syntax of a slice header.

FIG. 19 is a diagram showing an example of the syntax of sao_param( ).

FIG. 20 is a diagram showing an example of the syntax of slice data.

FIG. 21 is a diagram showing another example of the syntax of the slice header.

FIG. 22 is a diagram showing still another example of the syntax of the slice header.

FIG. 23 is a diagram showing an example of the syntax of alf_cu_control_param( ).

MODES FOR CARRYING OUT THE INVENTION

Modes for carrying out the present disclosure (hereinafter referred to as the embodiments) will be described below. The description will be made in the following order.
1. First Embodiment (image encoding device)
2. Second Embodiment (image decoding device)
3. Third Embodiment (multi-view image encoding and multi-view image decoding device)
4. Fourth Embodiment (hierarchical image encoding and hierarchical image decoding device)
5. Fifth Embodiment (computer)
6. Sixth Embodiment (application examples)
<1. First Embodiment>
[Example of Configuration of Image Encoding Device]

Figure 1:
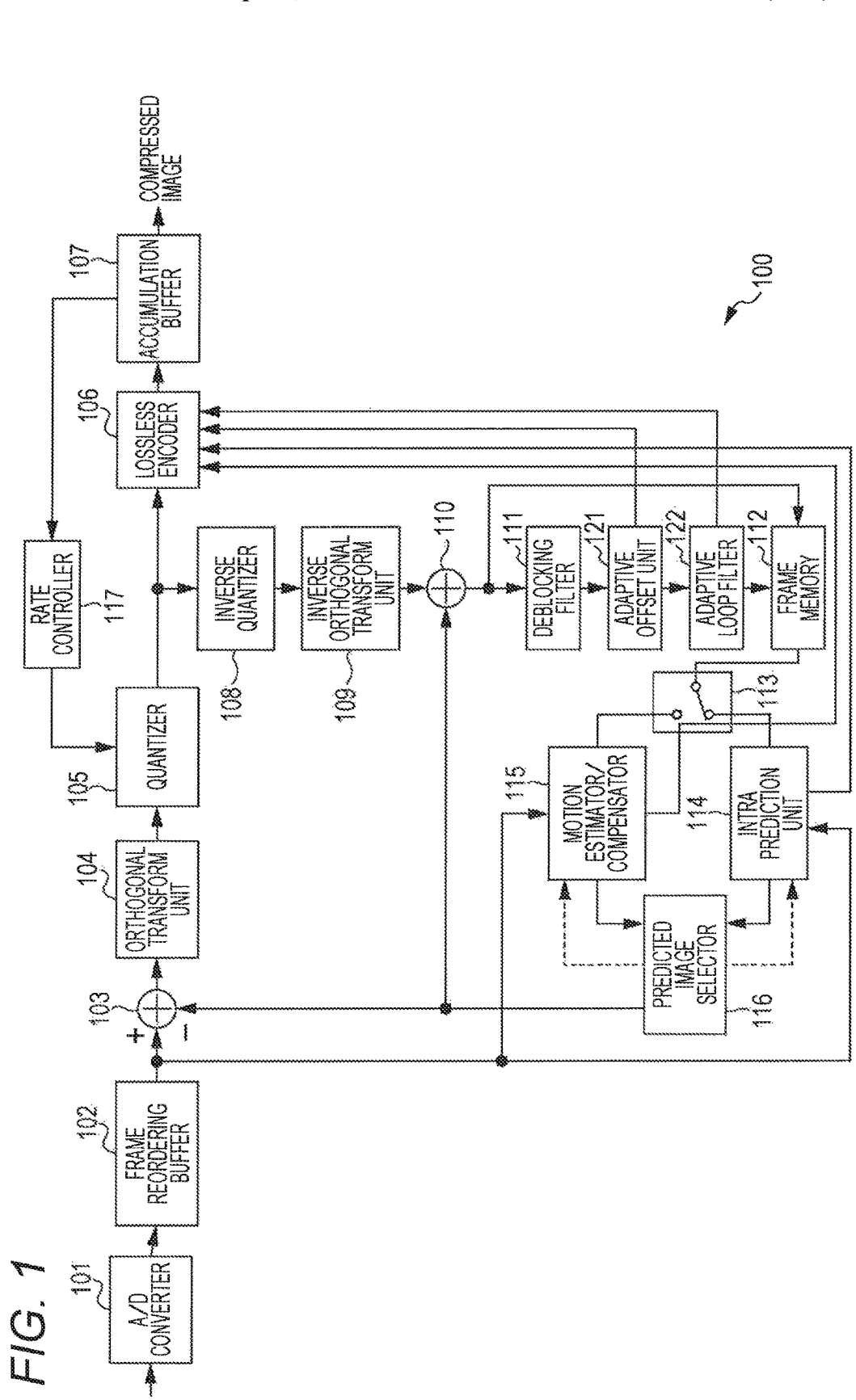
FIG. 1 is a block diagram showing a typical example structure of an image encoding device.

FIG. 1 shows the configuration of one embodiment of an image encoding device as an image processing device to which the present disclosure is applied.

An image encoding device 100 shown in FIG. 1 encodes image data using prediction processing. Here, as examples of the encoding method, an H.264 and MPEG (Moving Picture Experts Group) 4 Part 10 (AVC (Advanced Video Coding)) (hereinafter, referred to as H.264/AVC) method, an HEVC (High Efficiency Video Coding) method, and the like are used.

In the example shown in FIG. 1, the image encoding device 100 includes an A/D (Analog/Digital) converter 101, a frame reordering buffer 102, an arithmetic operation unit 103, an orthogonal transform unit 104, a quantizer 105, a lossless encoder 106, and an accumulation buffer 107. The image encoding device 100 also includes an inverse quantizer 108, an inverse orthogonal transform unit 109, an arithmetic operation unit 110, a deblocking filter 111, a frame memory 112, a selector 113, an intra prediction unit 114, a motion estimator/compensator 115, a predicted image selector 116, and a rate controller 117.

The image encoding device 100 further includes an adaptive offset unit 121 and an adaptive loop filter 122.

The A/D converter 101 performs A/D conversion of input image data, and outputs the result to the frame reordering buffer 102 and stores it.

The frame reordering buffer 102 reorders the frames of the image stored in display order into encoding frame order in accordance with a GOP (Group of Pictures) structure. The frame reordering buffer 102 supplies the image, in which the frames have been reordered, to the arithmetic operation unit 103. In addition, the frame reordering buffer 102 also supplies the image, in which the frames have been reordered, to an intra prediction unit 114 and a motion estimator/compensator 115.

The arithmetic operation unit 103 subtracts a predicted image supplied from the intra prediction unit 114 or the motion estimator/compensator 115 via the predicted image selector 116 from an image read from the frame reordering buffer 102, and outputs resulting difference information to the orthogonal transform unit 104.

For example, in the case of an image on which intra coding is performed, the arithmetic operation unit 103 subtracts a predicted image supplied from the intra prediction unit 114 from an image read from the frame reordering buffer 102. In addition, for example, in the case of an image on which inter coding is performed, the arithmetic operation unit 103 subtracts a predicted image supplied from the motion estimator/compensator 115 from an image read from the frame reordering buffer 102.

The orthogonal transform unit 104 performs an orthogonal transform, such as a discrete cosine transform or a Karhunen-Loeve transform, on the difference information supplied from the arithmetic operation unit 103, and supplies the transform coefficient to the quantizer 105.

The quantizer 105 quantizes the transform coefficient output from the orthogonal transform unit 104. The quantizer 105 supplies the quantized transform coefficient to the lossless encoder 106.

The lossless encoder 106 performs lossless encoding, such as variable length coding and arithmetic coding, on the quantized transform coefficient.

The lossless encoder 106 acquires a parameter, such as information indicating an intra prediction mode, from the intra prediction unit 114, and acquires a parameter, such as information indicating an inter prediction mode or motion vector information, from the motion estimator/compensator 115. The lossless encoder 106 acquires a parameter of an adaptive offset filter from the adaptive offset unit 121, and acquires a parameter of an adaptive loop filter from the adaptive loop filter 122.

The lossless encoder 106 encodes the quantized transform coefficient, and also encodes each parameter (syntax element) acquired and sets the result as a part of the header information of encoded data (multiplexes the result). The lossless encoder 106 supplies the encoded data obtained by the encoding to the accumulation buffer 107 and accumulates the encoded data therein.

For example, in the lossless encoder 106, a lossless encoding process such as variable length coding or arithmetic coding is performed. As the variable length coding, CAVLC (Context-Adaptive Variable Length Coding) and the like can be mentioned. As the arithmetic coding, CABAC (Context-Adaptive Binary Arithmetic Coding) and the like can be mentioned. The CABAC is a binary arithmetic coding method for performing adaptive coding according to the surrounding conditions (context).

Among the above-described parameters transmitted to the decoding side, a parameter to control the encoding process in units of a slice or a picture has a large amount of data in transmission at the variable length coding level or the fixed length coding level. Therefore, it is desirable to compress the parameter by arithmetic coding (CABAC) and transmit the compressed data. In contrast, it is desirable that parameters, such as if sentence, be subjected to variable length coding or fixed length coding.

The lossless encoder 106 performs arithmetic coding on a parameter for which arithmetic coding is required, among parameters, and performs variable length coding or fixed length coding on the other parameters.

The accumulation buffer 107 temporarily stores the encoded data supplied from the lossless encoder 106, and outputs the stored encoded data to, for example, a recording device at a subsequent stage or a transmission path (not shown), as an encoded image at a predetermined timing.

The transform coefficient quantized by the quantizer 105 is also supplied to the inverse quantizer 108. An inverse quantizer 108 performs inverse quantization of the quantized transform coefficient using a method corresponding to the quantization of the quantizer 105. The inverse quantizer 108 supplies the obtained transform coefficient to an inverse orthogonal. transform unit 109.

The inverse orthogonal transform unit 109 performs an inverse orthogonal transform of the supplied transform coefficient using a method corresponding to the orthogonal transform processing of the orthogonal transform unit 104. The output obtained by the inverse orthogonal transform (restored difference information) is supplied to an arithmetic operation unit 110.

The arithmetic operation unit 110 adds the predicted image, which is supplied from the intra prediction unit 114 or the motion estimator/compensator 115 through the predicted image selector 116, to the inverse orthogonal transform result, that is, the restored difference information supplied from the inverse orthogonal transform unit 109 to obtain a locally decoded image (decoded image).

For example, when the difference information corresponds to an image on which intra coding is performed, the arithmetic operation unit 110 adds the predicted image supplied from the intra prediction unit 114 to the difference information. In addition, for example, when the difference information corresponds to an image on which inter coding is performed, the arithmetic operation unit 110 adds the predicted image supplied from the motion estimator/compensator 115 to the difference information.

The addition result is supplied to a deblocking filter 111 and a frame memory 112.

The deblocking filter 111 removes block distortion of the decoded image by appropriately performing deblocking filtering. The deblocking filter 111 supplies the filtering result to the adaptive offset unit 121.

The frame memory 112 outputs a stored reference image to the intra prediction unit 114 or the motion estimator/compensator 115 through a selector 113 at a predetermined timing.

For example, in the case of an image on which intra coding is performed, the frame memory 112 supplies the reference image to the intra prediction unit 114 through the selector 113. In addition, for example, when inter coding is performed, the frame memory 112 supplies the reference image to the motion estimator/compensator 115 through the selector 113.

When the reference image supplied from the frame memory 112 is an image on which intra coding is performed, the selector 113 supplies the reference image to the intra prediction unit 114. In addition, when the reference image supplied from the frame memory 112 is an image on which inter coding is performed, the selector 113 supplies the reference image to the motion estimator/compensator 115.

The intra prediction unit 114 performs intra prediction (intra-frame prediction) for generating a predicted image using pixel values within the screen. The intra prediction unit 114 performs intra prediction in a plurality of modes (intra prediction modes).

The intra prediction unit 114 generates predicted images in all intra prediction modes, evaluates each predicted image, and selects an optimal mode. Once the optimal intra prediction mode is selected, the intra prediction unit 114 supplies the predicted image generated in the optimal mode to the arithmetic operation unit 103 or the arithmetic operation unit 110 through the predicted image selector 116.

In addition, as described above, the intra prediction unit 114 appropriately supplies a parameter, such as intra prediction mode information indicating the adopted intra prediction mode, to the lossless encoder 106.

The motion estimator/compensator 115 generates a predicted image (inter-predicted image information) by performing motion estimation for an image, on which inter coding is performed, using an input image supplied from the frame reordering buffer 102 and the reference image supplied from the frame memory 112 through the selector 113 and performing motion compensation processing according to the detected motion vector.

The motion estimator/compensator 115 generates predicted images by performing inter prediction processing in all candidate inter prediction modes. The motion estimator/compensator 115 supplies the generated predicted images to the arithmetic operation unit 103 or the arithmetic operation unit 110 through the predicted image selector 116.

In addition, the motion estimator/compensator 115 supplies a parameter, such as inter prediction mode information indicating the adopted inter prediction mode or motion vector information indicating the calculated motion vector, to the lossless encoder 106.

The predicted image selector 116 supplies an output of the intra prediction unit 114 to the arithmetic operation unit 103 or the arithmetic operation unit 110 in the case of an image on which intra coding is performed, and supplies an output of the motion estimator/compensator 115 to the arithmetic operation unit 103 or the arithmetic operation unit 110 in the case of an image on which inter coding is performed.

Based on the compressed image information accumulated in the accumulation buffer 107, the rate controller 117 controls the quantization operation rate of the quantizer 105 so as not to cause an overflow or underflow.

The adaptive offset unit 121 performs offset filtering on the decoded image (baseband information after local decoding) from the deblocking filter 111. That is, the adaptive offset unit 121 determines a quad-tree structure by performing region division by quad-tree using the decoded image and determining the type of offset for each divided region. Types of offset are a total of nine types including two types of band offset, six types of edge offset, and no offset. The adaptive offset unit 121 calculates an offset value for each divided region with reference to the quad-tree structure.

The adaptive offset unit 121 performs offset processing on the decoded image from the deblocking filter 111 using the determined quad-tree structure and the offset value. Then, the adaptive offset unit 121 supplies the image after offset processing to the adaptive loop filter 122. In addition, the adaptive offset unit 121 supplies the determined quad-tree structure and the calculated offset value to the lossless encoder 106 as parameters of the adaptive offset filter.

The adaptive loop filter 122 calculates an adaptive loop filter coefficient so as to minimize a residual difference from the original image from the frame reordering buffer 102, and performs filtering on the decoded image from the adaptive offset unit 121 using the adaptive loop filter coefficient. As this filter, for example, a Wiener filter is used. The adaptive loop filter 122 supplies the image after filtering to the frame memory 112.

In addition, the adaptive loop filter 122 transmits the calculated adaptive loop filter coefficient to the lossless encoder 106 as a parameter of the adaptive loop filter.

[Example of Configuration of Lossless Encoder]

Figure 2:
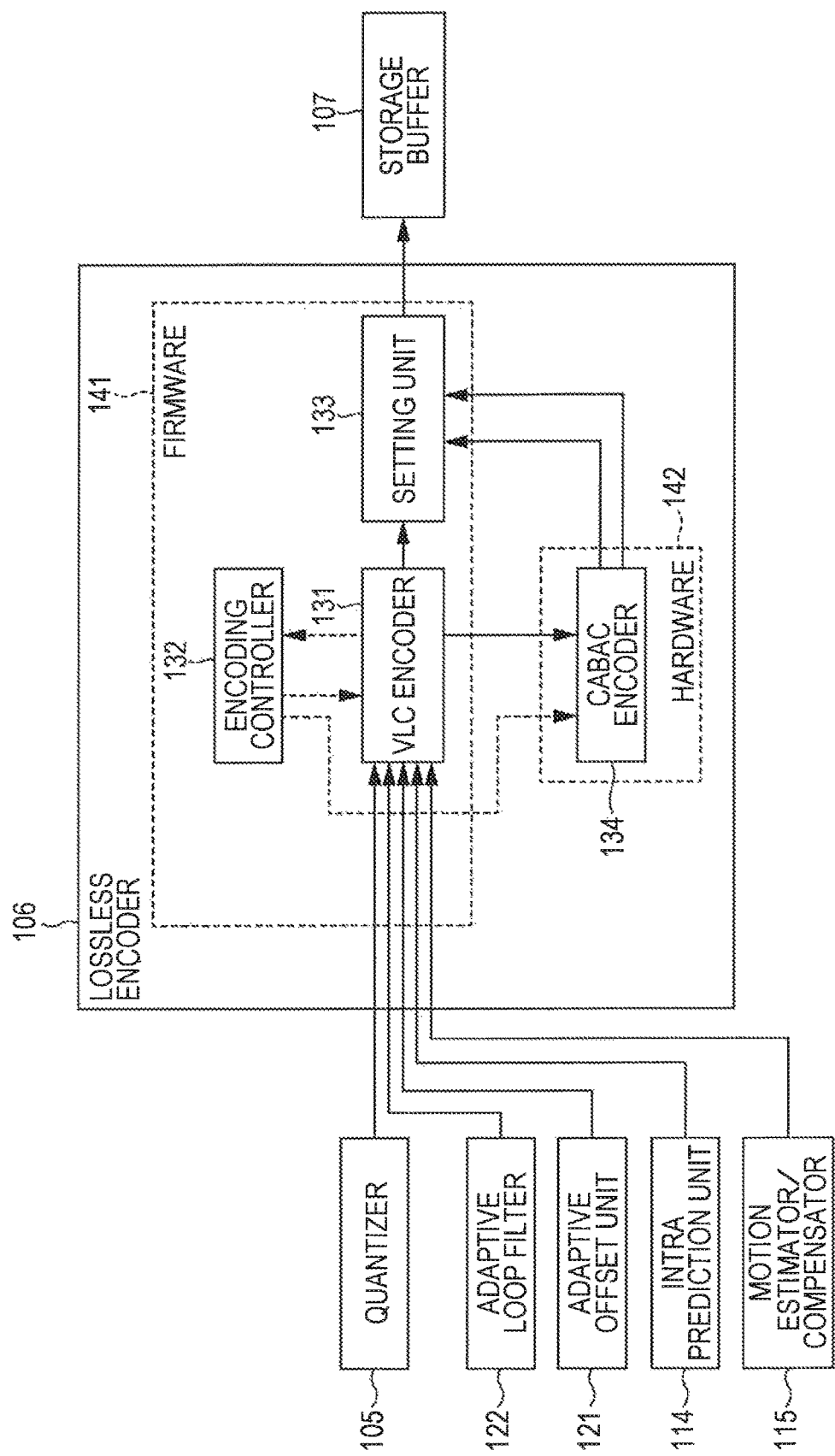
FIG. 2 is a diagram illustrating an example of the configuration of a lossless encoder.

Next, each unit of the image encoding device 100 will be described. FIG. 2 is a block diagram showing an example of the configuration of the lossless encoder 106.

In the example shown in FIG. 2, the lossless encoder 106 is configured to include a VLC (Variable Length Coding) encoder 131, an encoding controller 132, a setting unit 133, and a CABAC (Context-Adaptive Binary Arithmetic Coding) encoder 134.

Among the respective units that form the lossless encoder 106, the VLC encoder 131, the encoding controller 132, and the setting unit 133 are realized as firmware 141 by being executing by a CPU (not shown). Among the respective units that form the lossless encoder 106, the CABAC encoder 134 that performs relatively heavy processing is realized as hardware 142 by logic configuration or the like.

The transform coefficient from the quantizer 105 is supplied to the VLC encoder 131. Parameters to control the encoding process are supplied from the intra prediction unit 114, the motion estimator/compensator 115, the adaptive offset unit 121, the adaptive loop filter 122, and the like to the VLC encoder 131.

For example, the intra prediction unit 114 supplies a parameter regarding intra prediction, such as information indicating the intra prediction mode, to the VLC encoder 131. For example, the motion estimator/compensator 115 supplies a parameter regarding motion prediction, such as information indicating the inter prediction mode, motion vector information, reference frame information, and flag information, to the VLC encoder 131.

For example, the adaptive offset unit 121 supplies a parameter regarding an adaptive offset filter, such as a quad-tree structure or an offset value, to the VLC encoder 131. For example, the adaptive loop filter 122 supplies a parameter regarding an adaptive loop filter, such as an adaptive loop filter coefficient, to the VLC encoder 131. In addition, although not shown, a quantization parameter from the quantizer 105 and the like are also supplied.

Among these parameters, both. the parameter regarding the adaptive offset filter and the parameter regarding the adaptive loop filter are parameters of filters. In addition, these parameters are parameters applied to the entire screen, that is, parameters to control the encoding process in units of a slice or a picture. Arithmetic coding of such parameters reduces the amount of data transmitted to the decoding side.

Then, the VLC encoder 131 performs a variable length coding process or a fixed length coding process on parameters other than the parameters to control the encoding process in units of a slice or a picture among the supplied parameters. The VLC encoder 131 supplies the encoded data to the setting unit 133.

The VLC encoder 131 supplies the quantized transform coefficient from the quantizer 105 to the CABAC encoder 134. The VLC encoder 131 supplies parameters to control the encoding process in units of a slice or a picture, among the supplied parameters, to the CABAC encoder 134, and notifies the encoding controller 132 of the supply of the parameters to the CABAC encoder 134. When parameters required for the initialization of the CABAC encoder 134 are aligned, the VLC encoder 131 supplies these parameters to the CABAC encoder 134 and notifies the encoding controller 132 of the supply of the parameters to the CABAC encoder 134.

The encoding controller 132 causes the CABAC encoder 134 to start an initialization process or an encoding process in response to the notification from the VLC encoder 131. The encoding controller 132 causes the VLC encoder 131 to start an encoding process or the setting unit 133 to start setting in response to the notification from the CABAC encoder 134.

The setting unit 133 generates a slice header and slice data by arranging the parameters encoded by the VLC encoder 131 or the CABAC encoder 134 and the data encoded by the CABAC encoder 134 next to each other in predetermined order under the control of the encoding controller 132. The setting unit 133 supplies the generated slice header and slice data to the accumulation buffer 107.

The CABAC encoder 134 performs initialization using the parameters required for initialization from the VLC encoder 131 under the control of the encoding controller 132. The CABAC encoder 134 performs arithmetic coding of each parameter and the quantized transform coefficient from the VLC encoder 131 under the control of the encoding controller 132. The CABAC encoder 134 supplies the data (transform coefficient) and the parameters after arithmetic coding to the setting unit 133.

[Conventional Stream Configuration]

Figure 3:
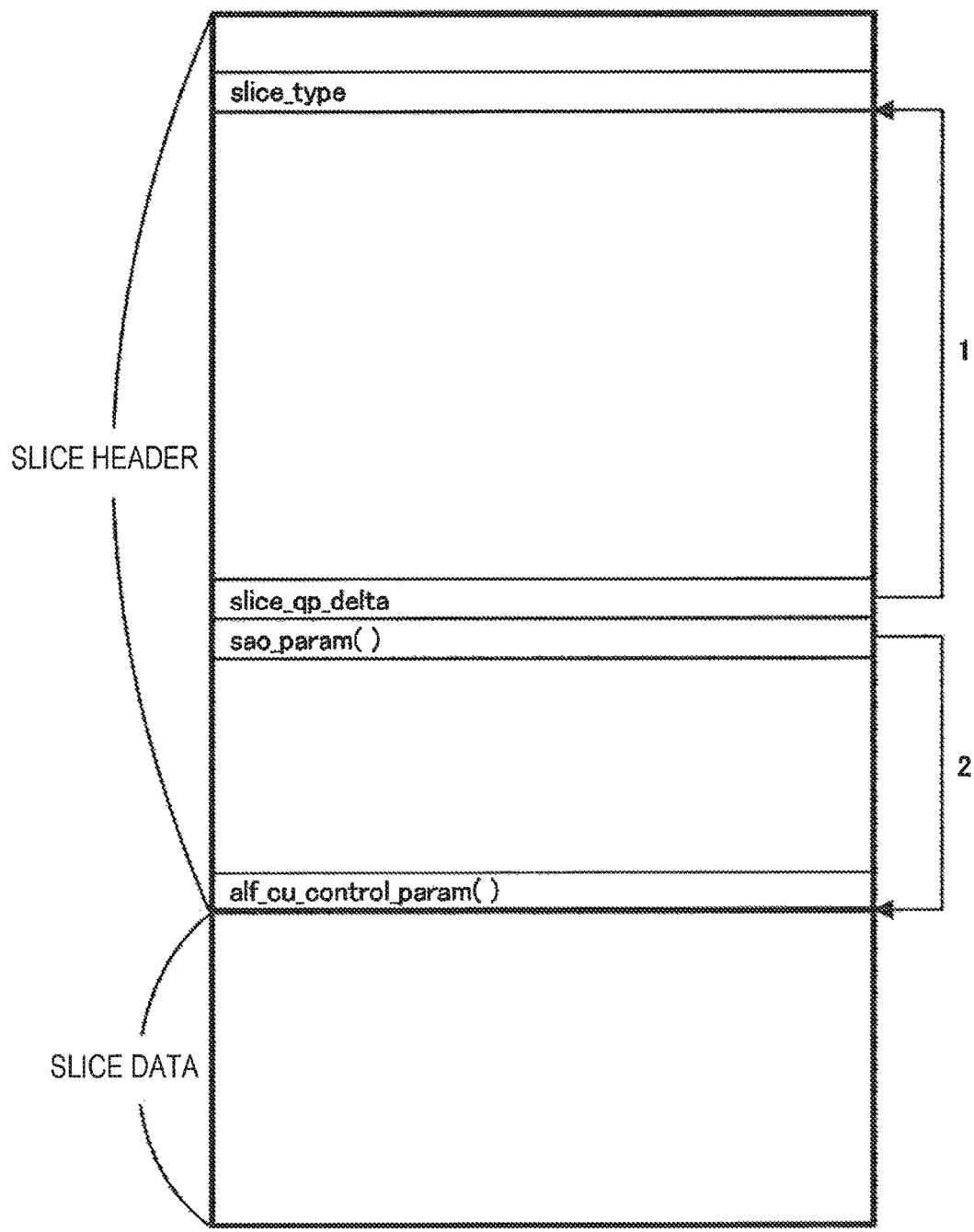
FIG. 3 is a diagram showing an example of the conventional stream configuration.

FIG. 3 is a diagram showing an example of the configuration of a part of a slice header and slice data in a conventional stream.

In the example shown in FIG. 3, slice_type indicating the type of a slice is arranged near the top of the slice header. slice_qp_delta is arranged slightly below the middle of the slice header, slice_type and slice_qp_delta are parameters required for the initialization of CABAC (hereinafter, also referred to as initialization parameters appropriately) on which variable or fixed length coding or decoding is performed.

sao_param( ), which is a parameter of the adaptive offset filter, is arranged immediately after slice_qp_delta below the middle of the slice header. alf_cu_control_param( ), which is a parameter of the adaptive loop filter, is arranged at the end of the slice header. Slice data continues after alf_cu_control_param( ) and the end of the slice header.

sao_param( ), which is a parameter of the adaptive offset filter, and alf_cu_control_param( ), which is a parameter of the adaptive loop filter, are parameters to control ON or OFF on the entire screen. Thus, in the case of a parameter to control the encoding process in units of a slice or a picture, the amount of data is large. Accordingly, arithmetic coding or arithmetic decoding is performed on such a parameter.

In addition, in the H.264/AVC method, since no parameter on which arithmetic coding and arithmetic decoding are performed is present in the slice header, the initialization of the CABAC has preferably been performed before slice data.

In contrast, in the HEVC method, since arithmetic coding and arithmetic decoding are performed on the parameters described above, the initialization of the CABAC should be performed before these parameters in the slice header. However, among the initialization parameters required for the initialization of the CABAC, slice_type is arranged near the top of the slice header, but slice_qp_delta is arranged immediately before sao_param( ) that is a parameter of the adaptive offset filter. Accordingly, at least on the decoding side, if slice_qp_delta is not decoded, it is difficult to perform the initialization of the CABAC. For this reason, the initialization of the CABAC is performed immediately before sao_param( ) in the related art.

Since arithmetic coding and arithmetic decoding cannot be performed while the initialization of the CABAC is being performed, waiting occurs in processes of arithmetic coding and arithmetic decoding. In addition, since sao_param( ) that is a parameter of the adaptive offset filter and alf_cu_control_param( ) that is a parameter of the adaptive loop filter, for which arithmetic coding is required, are present at positions away from each other in the slice header, alternations for arithmetic coding and arithmetic decoding are dispersed. As a result, delay may occur in the processing.

Therefore, as indicated by arrow 1, the setting unit 133 arranges slice_qp_delta required for the initialization of the CABAC after Slice_type near the top of the slice header.

In addition, as indicated by arrow 2, the setting unit 133 arranges sao_param( ), which is a parameter of the adaptive offset filter, at the end of the slice header where alf_cu_control_param( ), which is a parameter of the adaptive loop filter, is arranged.

[Example of Stream Configuration in Present Technique]

Figure 4:
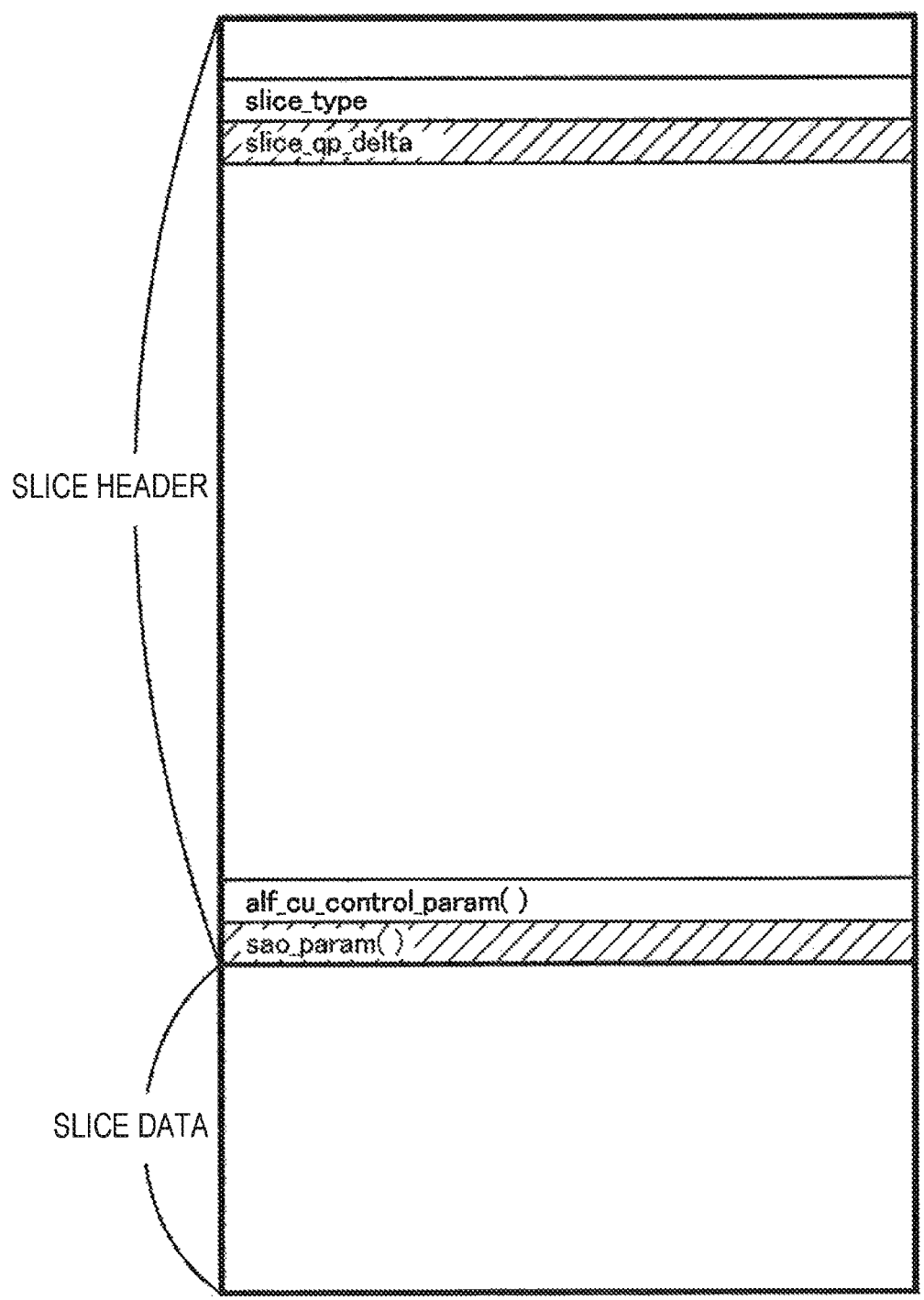
FIG. 4 is a diagram showing an example of the stream configuration of an image encoding device.

FIG. 4 is a diagram showing an example of the configuration of a part of a slice header and slice data in the stream of the present technique. In the example shown in FIG. 4, a hatch indicates a difference compared with the related art described above with reference to FIG. 3.

In the example shown in FIG. 4, slice_type and slice_qp_delta, which is located below the middle of the slice header in the example shown in FIG. 3, are arranged next to each other (together) at the top of the slice header.

Accordingly, the initialization of the CABAC can be performed anywhere slice_type and slice_qp_delta, which are initialization parameters of the CABAC, are aligned after the top of the slice header. As a result, arithmetic coding and arithmetic decoding of parameters are not awaited due to the initialization of the parameters.

In addition, alf_cu_control_param( ), which is a parameter of the adaptive loop filter, and sao_param( ), which is a parameter of the adaptive offset filter located in the middle of the slice header in the example shown in FIG. 3, are arranged next to each other at the end of the slice header.

In this manner, parameters for which arithmetic coding and arithmetic decoding are required are arranged together at the end of the slice header before slice data. As a result, processes of arithmetic coding and arithmetic decoding can be efficiently performed together on the slice data from the end of the slice header.

In addition, in embodiments, a parameter for which arithmetic coding is required, that is, an encoding parameter subjected to arithmetic coding (decoding), is referred to as an arithmetic coding parameter hereinafter. On the other hand, a parameter on which variable length coding (decoding) or fixed length coding (decoding) is performed is simply referred to as an encoding parameter. In addition, in the example shown in FIG. 4, an example is illustrated in which an arithmetic coding parameter for which arithmetic coding and arithmetic decoding are required is arranged at the end of the slice header. However, the arithmetic coding parameter for which arithmetic coding and arithmetic decoding are required may also be arranged at the top of slice data as shown in FIG. 5.

[Another Example of Stream Configuration in Present Technique]

Figure 5:
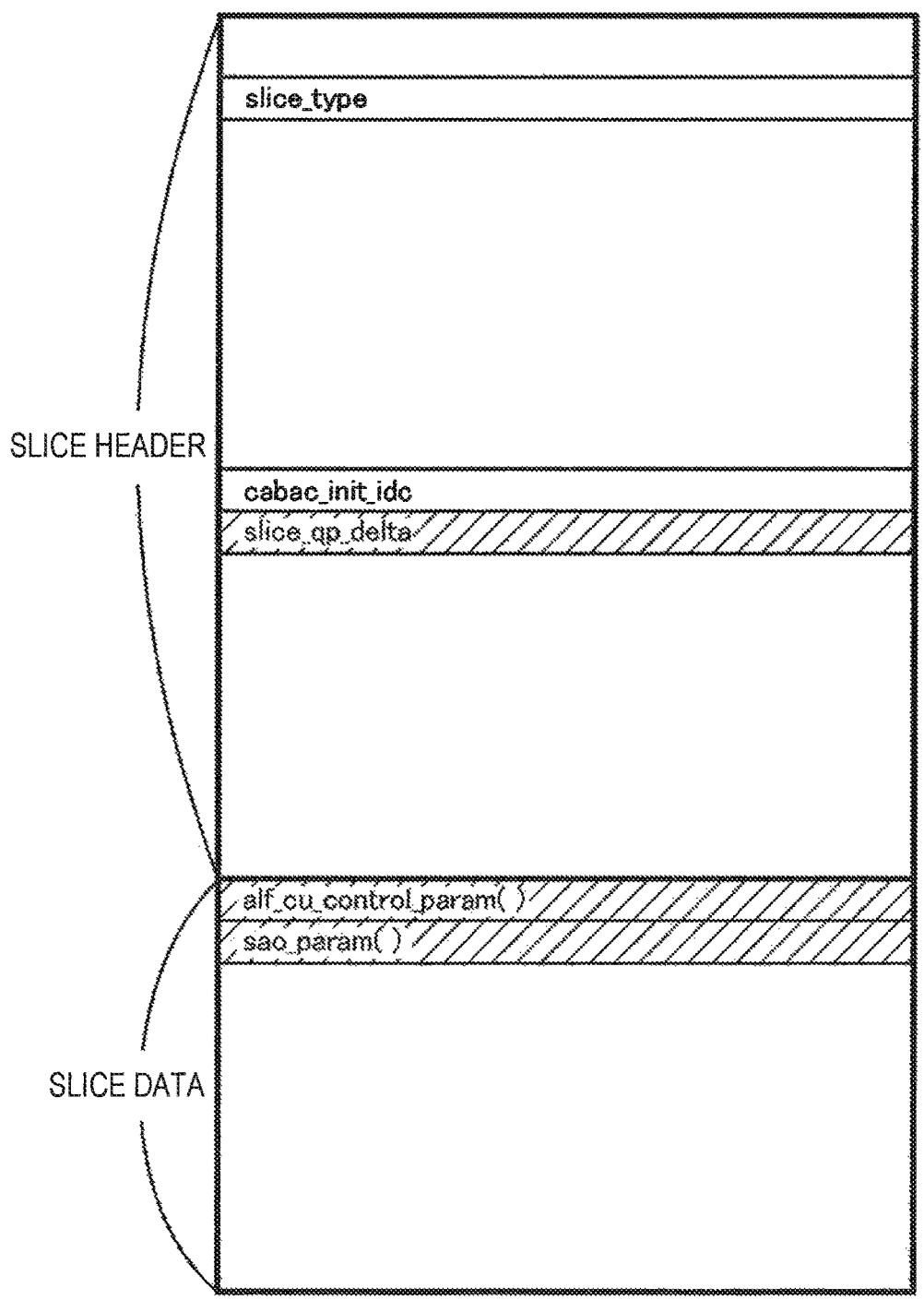
FIG. 5 is a diagram showing another example of the stream configuration of the image encoding device.

FIG. 5 is a diagram showing another example of the configuration of a part of a slice header and slice data in the stream of the present technique. In the example shown in FIG. 5, a hatch indicates a difference compared with the related art described above with reference to FIG. 3.

In the example shown in FIG. 5, slice_type is arranged near the top of the slice header. In addition, cabac_init_idc, and slice_qp_delta, which is located below the middle of the slice header in the example shown in FIG. 3, are arranged next to each other in the middle of the slice header.

cabac_init_idc is used to set the table of cabac in the H.264/AVC method, but the use in the HEVC method is not determined at present. When cabac_init_idc is used, slice_qp_delta may be arranged immediately after cabac_init_idc, as shown in FIG. 5, so as to be placed together with cabac_init_idc. In addition, cabac_init_idc may also be placed immediately after slice_type in FIG. 4 together with slice_qp_delta.

Also in this case, the initialization of the CABAC can be performed anywhere slice_type, slice_qp_delta, and cabac_init_idc are aligned. As a result, arithmetic coding and arithmetic decoding of arithmetic coding parameters are not awaited due to the initialization of the parameters.

In the example shown in FIG. 5, alf_cu_control_param( ), which is a parameter of the adaptive loop filter, and sao_param( ), which is a parameter of the adaptive offset filter, are arranged next to each other at the top of the slice data instead of the end of the slice header. Both of alf_cu_control_param( ) and sao_param( ) are arithmetic coding parameters.

Thus, arithmetic coding parameters for which arithmetic coding and arithmetic decoding are required are arranged together immediately before the data itself in the slice data. Therefore, from both the arithmetic coding parameters, processes of arithmetic coding and arithmetic decoding can be efficiently performed together on the data itself.

In addition, in the examples of FIGS. 4 and 5, examples where sao_param( ) that is a parameter of the adaptive offset filter is arranged immediately after alf_cu_control_param( ) that is a parameter of the adaptive loop filter have been illustrated. However, the present disclosure is not limited thereto. That is, the order of the arithmetic coding parameters does not matter as long as the arithmetic coding parameters are arranged at the top of the slice header or the end of slice data. Accordingly, alf_cu_control_param( ) that is a parameter of the adaptive loop filter may be arranged immediately after sao_param( ) that is a parameter of the adaptive offset filter.

In addition, in the examples of FIGS. 4 and 5, examples where the arithmetic coding parameters, for which arithmetic coding and arithmetic decoding are required, are arranged together in the slice header and the slice data have been illustrated. However, the arrangement location of the arithmetic coding parameters is not limited as long as the arrangement location is set as the syntax of the encoded stream.

[Another Example of Stream Configuration in Present Technique]

Figure 6:
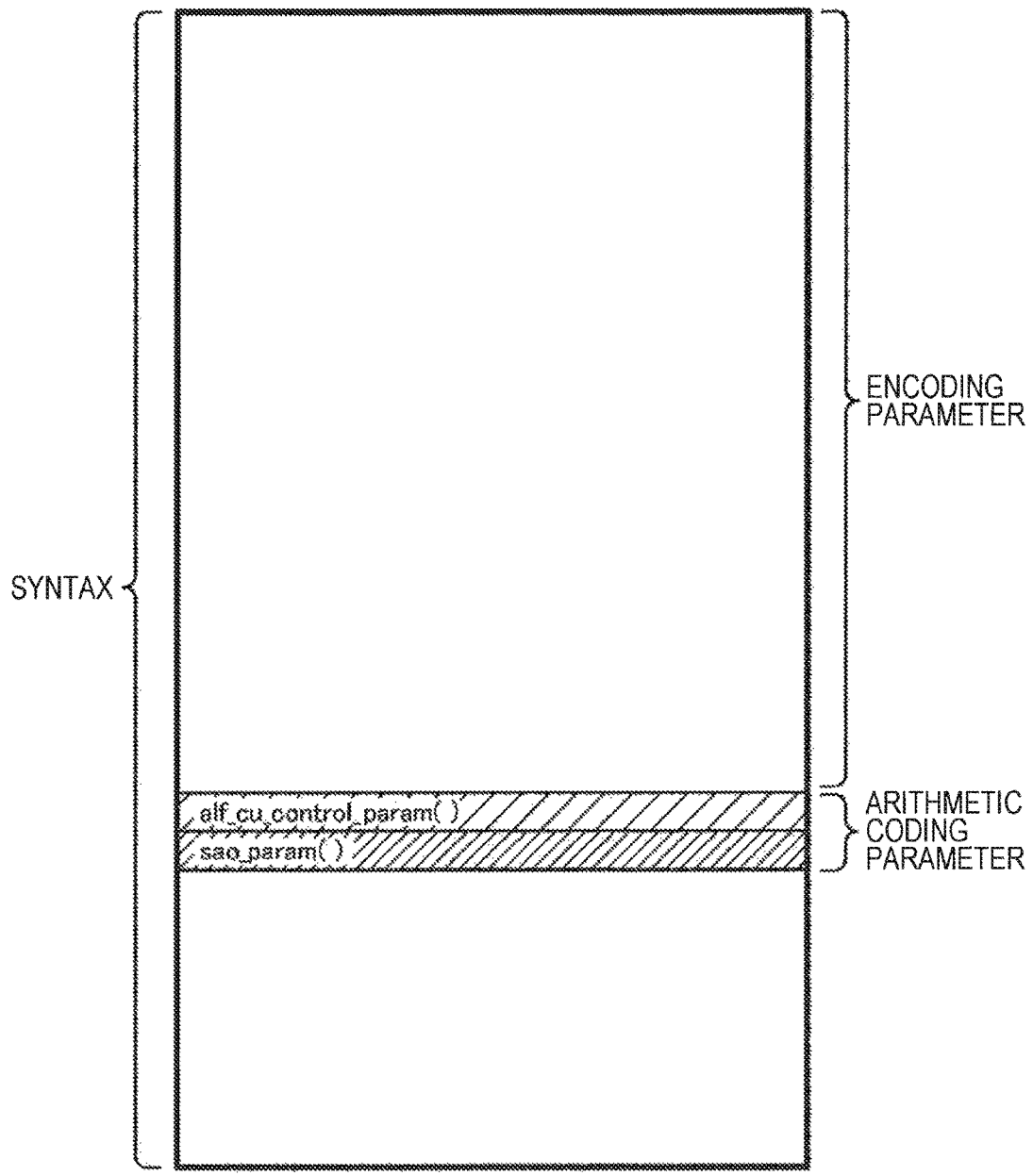
FIG. 6 is a diagram showing still another example of the stream configuration of the image encoding device.

FIG. 6 is a diagram showing an example of the configuration of a part of the syntax in the stream of the present technique.

In the syntax shown in FIG. 6, encoding parameters for performing variable length coding or fixed length coding are arranged together. In addition, in the syntax, arithmetic coding parameters including sao_param ( ) that is a parameter of the adaptive offset filter and alf_cu_control_param( ) that is a parameter of the adaptive loop filter are arranged together after the encoding parameters.

Also in the case shown in FIG. 6, since the arithmetic coding parameters for which arithmetic coding and arithmetic decoding are required are arranged together at predetermined positions of the syntax, processes of arithmetic coding and arithmetic coding can be efficiently performed together.

In addition, arithmetic coding parameters for which arithmetic coding and arithmetic decoding are required are not limited to sao_param( ) that is a parameter of the adaptive offset filter and alf_cu_control_param( ) that is a parameter of the adaptive loop filter. For example, as shown in FIG. 7, qmatrix_param( ) that is a parameter of a quantization matrix may be arranged as an arithmetic coding parameter, for which arithmetic coding and arithmetic decoding are required, together with sao_param( ) that is a parameter of the adaptive offset filter and alf_cu_control_param( ) that is a parameter of the adaptive loop filter.

Figure 7:
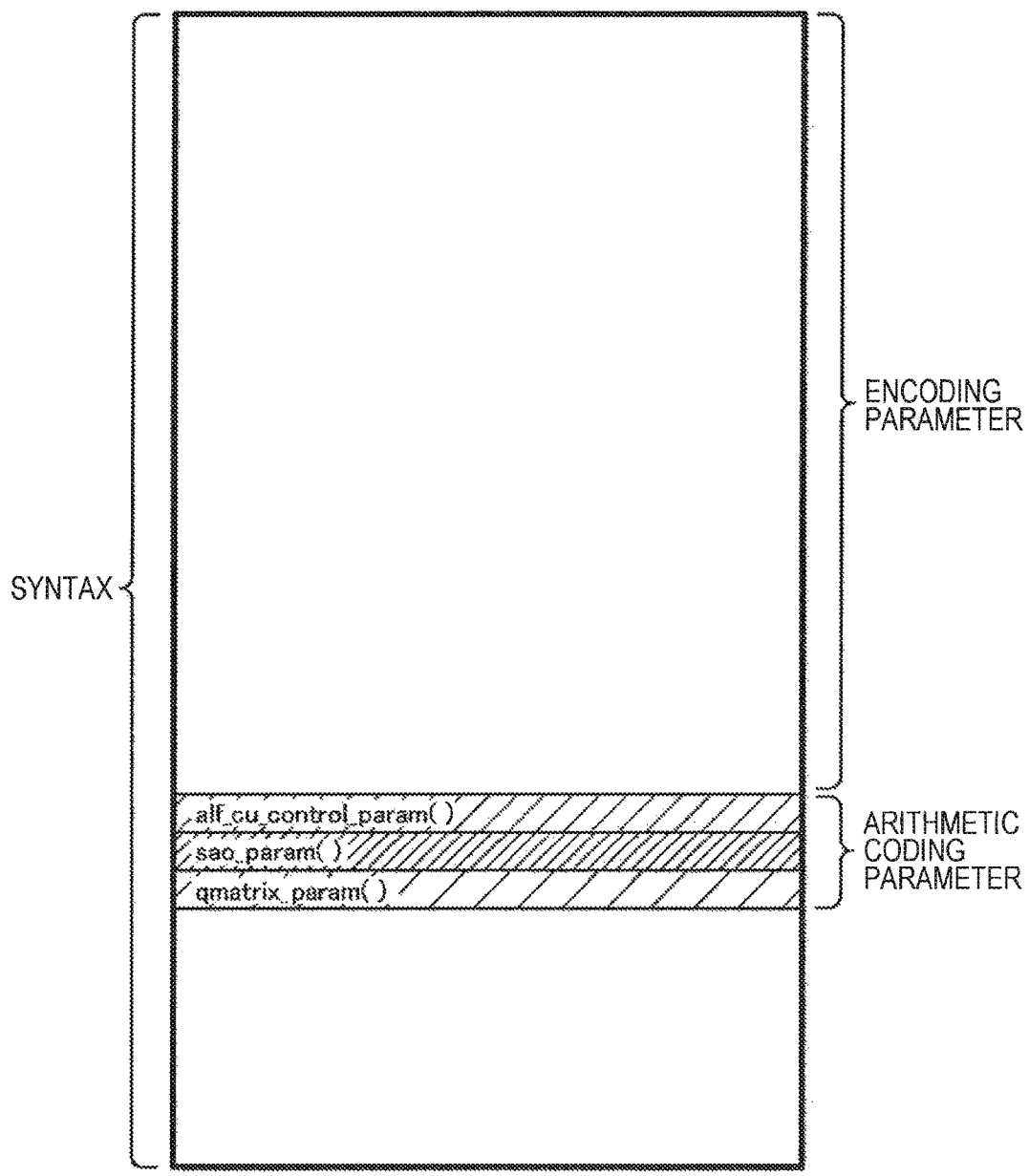
FIG. 7 is a diagram showing another example of the stream configuration of the image encoding device.

In addition, the arrangement order of the respective arithmetic coding parameters is not limited to the examples of FIGS. 6 and 7.

Here, the parameter of the adaptive loop filter, the parameter of the adaptive offset filter, and the parameter of the quantization matrix, all of which are arithmetic coding parameters for which arithmetic coding and arithmetic decoding are required, will be described in detail.

First, the adaptive loop filter is an encoding process used in the HEVC method, and is not adopted in the AVC method. The parameter of the adaptive loop filter transmitted to the decoding side is a coefficient of a two-dimensional filter and an On/Off control signal of a CU unit and is updated for each picture, and its size is large.

The adaptive loop filter transmits a two-dimensional filter, by which an encoded image becomes closest to the original image, and performs filtering, thereby improving the encoding efficiency. However, since the parameter set is very large, parameters are transmitted in the I picture having a large code amount. In contrast, in the B picture with a small code amount, a gain commensurate with the overhead to transmit the parameters may not be obtained. In this case, therefore, no parameter is transmitted.

Thus, the parameter of the adaptive loop filter changes with the code amount of each picture, and its value is changed for each picture. In addition, in the case of the parameter of the adaptive loop filter, since the value itself depends on the pattern, the same value is rarely repeatedly used.

Next, similar to the adaptive loop filter, the adaptive offset filter is an encoding process used in the HEVC method, and is not adopted in the AVC method. The parameter of the adaptive offset transmitted to the decoding side is an On/Off control signal when dividing the offset type and the picture in a certain unit and is updated for each picture, and its size is relatively large.

The adaptive offset filter is intended to give an offset to a pixel value. Since the parameter size of the adaptive offset filter is small compared with that of the adaptive loop filter, the parameter of the adaptive offset filter can be transmitted relatively for each picture.

However, since there is a characteristic in which the offset is difficult to change with a pattern, the parameter of the adaptive offset filter needs to be subjected to arithmetic coding. Since the parameter of the adaptive offset filter may be a parameter similar in each picture, it can be said that a parameter can reuse a previous parameter.

In addition, the quantization matrix is adopted in the AVC method, but the size is increased if the block size is increased. The parameter of the quantization matrix transmitted to the decoding side is a quantization matrix in units of a picture and is updated for each picture, each picture type, or each GOP, and its size is large.

A possibility that the quantization matrix does not need to be changed is high if there is no pattern change. In addition, the size of the parameter of the quantization matrix is large, but there is no option that the parameter of the quantization matrix is not transmitted.

In addition, in the parameter of the quantization matrix, different values may be used in I, B, and P pictures. In this case, the parameter of the quantization matrix is characterized in that compatibility is poor when combined with parameters changed for each picture, such as an adaptive loop filter or an adaptive offset filter.

As described above, the parameter of the adaptive loop filter, the parameter of the adaptive offset filter, and the parameter of the quantization matrix have unique characteristics, but all of the parameters need to be subjected to arithmetic coding because their sizes are large and all the parameters are transmitted for each picture or the like.

[Timing Chart of Conventional Process]

Figure 8:
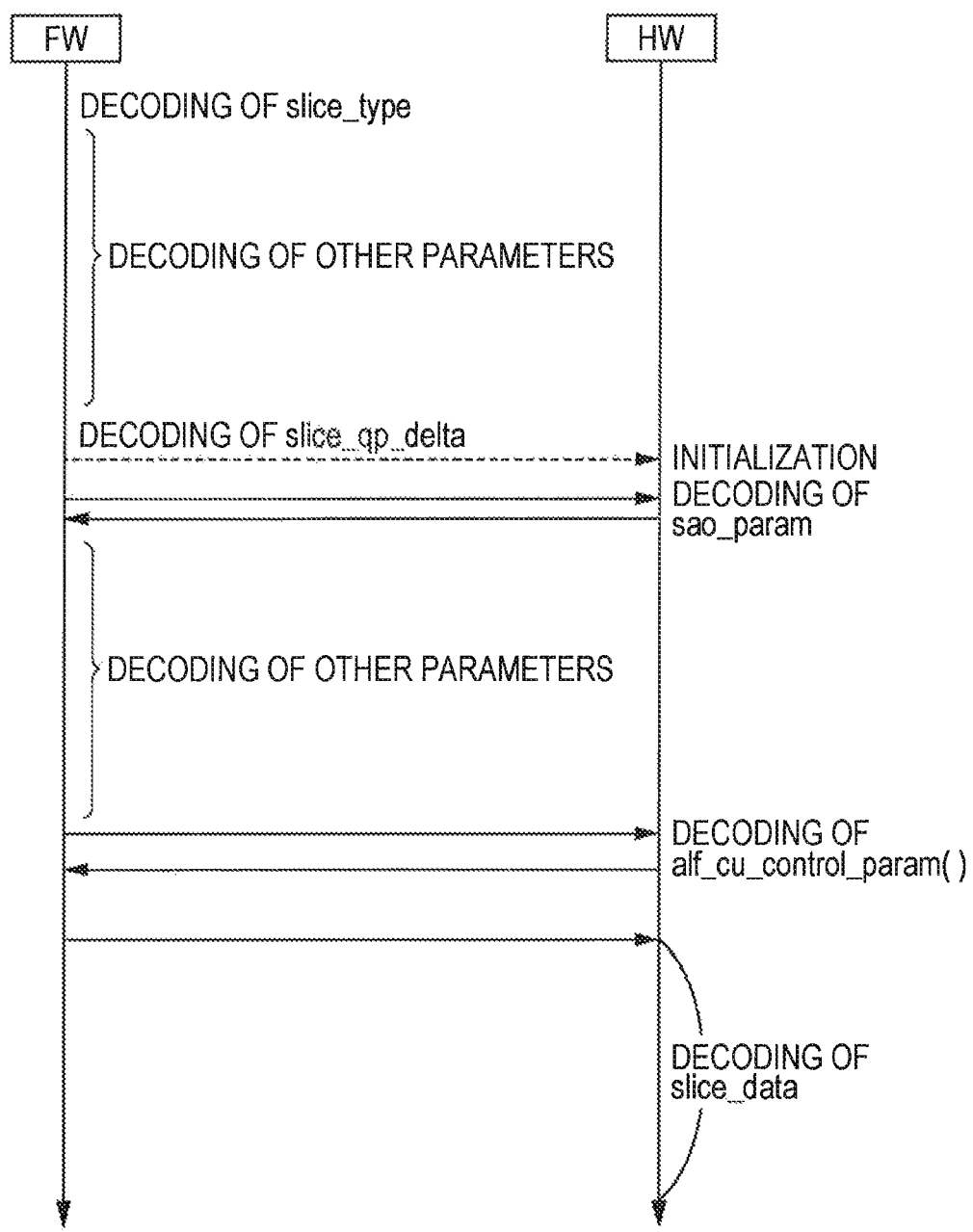
FIG. 8 is a timing chart illustrating the timing of a conventional process.

FIG. 8 is a diagram showing a timing chart when processing the conventional stream described above with reference to FIG. 3. In the example shown in FIG. 8, for example, an example of the decoding process is shown. In addition, also on the decoding side, similar to the encoding side, the decoding process is divided into firmware processing and hardware processing. The left side shows a variable length decoding process and a fixed length decoding process of FW (firmware), and the right side shows an arithmetic decoding process of HW (hardware).

First, near the top of the slice header, firmware performs variable length (or fixed length) decoding of slice_type, which is an encoding parameter and is an initialization parameter, and also performs variable length (or fixed length) decoding of other encoding parameters subsequently. Then, the firmware decodes slice_qp_delta that is an encoding parameter and is an initialization parameter, and slice_type and slice_qp_delta that are initialization parameters required for the initialization of the CABAC are finally aligned. As a result, the hardware of the CABAC is initialized.

When the end of initialization is awaited and this initialization ends, sao_param( ) that is an arithmetic coding parameter and is a parameter of the adaptive offset filter is arranged, and the firmware causes the hardware to perform arithmetic decoding of sao_param( ). When the arithmetic decoding ends, the hardware returns the decoded sao_param( ) to the firmware.

Then, the firmware performs variable length (or fixed length) decoding of other encoding parameters until just before alf_cu_control_param( ) at the end of the slice header. Since alf_cu_control_param( ) that is an arithmetic coding parameter and is a parameter of the adaptive loop filter is arranged at the end of the slice header, the firmware causes the hardware to perform arithmetic decoding of alf_cu_control_param( ). When the arithmetic decoding ends, the hardware returns the decoded alf_cu_control_param( ) to the firmware.

Then, since the slice data is to be decoded, the firmware causes the hardware to perform arithmetic decoding of the slice data.

Thus, in the conventional case, alternations of firmware and hardware are dispersed, and the waiting time due to initialization has occurred. Since adjustment, such as transmission and reception of data, and the like are required for the alternations of firmware and hardware, the efficiency of encoding and decoding processes has not been good.

[Timing Chart of Process in Present Technique]

Figure 9:
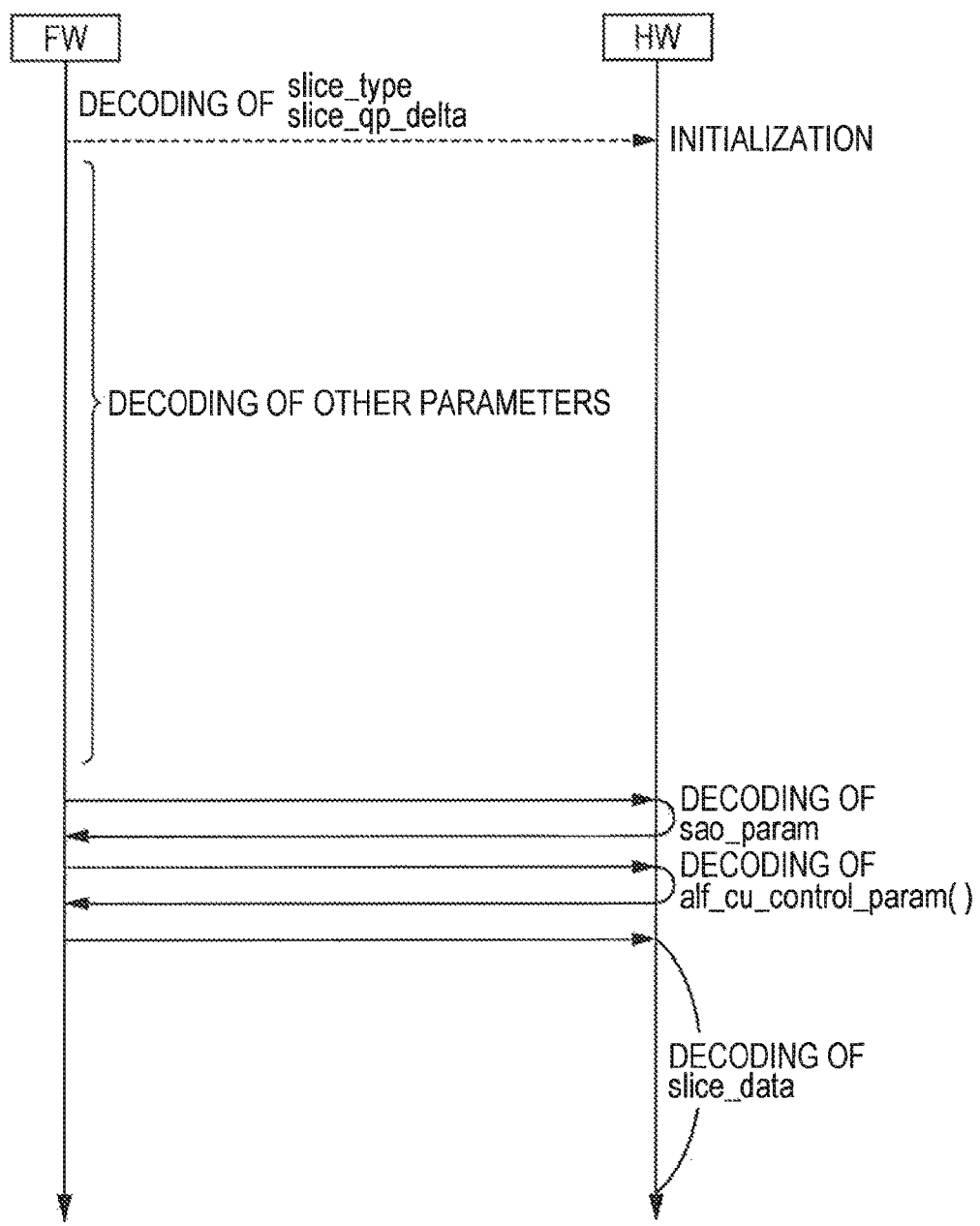
FIG. 9 is a timing chart illustrating an example of the timing of a process of an image encoding device.

FIG. 9 is a diagram showing a timing chart when processing the stream in the present technique described above with reference to FIG. 4. in the example shown in FIG. 9, for example, an example of the decoding process is shown. As will be described later with reference to FIG. 15, also on the decoding side, the decoding process is divided into firmware processing and hardware processing. The left side shows a variable length decoding process and a fixed length decoding process of FW (firmware), and the right side shows an arithmetic decoding process of HW (hardware).

First, near the top of the slice header, firmware performs variable length (or fixed length) decoding of slice_type, which is an initialization parameter, and then decodes slice_qp_delta, which is an initialization parameter. Since slice_type and slice_qp_delta, which are encoding parameters and are initialization parameters required for the initialization of CABAC, are aligned herein, it is possible to initialize the hardware of the CABAC anywhere thereafter. For example, in the example shown in FIG. 9, the hardware of the CABAC is initialized at a timing when slice_type and slice_qp_delta are aligned.

After the initialization of the hardware of the CABAC, the firmware performs variable length (or fixed length) decoding of other encoding parameters until just before alf_cu_control_param( ) at the end of the slice header.

alf_cu_control_param( ), which is an arithmetic coding parameter and is a parameter of the adaptive loop filter, and sao_param( ), which is an arithmetic coding parameter and is a parameter of the adaptive offset filter, are arranged at the end of the slice header. The firmware causes the hardware to perform arithmetic decoding of alf_cu_control_param( ). When the arithmetic decoding ends, the hardware returns the decoded alf_cu_control_param( ) to the firmware.

In addition, similarly, the firmware causes the hardware to perform arithmetic decoding of sao_param( ). When the arithmetic decoding ends, the hardware returns the decoded sao_param( ) to the firmware.

Then, since the slice data is to be decoded, the firmware causes the hardware to perform arithmetic decoding of the slice data.

As described above, since there is no waiting time for initialization and the alternations of firmware and hardware are performed together, it is possible to improve the processing efficiency of decoding. As a result, it is possible to perform the process at high speed.

In addition, although the decoding process has been described in the example shown in FIG. 9, the same effects can also be obtained for the encoding process. In addition, although an example where a command is issued for each arithmetic decoding and the result (decoded parameter) is returned to the firmware has been illustrated in the example shown in FIG. 9, the command of sao_param( ) and alf_cu_control_param( ) and the return of the result may be performed at a time.

Figure 10:
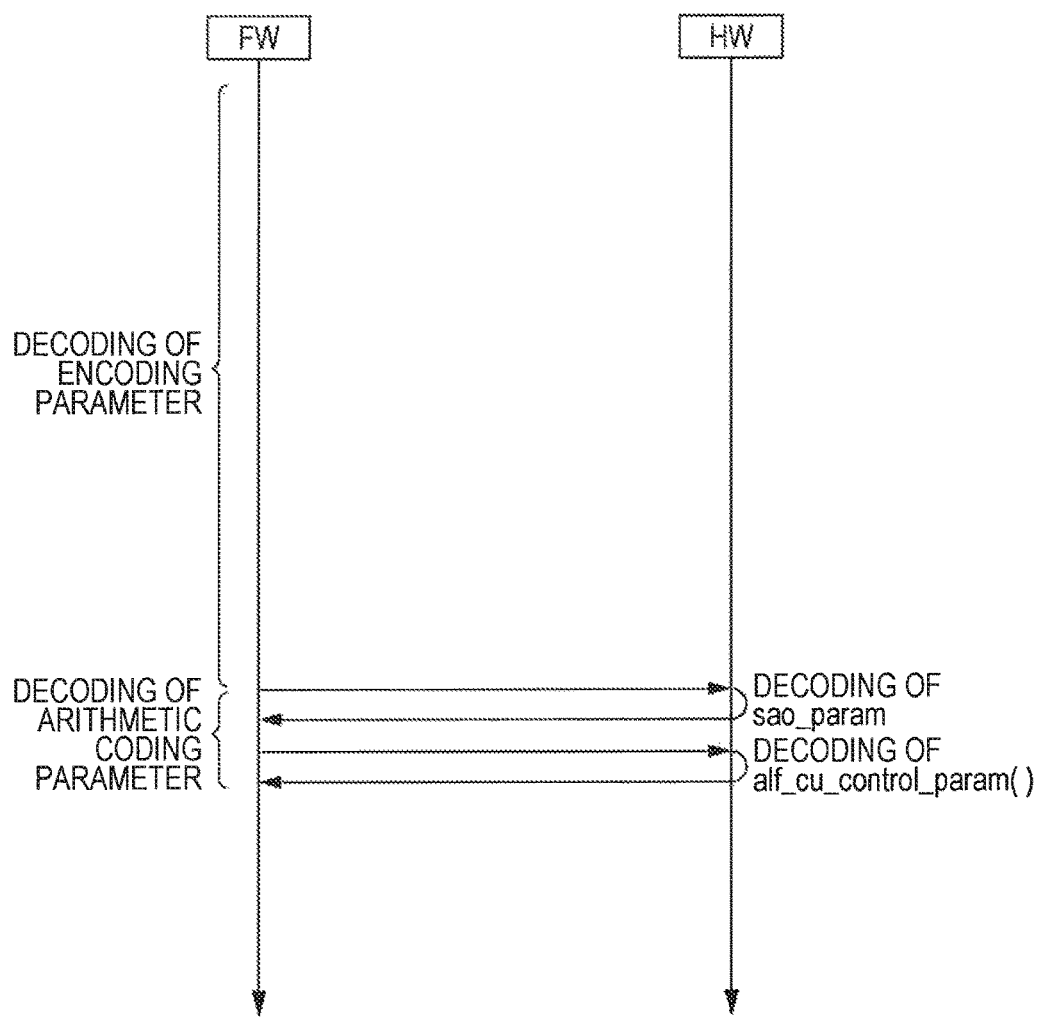
FIG. 10 is a timing chart illustrating another example of the timing of the process of the image encoding device.

FIG. 10 is a diagram showing a timing chart when processing the stream in the present technique described above with reference to FIG. 6. In the example shown in FIG. 10, for example, an example of the decoding process is shown. As will be described later with reference to FIG. 15, also on the decoding side, the decoding process is divided into firmware processing and hardware processing. The left side shows a variable length decoding process and a fixed length decoding process of FW (firmware), and the right side shows an arithmetic decoding process of HW (hardware).

In the case of the example shown in FIG. 10, in the syntax shown in FIG. 6, since encoding parameters on which variable length coding or fixed length coding is performed are arranged together, the firmware decodes the encoding parameters first.

Then, alf_cu_control_param( ), which is an arithmetic coding parameter and is a parameter of the adaptive loop filter, and sao_param( ), which is an arithmetic coding parameter and is a parameter of the adaptive offset filter, are arranged together in the syntax.

Accordingly, after the decoding of the encoding parameter by the firmware ends, the firmware causes the hardware to perform arithmetic decoding of alf_cu_control_param( ). When the arithmetic decoding ends, the hardware returns the decoded alf_cu_control_param( ) to the firmware. In addition, the firmware causes the hardware to perform arithmetic decoding of sao_param( ). When the arithmetic decoding ends, the hardware returns the decoded sao_param( ) to the firmware.

That is, the hardware decodes the arithmetic coding parameters collectively.

Figure 11:
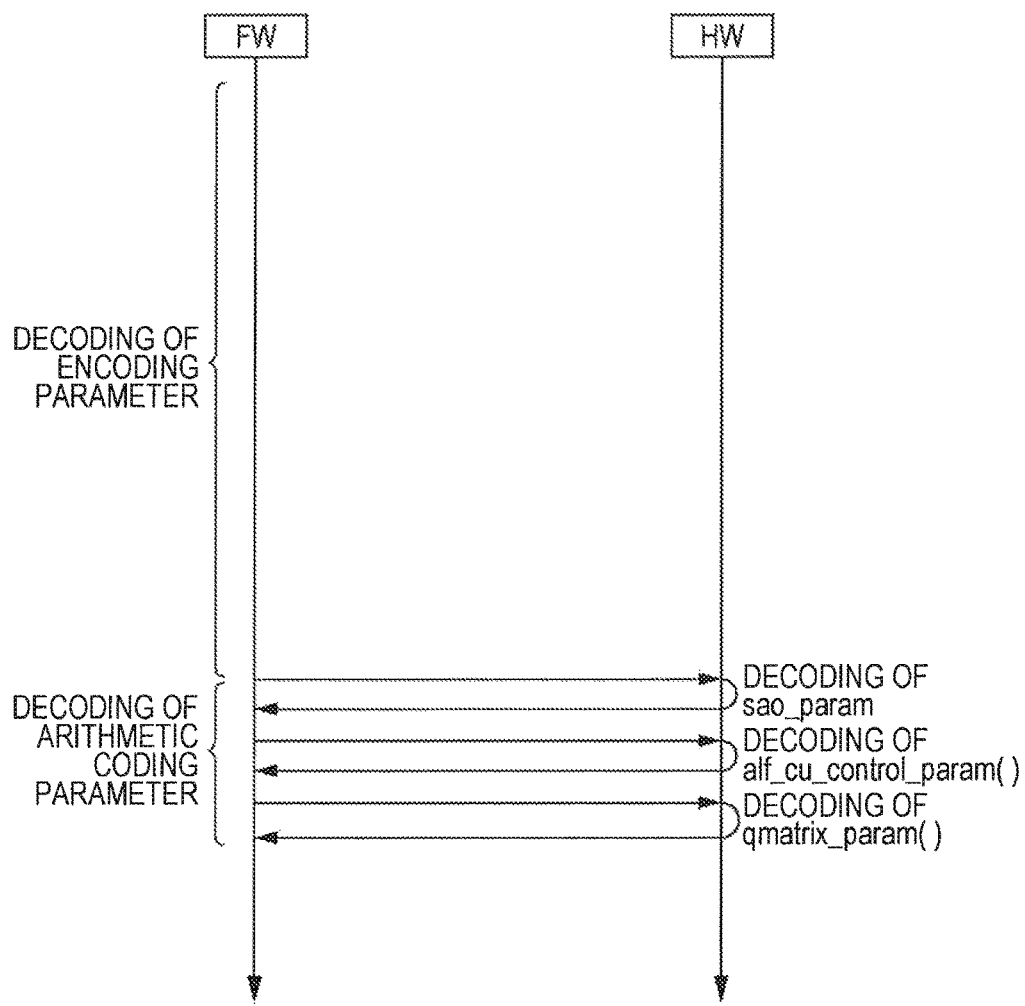
FIG. 11 is a timing chart illustrating another example of the timing of the process of the image encoding device.

FIG. 11 is a diagram showing a timing chart when processing the stream in the present technique described above with reference to FIG. 7. The same is true for the syntax shown in FIG. 7. That is, in the case of the example shown in FIG. 11, in the syntax shown in FIG. 7, since encoding parameters on which variable length coding or fixed length coding is performed are arranged together, the firmware decodes the encoding parameters first.

Then, alf_cu_control_param( ) that is a parameter of the adaptive loop filter, sao_param( ) that is a parameter of the adaptive offset filter, and qmatrix_param( ) that is a quantization matrix parameter are arranged together in the syntax. All parameters of alf_cu_control_param ( ), sao_param( ), and qmatrix_param( ) are arithmetic coding parameters.

Accordingly, after the decoding of the encoding parameter by the firmware ends, the firmware causes the hardware to perform arithmetic decoding of alf_cu_control_param( ). When the arithmetic decoding ends, the hardware returns the decoded alf_cu_control_param( ) to the firmware. In addition, the firmware causes the hardware to perform arithmetic decoding of sao_param( ). When the arithmetic decoding ends, the hardware returns the decoded sao_param( ) to the firmware. In addition, the firmware causes the hardware to perform arithmetic decoding of qmatrix_param( ) that is a quantization matrix parameter. When the arithmetic decoding ends, the hardware returns the decoded qmatrix_param( ) to the firmware.

That is, the hardware decodes the arithmetic coding parameters collectively.

As described above, also in the cases of the examples of FIGS. 10 and 11, encoding parameters arranged together in the syntax are subjected to a variable length (fixed length) decoding process together. Similarly, arithmetic coding parameters arranged together in the syntax are subjected to an arithmetic decoding process together. Accordingly, since the alternations of firmware and hardware are performed together, it is possible to improve the processing efficiency of decoding. As a result, it is possible to perform the process at high speed.

Here, arranging arithmetic coding parameters together (next to each other) is to arrange the syntax of arithmetic coding parameters such that the alternations of processes are performed together in firmware (FW) processing and hardware (HW) processing. That is, arranging arithmetic coding parameters (for example, alf_cu_control_param( )/sao_param ( )) together (next to each other) means a state where no encoding parameter, on which variable length (or fixed length) coding and decoding are performed, is arranged between arithmetic coding parameters, on which arithmetic coding or arithmetic decoding is performed, as shown in FIGS. 6 and 7 and the like.

Similarly, arranging encoding parameters, on which variable length (or fixed length) coding and decoding are performed, together (next to each other) is to arrange the syntax of encoding parameters, on which variable length (or fixed length) coding and decoding are performed, such that the alternations of processes are performed together in firmware (FW) processing and hardware (HW) processing. That is, arranging encoding parameters together (next to each other) means a state where no arithmetic coding parameter, on which arithmetic coding and decoding are performed, is arranged between encoding parameters, on which variable length (or fixed length) coding or variable length (or fixed length) decoding is performed.

Accordingly, since the processes of arithmetic coding and decoding, variable length (fixed length) coding, and variable length (fixed length) decoding are intensively performed when encoding and decoding the encoding parameters, it is possible to shorten the delay of the encoding process and the decoding process.

[Flow of Entire Encoding Process]

Next, flows of processes performed by the image encoding device 100 as described above will be described. First, an example of the flow of the entire encoding process of the image encoding device 100 will be described with reference to the flowchart of FIG. 12.

In step S101, the A/D converter 101 performs A/D conversion on an input image. In step S102, the frame reordering buffer 102 stores the image obtained by the A/D conversion and reorders respective pictures from display order into encoding order.

When the image to be processed, which is supplied from the frame reordering buffer 102, is an image of a block subjected to intra processing, a decoded image to be referred to is read from the frame memory 112 and is supplied to the intra prediction unit 114 through the selector 113.

In step S103, based on these images, the intra prediction unit 114 performs intra prediction of pixels of the block to be processed in all the candidate intra prediction modes. in addition, as a decoded pixel to be referred to, a pixel that is not filtered by the deblocking filter 111, the adaptive offset unit 121, and the adaptive loop filter 122 is used.

In this intra prediction operation, intra predictions are performed in all the candidate intra prediction modes, and cost function values are calculated in all the candidate intra prediction modes. Then, the optimal intra prediction mode is selected based on the calculated cost function values, and a predicted image generated by intra prediction in the optimal intra prediction mode and the cost function value are supplied to the predicted image selector 116.

When the image to be processed, which is supplied from the frame reordering buffer 102, is an inter-processed image, an image to be referred to is read from the frame memory 112 and is supplied to the motion estimator/compensator 115 through the selector 113. In step S104, the motion estimator/compensator 115 performs motion estimation/compensation processing based on these images.

By this processing, motion estimation processing is performed in all the candidate inter prediction modes, and cost function values are calculated in all the candidate inter prediction modes. Based on the calculated cost function values, an optimal inter prediction mode is determined. Then, a predicted image generated in the optimal inter prediction mode and the cost function value are supplied to the predicted image selector 116.

In step S105, the predicted image selector 116 determines one of the optimal intra prediction mode and the optimal inter prediction mode as an optimal prediction mode based on the respective cost function values output from the intra prediction unit 114 and the motion estimator/compensator 115. Then, the predicted image selector 116 selects the predicted image in the determined optimal prediction mode, and supplies it to the arithmetic operation units 103 and 110. The predicted image is used in the operations of steps S106 and S111 to be described later.

In addition, the selection information of the predicted image is supplied to the intra prediction unit 114 or the motion estimator/compensator 115. When the predicted image in the optimal intra prediction mode is selected, the intra prediction unit 114 supplies information indicating the optimal intra prediction mode (that is, a parameter regarding intra prediction) to the lossless encoder 106.

When the predicted image in the optimal inter prediction mode is selected, the motion estimator/compensator 115 outputs information indicating the optimal inter prediction mode and information corresponding to the optimal inter prediction mode (that is, a parameter regarding motion prediction) to the lossless encoder 106. As the information corresponding to the optimal inter prediction mode, motion vector information, reference frame information, and the like can be mentioned.

In step S106, the arithmetic operation unit 103 calculates a difference between the image reordered in step S102 and the predicted image selected in step S105. The predicted image is supplied from the motion estimator/compensator 115 to the arithmetic operation unit 103 through the predicted image selector 116 in the case of inter prediction, and from the intra prediction unit 114 to the arithmetic operation unit 103 through the predicted image selector 116 in the case of intra prediction.

The data amount of difference data is small compared with that of the original image data. Accordingly, the data amount can be made smaller as compared to a case in which images are directly encoded.

In step S107, the orthogonal transform unit 104 performs an orthogonal transform of the difference information supplied from the arithmetic operation unit 103. Specifically, orthogonal transform such as discrete cosine transform or Karhunen-Loeve transform is performed and a transform coefficient is output.

In step S108, the quantizer 105 quantizes a transform coefficient. Upon this quantization, as will be described in the processing of step S118 later, the rate is controlled.

The difference information quantized as described above is locally decoded as follows. That is, in step S109, the inverse quantizer 108 performs inverse quantization of the transform coefficient quantized by the quantizer 105 in the characteristics corresponding to the characteristics of the quantizer 105. In step S110, the inverse orthogonal transform unit 109 performs an inverse orthogonal transform of the transform coefficient, which has been inversely quantized by the inverse quantizer 108, in the characteristics corresponding to the characteristics of the orthogonal transform unit 104.

In step S111, the arithmetic operation unit 110 generates a locally decoded image (image corresponding to the input to the arithmetic operation unit 103) by adding the predicted image input through the predicted image selector 116 to the locally decoded difference information.

In step S112, the deblocking filter 111 performs deblocking filtering on the image output from the arithmetic operation unit 110. As a result, block distortion is removed. The decoded image from the deblocking filter 111 is output to the adaptive offset unit 121.

In step S113, the adaptive offset unit 121 performs adaptive offset processing. That is, the adaptive offset unit 121 determines a quad-tree structure based on the decoded image from the deblocking filter 111, and calculates an offset value of the region that is quad-tree divided. The adaptive offset unit 121 performs offset filtering on the region that is quad-tree divided, and supplies a pixel value after offset processing to the adaptive loop filter 122.

The adaptive offset unit 121 supplies the quad-tree structure and the offset value to the lossless encoder 106 as parameters of the adaptive offset filter.

In step S114, the adaptive loop filter 122 calculates an adaptive filter coefficient, and performs adaptive loop filtering on the pixel value after offset processing using the calculated adaptive filter coefficient. The pixel value after adaptive filtering is output to the frame memory 112.

The adaptive loop filter 122 supplies the calculated adaptive filter coefficient to the lossless encoder 106 as a parameter of the adaptive loop filter.

In step S115, the frame memory 112 stores the filtered image. In addition, images not filtered by the deblocking filter 111, the adaptive offset unit 121, and the adaptive loop filter 122 are also supplied from the arithmetic operation unit 110 to the frame memory 112 and are stored.

On the other hand, the transform coefficient quantized in step S108 described above is also supplied to the lossless encoder 106. In step S116, the lossless encoder 106 encodes the quantized transform coefficient output from the quantizer 105 and each supplied parameter. That is, a difference image is compressed by lossless encoding, such as variable length coding or arithmetic coding.

Figure 13:
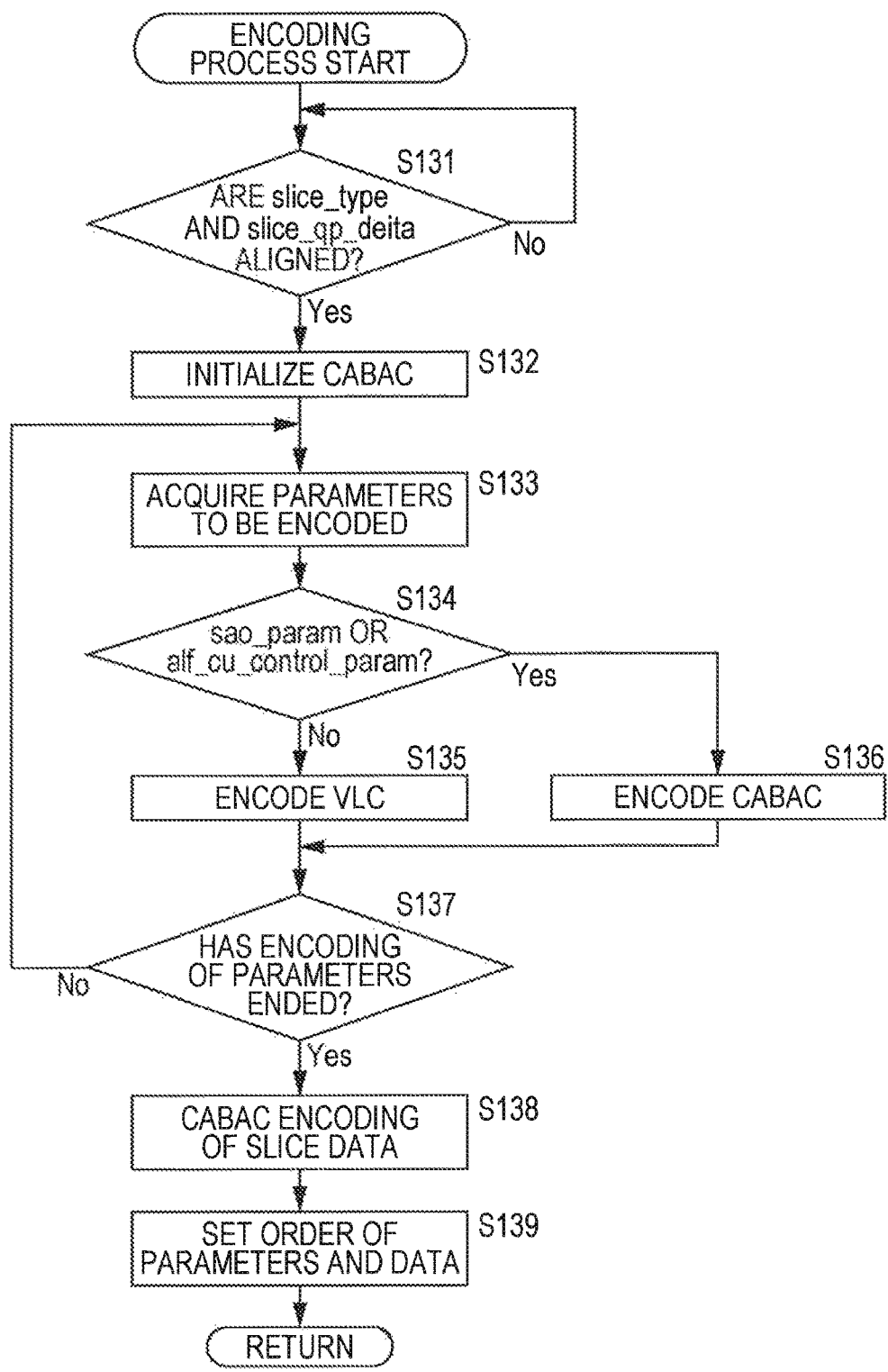
FIG. 13 is a flowchart illustrating an example of the flow of an encoding process of a lossless encoder.

Although the details of the encoding process will be described later with reference to FIG. 13, encoding parameters other than arithmetic coding parameters to control the encoding process in units of a slice or a picture, among the supplied parameters, are subjected to variable length (or fixed length) coding and are added to the header in predetermined order. On the other hand, among the supplied parameters, arithmetic coding parameters to control the encoding process in units of a slice or a picture are subjected to arithmetic coding and are added to the end of the slice header or the top of the slice data.

In step S117, the accumulation buffer 107 stores the encoded difference image (that is, an encoded stream) as a compressed image. The compressed image stored in the accumulation buffer 107 is appropriately read and is transmitted to the decoding side through the transmission path.

In step S118, the rate controller 117 controls the quantization operation rate of the quantizer 105 based on the compressed image stored in the accumulation buffer 107 such that overflow or underflow does not occur.

The encoded process is terminated when the processing in step S118 ends.

[Flow of Encoding Process]

Figure 12:
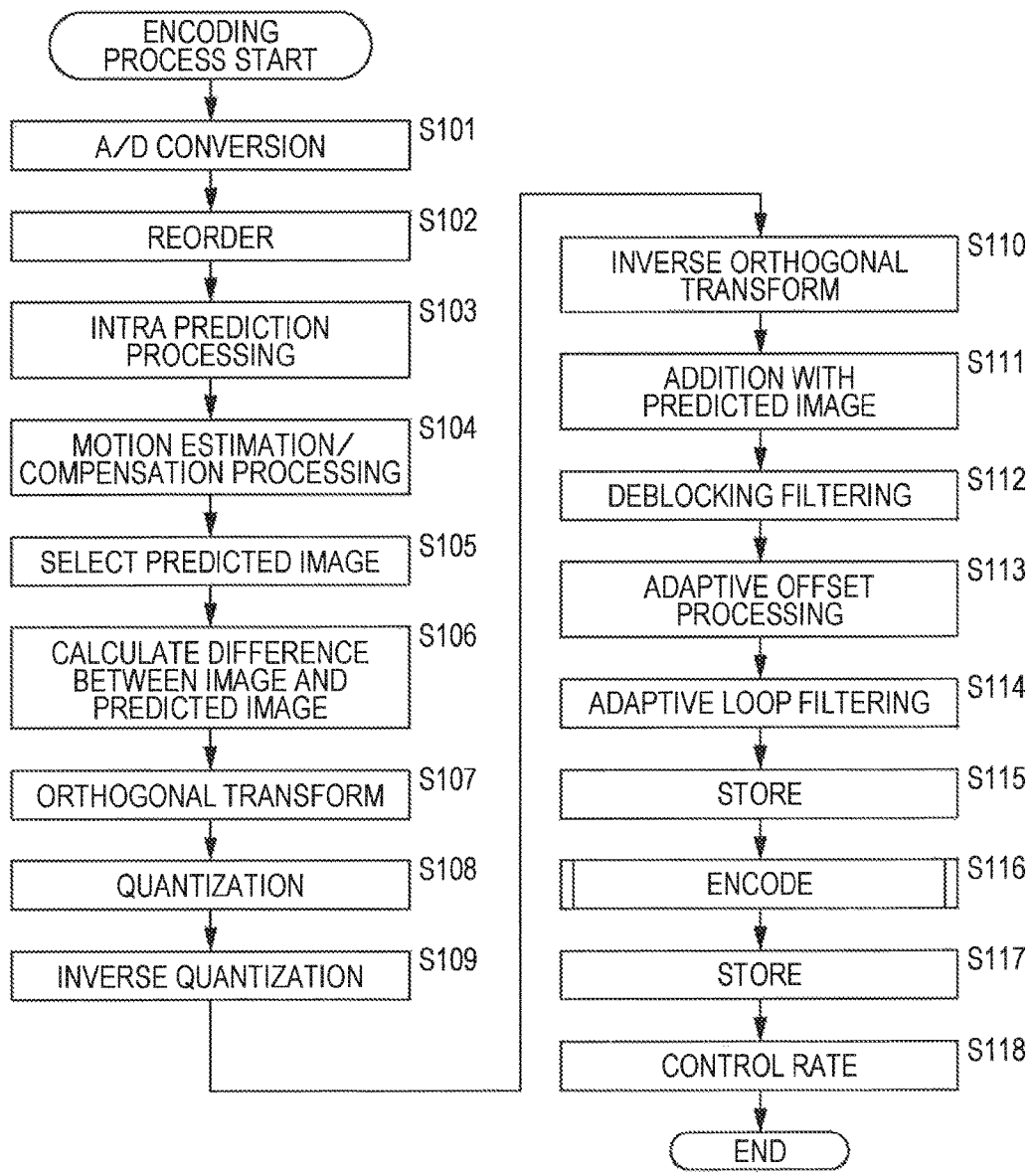
FIG. 12 is a flowchart illustrating an example of the flow of the entire encoding process.

Next, an example of the flow of the encoding process of the lossless encoder 106 executed in step S116 of FIG. 12 will be described with reference to the flowchart of FIG. 13.

Various parameters are supplied from the respective units of the image encoding device 100 to the VLC encoder 131. For example, the intra prediction unit 114 supplies a parameter regarding intra prediction, such as information indicating the intra prediction mode, to the VLC encoder 131. For example, the motion estimator/compensator 115 supplies a parameter regarding motion prediction, such as information indicating the inter prediction mode, motion vector information, reference frame information, and flag information, to the VLC encoder 131.

For example, the adaptive offset unit 121 supplies a parameter regarding an adaptive offset filter, such as a quad-tree structure or an offset value, to the VLC encoder 131. For example, the adaptive loop filter 122 supplies a parameter regarding an adaptive loop filter, such as an adaptive loop filter coefficient, to the VLC encoder 131. In addition, although not shown, slice_type or slice_qp_delta is supplied, and a quantization parameter from the quantizer 105 and the like are also supplied.

In addition, the quantizer 105 also supplies the quantized transform coefficient to the VLC encoder 131.

In step S131, the VLC encoder 131 waits until slice_type and slice_qp_delta, which are initialization parameters required for the initialization of the CABAC, are aligned in the supplied parameters. When it is determined that slice_type and slice_qp_delta are aligned in step S131, the VLC encoder 131 supplies the parameters of slice_type and slice_qp_delta to the CABAC encoder 134 and notifies the encoding controller 132 of the supply of the parameters to the CABAC encoder 134.

In response to this, the encoding controller 132 causes the CABAC encoder 134 to perform initialization in step S132. When the initialization ends, the CABAC encoder 134 notifies the encoding controller 132 of the end of initialization. Thereafter, CABAC encoding can be performed at any timing.

In step S133, the VLC encoder 131 acquires a parameter to be encoded from the supplied parameters. In step S133, the VLC encoder 131 determines whether the acquired parameter is sao_param( ), which is a parameter of the adaptive offset filter, or alf_cu_control_param( ), which is a parameter of the adaptive loop filter. That is, in step S133, it is determined whether or not the acquired parameter is an arithmetic coding parameter.

When it is determined that the acquired parameter is neither sao_param( ), which is a parameter of the adaptive offset filter, nor alf_cu_control_param( ), which is a parameter of the adaptive loop filter (that is, when it is determined that the acquired parameter is not an arithmetic coding parameter) in step S134, the process proceeds to step S135.

In step S135, the VLC encoder 131 performs VLC encoding (variable length coding or fixed length coding) of the parameter acquired in step S133. The VLC encoder 131 supplies the encoded encoding parameter to the setting unit 133.

When it is determined that the acquired parameter is sao_param( ), which is a parameter of the adaptive offset filter, or alf_cu_control_param( ), which is a parameter of the adaptive loop filter (that is, when it is determined that the acquired parameter is an arithmetic coding parameter) in step S134, the process proceeds to step S136. The VLC encoder 131 supplies the parameter acquired in step S133 to the CABAC encoder 134 and notifies the encoding controller 132 of the supply of the parameter to the CABAC encoder 134.

In step S136, the CABAC encoder 134 performs CABAC encoding (arithmetic coding) of the parameter acquired in step S133 under the control of the encoding controller 132. That is, the parameter subjected to arithmetic coding herein is an arithmetic coding parameter, and is the parameter sao_param( ) of the adaptive offset filter or the parameter alf_cu_control_param( ) of the adaptive loop filter. The CABAC encoder 134 supplies the encoded arithmetic coding parameter to the setting unit 133 and notifies the encoding controller 132 of the end of encoding. The encoding controller 132 notifies the VLC encoder 131 of the end.

In step S137, the VLC encoder 131 determines whether or not the encoding of all parameters has ended. When it is determined that the encoding of all parameters has not ended yet, the process returns to step S133 and the subsequent process is repeated.

When it is determined that the encoding of all parameters has ended in step S137, the process proceeds to step S138. The VLC encoder 131 supplies the transform coefficient from the quantizer 105 to the CABAC encoder 134 and notifies the encoding controller 132 of t In step 2138, the CABAC encoder 134 performs CABAC encoding (arithmetic coding) of the data (transform coefficient) under the control of the encoding controller 132, and supplies the encoded data to the setting unit 133 and notifies the encoding controller 132 of the end of encoding.

The encoding parameter encoded by the VLC encoder 131, the arithmetic coding parameter encoded by the CABAC encoder 134, or the data encoded by the CABAC encoder 134 is supplied to the setting unit 133. In step S139, the setting unit 133 sets and arranges the encoded parameter and the encoded data in order shown in FIG. 4 or 5 to generate the slice header and slice data.

The setting unit 133 supplies the generated slice header and slice data to the accumulation buffer 107. After processing of step S139, the process returns to step S116 of FIG. 12.

As described above, it is possible to increase the speed of the encoding process by arranging the arithmetic coding parameters to control the encoding process in units of a slice or a picture at the end of the slice header or the top of the slice data.

<2. Second Embodiment>
[Image Decoding Device]

Figure 14:
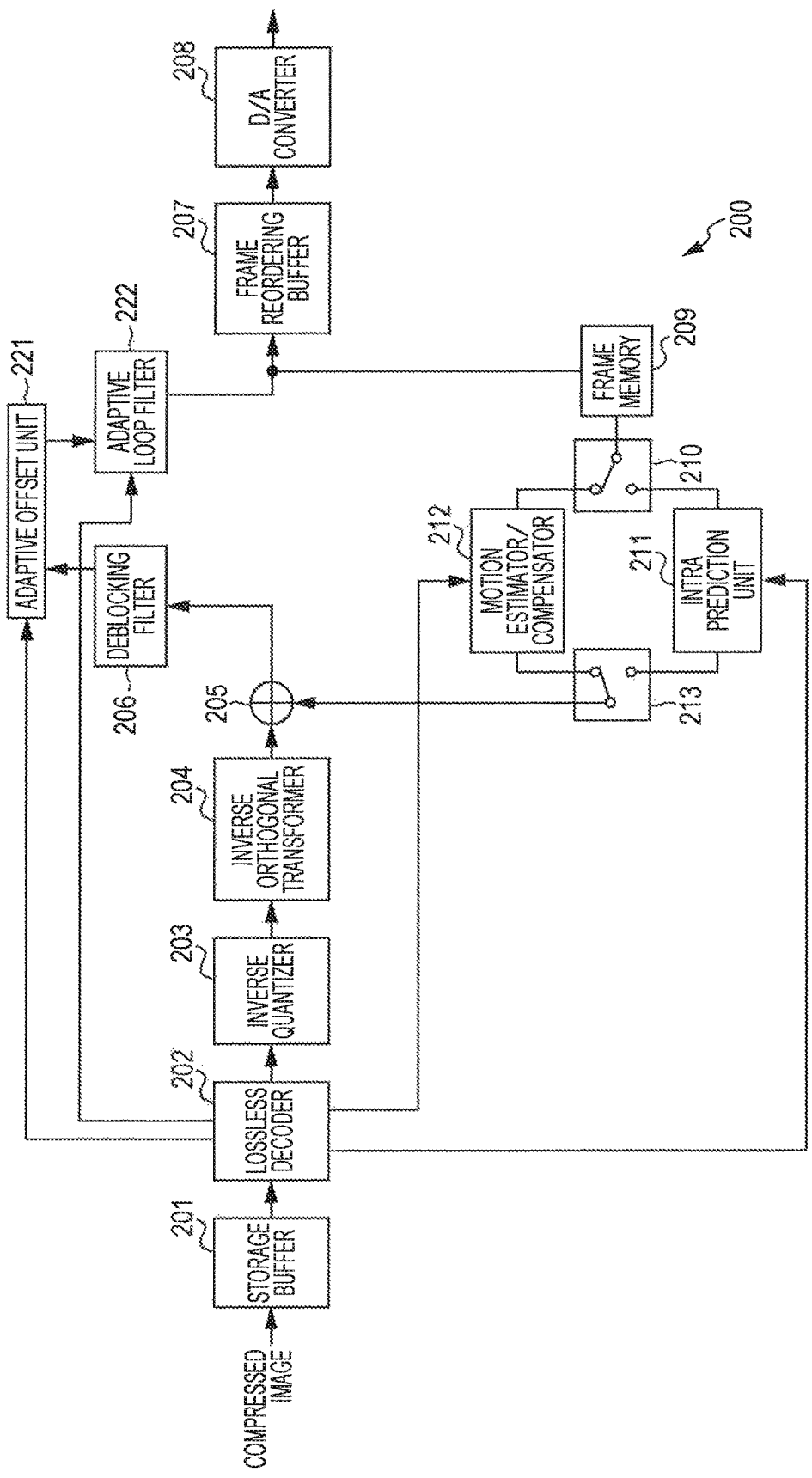
FIG. 14 is a block diagram showing a typical example structure of an image decoding device.

FIG. 14 shows the configuration of one embodiment of an image decoding device as the image processing device to which the present disclosure is applied. An image decoding device 200 shown in FIG. 14 is a decoding device corresponding to the image encoding device 100 shown in FIG. 1.

It is assumed that encoded data encoded by the image encoding device 100 is transmitted to the image decoding device 200 corresponding to the image encoding device 100 through a predetermined transmission path and is decoded.

As shown in FIG. 14, the image decoding device 200 includes a storage buffer 201, a lossless decoder 202, an inverse quantizer 203, an inverse orthogonal transform unit 204, an arithmetic operation unit 205, a deblocking filter 206, a frame reordering buffer 207, and a D/A converter 208. The image decoding device 200 also includes a frame memory 209, a selector 210, an intra prediction unit 211, a motion estimator/compensator 212, and a selector 213.

In addition, the image decoding device 200 includes an adaptive offset unit 221 and an adaptive loop filter 222.

The storage buffer 201 stores transmitted encoded data. The encoded data has been encoded by the image encoding device 100. The lossless decoder 202 decodes the encoded data read from the storage buffer 201 at a predetermined timing using a method corresponding to the encoding method of the lossless encoder 106 shown in FIG. 1. The lossless decoder 202 decodes the encoded data in order of the slice header and slice data.

That is, for arithmetic coding parameters to control the decoding process in units of a slice or a picture among the parameters from the encoding side, the lossless decoder 202 performs arithmetic decoding since the arithmetic coding parameters have been subjected to arithmetic coding. For other encoding parameters, the lossless decoder 202 performs variable length decoding or fixed length decoding since the other encoding parameters have been subjected to fixed length coding or variable length coding.

The lossless decoder 202 supplies a parameter, such as information indicating the decoded intra prediction mode, to an intra prediction unit 211, and supplies a parameter, such as information indicating the inter prediction mode or motion vector information, to a motion estimator/compensator 212. The lossless decoder 202 supplies a parameter of an adaptive offset filter to the adaptive offset unit 221, and supplies a parameter of an adaptive loop filter to the adaptive loop filter 222.

The inverse quantizer 203 performs inverse quantization of coefficient data (quantization coefficient), which is obtained by decoding of the lossless decoder 202, in a method corresponding to the quantization method of the quantizer 105 shown in FIG. 1. That is, the inverse quantizer 203 performs inverse quantization of the quantization coefficient in the same method as the inverse quantizer 108 shown in FIG. 1 using the quantization parameter supplied from the image encoding device 100.

The inverse quantizer 203 supplies the inverse-quantized coefficient data, that is, an orthogonal transform coefficient, to the inverse orthogonal transform unit 204. The inverse orthogonal transform unit 204 performs an inverse orthogonal transform of the orthogonal transform coefficient in a method corresponding to the orthogonal transform method of the orthogonal transform unit 104 shown in FIG. 1, thereby obtaining decoded residual data corresponding to residual data before the orthogonal transform in the image encoding device 100.

The decoded residual data obtained by the inverse orthogonal conversion is supplied to the arithmetic operation unit 205. In addition, a predicted image is supplied to the arithmetic operation unit 205 from the intra prediction unit 211 or the motion estimator/compensator 212 via the selector 213.

The arithmetic operation unit 205 adds the decoded residual data and the predicted image to obtain decoded image data corresponding to image data before the predicted image is subtracted by the arithmetic operation unit 103 in the image encoding device 100. The arithmetic operation unit 205 supplies the decoded image data to the deblocking filter 206.

The deblocking filter 206 is configured in basically the same manner as the deblocking filter 111 of the image encoding device 100. The deblocking filter 206 removes block distortion of the decoded image by appropriately performing deblocking filtering. The deblocking filter 206 supplies the filtering result to the adaptive offset unit 221.

The frame reordering buffer 207 performs image reordering. Specifically, the frames reordered into the encoding order by the frame reordering buffer 102 in FIG. 1 are reordered into the original display order. The D/A converter 208 performs a D/A conversion on the image supplied from the frame reordering buffer 207, and outputs the converted image to a display (not shown) to display the image.

The output of the deblocking filter 206 is further supplied to a frame memory 209.

The frame memory 209, a selector 210, the intra prediction unit 211, the motion estimator/compensator 212, and a selector 213 correspond to the frame memory 112, the selector 113, the intra prediction unit 114, the motion estimator/compensator 115, and the predicted image selector 116 of the image encoding device 100, respectively.

The selector 210 reads an inter-processed image and an image, which is to be referred to, from the frame memory 209 and supplies these images to the motion estimator/compensator 212. In addition, the selector 210 reads an image used for intra prediction from the frame memory 209 and supplies the image to the intra prediction unit 211.

The intra prediction unit 211 is supplied, as necessary, with information indication the intra prediction mode or the like obtained by decoding header information from the lossless decoder 202. Based on the information, the intra prediction unit 211 generates a predicted image from the reference image acquired from the frame memory 209, and supplies the generated predicted image to the selector 213.

Information obtained by decoding the header information (prediction mode information, motion vector information, reference frame information, a flag, various parameters, and the like) is supplied from the lossless decoder 202 to the motion estimator/compensator 212.

Based on the information supplied from the lossless decoder 202, the motion estimator/compensator 212 generates a predicted image from the reference image acquired from the frame memory 209, and supplies the generated predicted image to the selector 213.

The selector 213 selects the predicted image generated by the motion estimator/compensator 212 or the intra prediction unit 211, and supplies the selected predicted image to the arithmetic operation unit 205.

A quad-tree structure and an offset value, which are adaptive offset parameters from the lossless decoder 202, are supplied to the adaptive offset unit 221. The adaptive offset unit 221 performs offset filtering on the pixel value of the decoded image from the deblocking filter 206 using the information. The adaptive offset unit 221 supplies the image after offset processing to the adaptive loop filter 222.

The adaptive loop filter 222 performs filtering on the decoded image from the adaptive offset unit 221 using the adaptive filter coefficient that is a parameter of the adaptive loop filter supplied from the lossless decoder 202. As this filter, for example, a Wiener filter is used. The adaptive loop filter 222 supplies the image after filtering to the frame reordering buffer 207 and the frame memory 209.

[Example of Configuration of Lossless Decoder]

Figure 15:
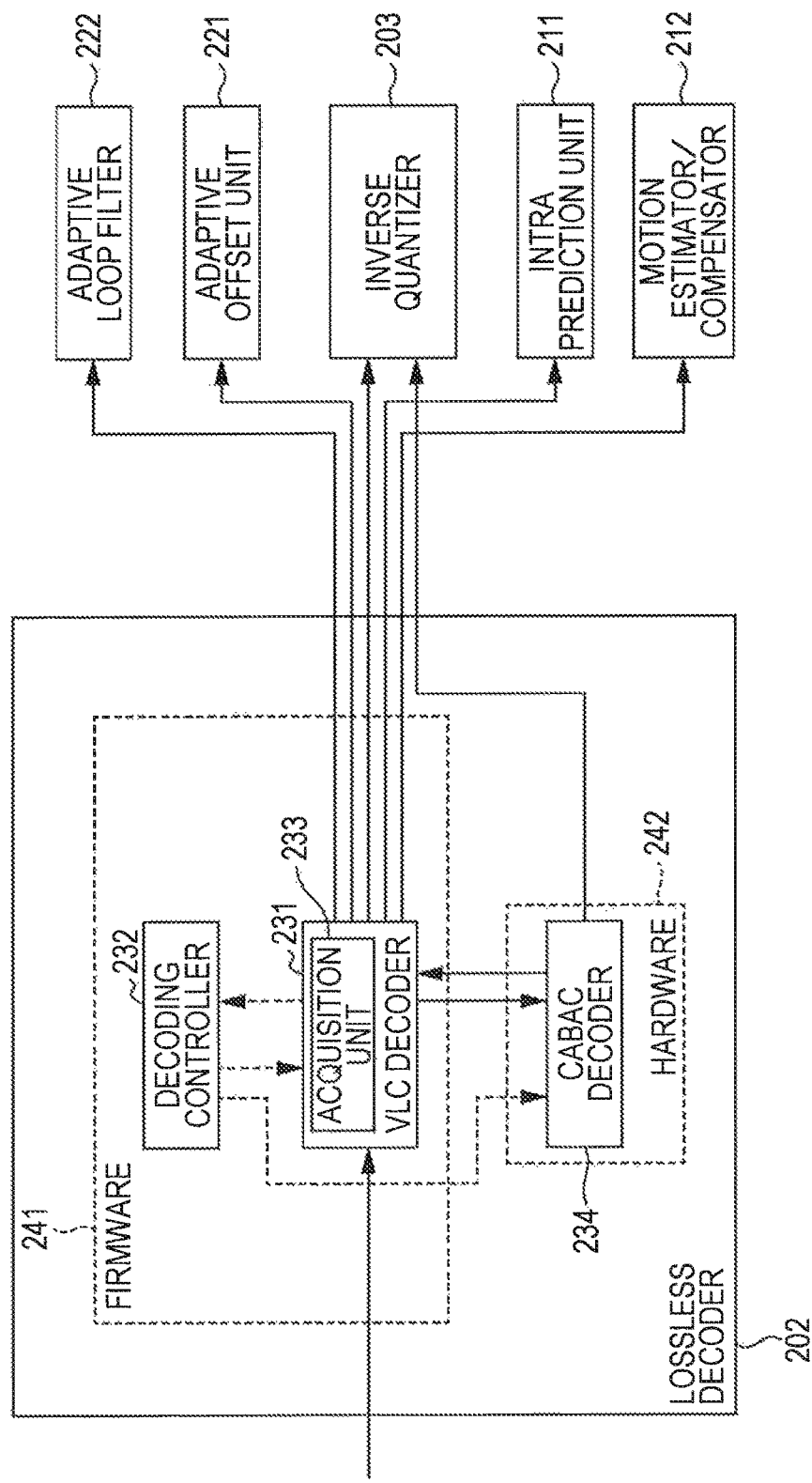
FIG. 15 is a block diagram showing an example of the configuration of a lossless decoder.

Next, each unit of the image decoding device 200 will be described. FIG. 15 is a block diagram showing an example of the configuration of the lossless decoder 202.

In the example shown in FIG. 15, the lossless decoder 202 is configured to include a VLC (Variable Length Coding) decoder 231, a decoding controller 232, an acquisition unit 233, and a CABAC (Context-Adaptive Binary Arithmetic Coding) decoder 234. In addition, the acquisition unit 233 is built in the VLC decoder 231.

Among the respective units that form the lossless decoder 202, the VLC decoder 231, the decoding controller 232, and the acquisition unit 233 are realized as firmware 241 by being executing by a CPU (not shown). Among the respective units that form the lossless decoder 202, the CABAC decoder 234 that performs relatively heavy processing is realized as hardware 242 by logic configuration or the like.

Encoded data read from the storage buffer 201 at a predetermined timing is supplied to the VLC decoder 231.

The acquisition unit 233 is built in the VLC decoder 231. The acquisition unit 233 acquires parameters, which have been encoded and are to be decoded, from the encoded data. The VLC decoder 231 performs a variable length decoding process or a fixed length decoding process, which corresponds to the decoding of the VLC encoder 131 shown in FIG. 2, on encoding parameters other than arithmetic coding parameters to control the decoding process in units of a slice or a picture acquired by the acquisition unit 233.

The VLC decoder 231 supplies the arithmetic coding parameters to control the decoding process in units of a slice or a picture, among the parameters acquired by the acquisition unit 233, to the CABAC decoder 234, and notifies the decoding controller 232 of the supply of the parameters to the CABAC decoder 234. The VLC decoder 231 supplies an initialization parameter, which is also an encoding parameter, to the CABAC decoder 234, and notifies the decoding controller 232 of the supply of the initialization parameter to the CABAC decoder 234.

The VLC decoder 231 receives a parameter subjected to arithmetic decoding by the CABAC decoder 234. The VLC decoder 231 supplies the decoded parameter and the parameter, which has been subjected to arithmetic decoding by the CABAC decoder 234, to each corresponding unit of the image decoding device 200.

For example, when the prediction mode information is intra prediction mode information, the prediction mode information subjected to variable length decoding or fixed length decoding is supplied to the intra prediction unit 211. When the prediction mode information is inter prediction mode information, the prediction mode information and corresponding motion vector information and the like that have been subjected to variable length decoding or fixed length decoding are supplied to the motion estimator/compensator 212.

For example, a parameter regarding an adaptive offset filter that has been subjected to arithmetic decoding is supplied to the adaptive offset unit 221. A parameter regarding an adaptive loop filter that has been subjected to arithmetic decoding is supplied to the adaptive loop filter 222.

The decoding controller 232 causes the CABAC decoder 234 to start an initialization process or a decoding process in response to the notification from the VLC decoder 231. The decoding controller 232 causes the VLC decoder 231 to start a decoding process in response to the notification from the CABAC decoder 234.

The CABAC decoder 234 performs initialization using the initialization parameter required for initialization from the VLC decoder 231 under the control of the decoding controller 232. The CABAC decoder 234 performs arithmetic decoding, which corresponds to the arithmetic coding of the CABAC encoder 134 shown in FIG. 2, of the arithmetic coding parameter and the data (transform coefficient) from the VLC decoder 231, which have been encoded, under the control of the decoding controller 232. The CABAC decoder 234 supplies the parameter subjected to arithmetic decoding to the VLC decoder 231.

The CABAC decoder 234 supplies the data (quantized orthogonal transform coefficient) subjected to arithmetic decoding to the inverse quantizer 203.

[Flow of Entire Decoding Process]

Next, flows of processes performed by the image decoding device 200 as described above will be described. First, an example of the flow of the entire decoding process of the image decoding device 200 will be described with reference to the flowchart of FIG. 16.

When the decoding process is started, in step S201, the storage buffer 201 stores transmitted encoded data. In step S202, the lossless decoder 202 decodes the encoded data supplied from the storage buffer 201. Although the details of the decoding process will be described later with reference to FIGS. 17, I, P, and B pictures encoded by the lossless encoder 106 shown in FIG. 1 are decoded.

Prior to the decoding of the pictures, motion vector information, reference frame information, prediction mode information (intra prediction mode or inter prediction mode), and information regarding parameters, such as a parameter of an adaptive offset filter and a parameter of an adaptive loop filter, are also decoded. In this case, among the parameters added to the slice header, encoding parameters other than arithmetic coding parameters to control the encoding process in units of a slice or a picture are subjected to variable length (or fixed length) decoding. On the other hand, arithmetic coding parameters to control the decoding process in units of a slice or a picture, which are added to the end of the slice header or the top of the slice data, are subjected to arithmetic decoding. As described above with reference to FIG. 2, the arithmetic coding parameters to control the decoding process in units of a slice or a picture are a parameter regarding an adaptive offset filter, a parameter regarding an adaptive loop filter, and the like.

When the prediction mode information is intra prediction mode information, the prediction mode information is supplied to the intra prediction unit 211. When the prediction mode information is inter prediction mode information, the prediction mode information and corresponding motion vector information and the like are supplied to the motion estimator/compensator 212. The parameter regarding the adaptive offset filter is supplied to the adaptive offset unit 221. The parameter regarding the adaptive loop filter is supplied to the adaptive loop filter 222.

In step S203, the intra prediction unit 211 or the motion estimator/compensator 212 performs predicted image generation processing corresponding to the prediction mode information supplied from the lossless decoder 202.

That is, when the intra prediction mode information is supplied from the lossless decoder 202, the intra prediction unit 211 generates a "Most Probable Mode", and generates an intra-predicted image in the intra prediction mode by parallel processing. When the inter prediction mode information is supplied from the lossless decoder 202, the motion estimator/compensator 212 performs motion estimation/compensation processing in the inter prediction mode to generate an inter-predicted image.

By this processing, the predicted image (intra-predicted image) generated by the intra prediction unit 211 or the predicted image (inter-predicted image) generated by the motion estimator/compensator 212 is supplied to the selector 213.

In step S204, the selector 213 selects a predicted image. That is, the predicted image generated by the intra prediction unit 211 or the predicted image generated by motion estimator/compensator 212 is supplied. Accordingly, the supplied predicted image is selected and supplied to the arithmetic operation unit 205, and is added to the output of the inverse orthogonal transform unit 204 in step S207 to be described later.

In step S202 described above, the transform coefficient decoded by the lossless decoder 202 is also supplied to the inverse quantizer 203. In step S205, the inverse quantizer 203 performs inverse quantization of the transform coefficient decoded by the lossless decoder 202 in the characteristics corresponding to the characteristics of the quantizer 105 shown in FIG. 1.

In step S206, the inverse orthogonal transform unit 109 performs an inverse orthogonal transform of the transform coefficient, which has been inversely quantized by the inverse quantizer 108, in the characteristics corresponding to the characteristics of the orthogonal transform unit 104 shown in FIG. 1. As a result, difference information corresponding to the input of the orthogonal transform unit 104 (output of the arithmetic operation unit 103) shown in FIG. 1 is decoded.

In step S207, the arithmetic operation unit 205 adds the predicted image, which is selected by the processing of step S204 described above and is input through the selector 213, to the difference information. In this manner, the original images are decoded. In step S208, the deblocking filter 206 performs deblocking filtering on the image output from the arithmetic operation unit 110. As a result, block distortion on the entire screen is removed. The image after filtering is supplied to the adaptive offset unit 221.

In step S209, the adaptive offset unit 221 performs adaptive offset processing. By this processing, the quad-tree structure and the offset value that are parameters of the adaptive offset filter from the lossless decoder 202 are used, and offset filtering is performed on the image after deblocking. The pixel value after offset processing is supplied to the adaptive loop filter 222.

In step S210, the adaptive loop filter 222 performs adaptive loop filtering on the pixel value after offset processing using the adaptive filter coefficient that is a parameter of the adaptive loop filter from the lossless decoder 202. The pixel value after adaptive filtering is output to the frame reordering buffer 207 and the frame memory 209.

In step S211, the frame memory 209 stores the image after adaptive filtering.

In step S212, the frame reordering buffer 207 performs reordering of the image after the adaptive loop filter 222. Specifically, the frames reordered into the encoding order by the frame reordering buffer 102 of the image encoding device 100 are reordered into the original display order.

In step S213, the D/A converter 208 performs D/A conversion of the image from the frame reordering buffer 207. This image is output to the display (not shown) and displayed thereon.

The decoding process is terminated when the processing in step S213 is terminated.

[Flow of Decoding Process]

Figure 16:
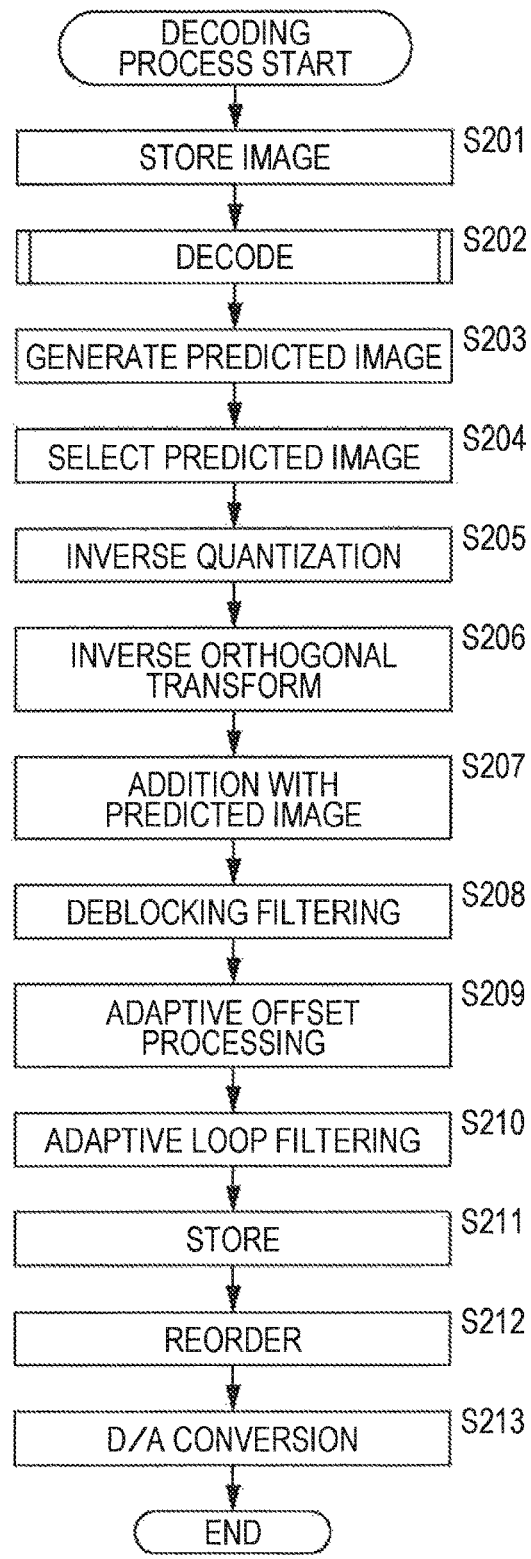
FIG. 16 is a flowchart illustrating an example of the flow of the entire decoding process.

Next, an example of a flow of the lossless decoding process performed by the lossless decoder 202 in step S202 of FIG. 16 will be described with reference to the flowchart of FIG. 17.

Encoded data read from the storage buffer 201 at a predetermined timing is supplied to the VLC decoder 231. The slice header and the slice data of the encoded data are configured as shown in FIG. 4 or 5 described above.

In step S231, the acquisition unit 233 of the VLC decoder 231. acquires encoding parameters, which have been encoded and are to be decoded, from the slice header. In step S232, the VLC decoder 231 performs VLC decoding of the encoding parameters acquired by the acquisition unit 233.

In step S233, the VLC decoder 231 determines whether or not slice_type and slice_qp_delta, which are encoding parameters and are initialization parameters required for the initialization of the CABAC, are aligned. For example, if the slice header is configured as shown in FIG. 4, decoding of slice_type and slice_qp_delta ends near the top, and slice_type and slice_qp_delta are aligned near the top.

When it is determined that slice_type and slice_qp_delta are not aligned in step S233, the process returns to step S231 and the subsequent process is repeated. When it is determined that slice_type and slice_qp_delta are aligned in step S233, the parameters of slice_type and slice_qp_delta are supplied to the CABAC decoder 234, and the decoding controller 232 is notified of the supply of the parameters to the CABAC decoder 234.

In response to this, the decoding controller 232 causes the CABAC decoder 234 to perform initialization in step S234. When the initialization ends, the CABAC decoder 234 notifies the decoding controller 232 of the end of initialization. Thereafter, CABAC decoding can be performed at any timing.

In step S235, the acquisition unit 233 further acquires parameters, which have been encoded and are to be decoded, from the slice header. In step S236, the VLC decoder 231 determines whether the parameter acquired by the acquisition unit 233 is sao_param( ), which is a parameter of the adaptive offset filter, or alf_cu_control_param( ), which is a parameter of the adaptive loop filter (that is, an arithmetic coding parameter). sao_param( ), which is a parameter of the adaptive offset filter, or alf_cu_control_param( ), which is a parameter of the adaptive loop filter, is set at the end of the slice header or the top of the slice data. Accordingly, the acquisition unit 233 acquires these parameters from the end of the slice header or the top of the slice data.

When it is determined that the acquired parameter is neither sao_param( ), which is a parameter of the adaptive offset filter, nor alf_cu_control_param( ), which is a parameter of the adaptive loop filter (that is, the arithmetic coding parameter.)) in step S236, the process proceeds to step S237.

In step S237, the VLC decoder 231 performs VLC decoding (variable length decoding or fixed length decoding) of the parameter acquired in step S235.

When it is determined that the acquired parameter is sao_param( ), which is a parameter of the adaptive offset filter, or alf_cu_control_param( ), which is a parameter of the adaptive loop filter (that is, the arithmetic coding parameter) in step S236, the process proceeds to step S238. The VLC decoder 231 supplies the parameter acquired in step S235 to the CABAC decoder 234 and notifies the decoding controller 232 of the supply of the parameter to the CABAC decoder 234.

In step S238, the CABAC decoder 234 performs CABAC decoding (arithmetic decoding) of the parameter acquired in step S235 under the control of the decoding controller 232. That is, the parameter subjected to arithmetic decoding herein is an arithmetic coding parameter, and is the parameter sao_param( ) of the adaptive offset filter or the parameter alf_cu_control_param( ) of the adaptive loop filter. The CABAC decoder 234 supplies the decoded parameter to the VLC decoder 231 and notifies the decoding controller 232 of the end of decoding. The decoding controller 232 notifies the VLC decoder 231 of the end.

In step S239, the VLC decoder 231 determines whether or not the decoding of all parameters has ended. When it is determined that the decoding of all parameters has not ended yet, the process returns to step S235 and the subsequent process is repeated.

When it is determined that the decoding of all parameters has ended in step S239, the process proceeds to step S240. The VLC decoder 231 supplies a transform coefficient, which is the encoded data from the storage buffer 201, to the CABAC decoder 234 and notifies the decoding controller 232 of the supply of the transform coefficient to the CABAC decoder 234.

In addition, the decoded parameter is stored in the VLC decoder 231, and is also used for the decoding of the transform coefficient. The decoded parameter may be supplied to each corresponding unit of the image decoding device 200 when the decoding of all parameters ends, or may be supplied to each corresponding unit of the image decoding device 200 whenever each decoding ends.

In step S240, the CABAC decoder 234 performs CABAC decoding (arithmetic decoding) of the data (transform coefficient) under the control of the decoding controller 232, and supplies the decoded data to the inverse quantizer 203 and notifies the decoding controller 232 of the end of decoding. After processing of step S240, the process returns to step S202 of FIG. 16.

Figure 17:
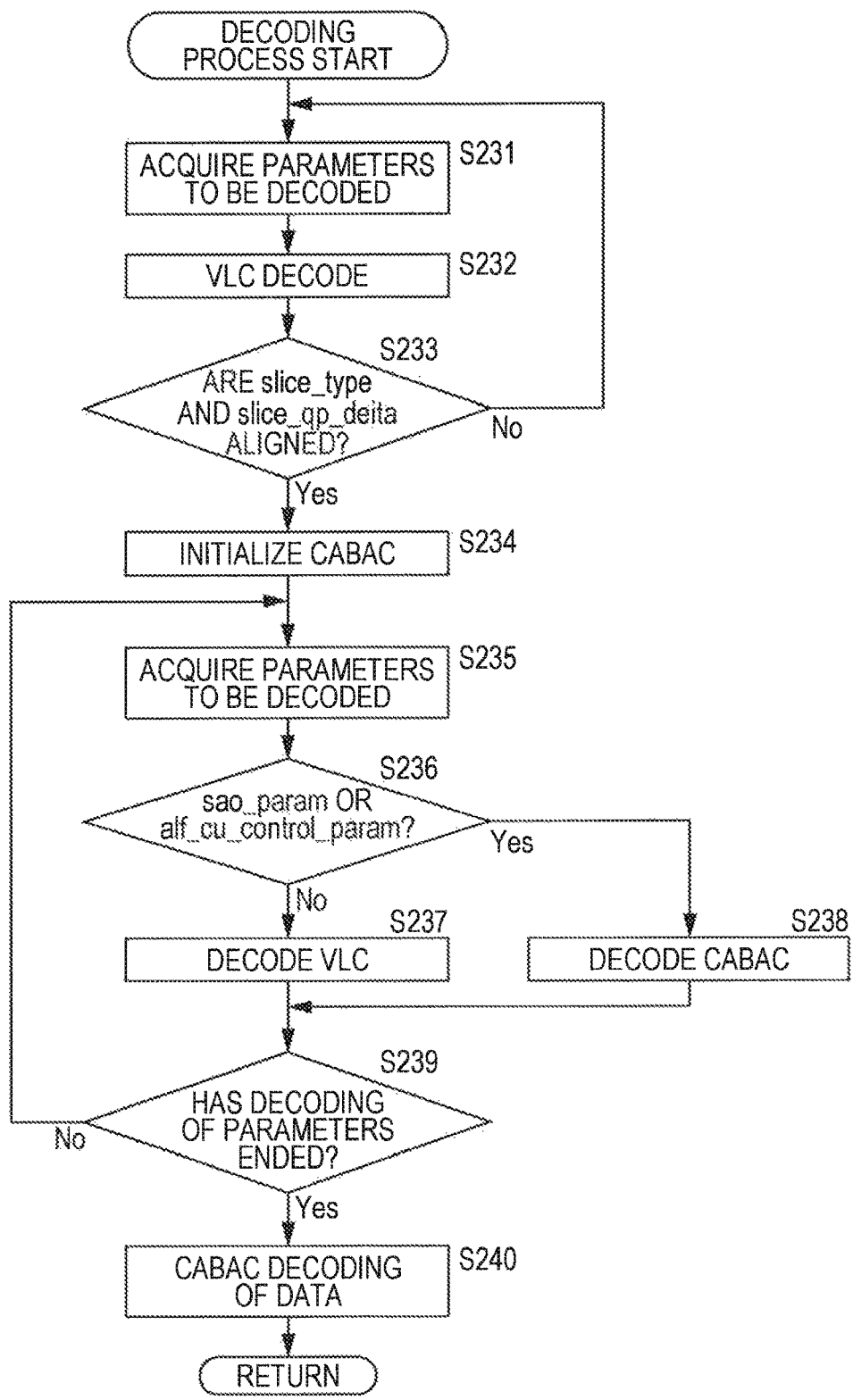
FIG. 17 is a flowchart illustrating an example of the flow of a decoding process of a lossless decoder.

In addition, in the example shown in FIG. 17, it is determined whether the acquired parameter is sao_param( ) or alf_cu_control_param( ) in step S236. However, determination regarding whether the acquired parameter has been subjected to arithmetic coding or subjected to variable length (fixed length) coding, that is, determination based on the encoding type may be simply performed.

As described above, it is possible to increase the speed of the decoding process by arranging the arithmetic coding parameters to control the encoding process or the decoding process in units of a slice or a picture at the end of the slice header or the top of the slice data.

[Example of Syntax]

FIG. 18 is a diagram showing an example of the syntax of the slice header generated by the image encoding device 100. The number at the left end of each line is a line number attached for explanation.

In the syntax shown in FIG. 18, an example is illustrated in which arithmetic coding parameters to control the encoding process or the decoding process in units of a slice or a picture are arranged together at the top of slice data.

In the example shown in FIG. 18, slice_type is set in the fourth line. This slice_type indicates to which slice of I, P, and B slices this slice corresponds, and is a parameter required for the initialization of the CABAC as described above.

cabac_init_idc is set in the 25th line. cabac_init_idc is used to set the table of cabac in the H.264/AVC method, but the use in the HEVC method is not determined at present.

slice_qp_delta is set in the 30th line. This slice_qp_delta is a parameter required for the initialization of the CABAC as described above.

sao_param( ) is set in the 31st to 32nd lines as if (sample_adaptive_offset_enabled_flag) sao_param( ) This sao_param( ) is a parameter of the adaptive offset filter. That is, in the example shown in FIG. 18, the arrangement of not all of these parameters but parameters to control the encoding process or the decoding process in units of a slice or a picture among these parameters is changed to the top of the slice data. Details thereof will be described later with reference to FIGS. 19 and 20.

alf_param( ) is set in the 44th line. Although alf_cu_control_param( ) is set after alf_param( ) in the conventional example, the arrangement is moved to the top of the slice data in the example shown in FIG. 18.

In addition, in the example shown in FIG. 18, the arithmetic coding parameters to control the encoding process in units of a slice or a picture in sao_param( ) is changed to the top of the slice data. Therefore, even if slice_qp_delta is present in the 30th line, no parameter to control the encoding process or the decoding process in units of a slice or a picture is present immediately after slice_qp_delta. For this reason, slice_qp_delta in the 30th line is not moved.

FIG. 19 is a diagram showing an example of the syntax of sao_param( ) generated by the image encoding device 100. The number at the left end of each line is a line number attached for explanation.

In the example shown in FIG. 19, sample_adaptive_offset_flag in the second line is a flag indicating whether or not to perform adaptive offset filtering. Although an arithmetic coding parameter to control the encoding process or the decoding process in units of a slice or a picture is present immediately after this flag in the related art, the arithmetic coding parameter is moved in the example shown in FIG. 19.

That is, in sao_param( ) of FIG. 19, it is preferable to perform VLC encoding of the if sentence. Accordingly, parameters in the sixth to ninth lines of FIG. 20, which are simply read and will be described later, are moved to the top of the slice data, and sample_adaptive_offset_flag is set at the same position.

FIG. 20 is a diagram showing an example of the syntax of slice data generated by the image encoding device 100. The number at the left end of each line is a line number attached for explanation.

In the example shown in FIG. 20, alf_cu_control_param( ) is set in the fourth and fifth lines as if (adaptive_loop_filter_enabled_flag) alf_cu_control_param( ). This alf_cu_control_param( ) is an arithmetic coding parameter to control the encoding process or the decoding process in units of a slice or a picture among the parameters of the adaptive loop filter, and is set at the top of the slice data.

In the sixth to ninth lines, sao_split_param(0,0, 0) sao_offset_param (0,0,0) is set as if (sample_adaptive_offset_flag) {sao_split_param(0,0,0) sao_offset_param (0,0,0)}. This parameter is an arithmetic coding parameter to control the encoding process or the decoding process in units of a slice or a picture among the parameters of the adaptive offset filter, and is set at the top of the slice data.

[Another Example of Syntax]

FIG. 21 is a diagram showing another example of the syntax of the slice header generated by the image encoding device 100. The number at the left end of each line is a line number attached for explanation.

In the syntax shown in FIG. 21, an example is illustrated in which arithmetic coding parameters to control the encoding process or the decoding process in units of a slice or a picture are arranged together at the end of the slice header.

In the example of FIG. 21, slice_type is set in the fourth line. This slice_type indicates to which slice of I, P, and B slices this slice corresponds, and is a parameter required for the initialization of the CABAC as described above.

cabac_init_idc is set in the 25th line. cabac_init_idc is used to set the table of cabac in the H.264/AVC method, but the use in the HEVC method is not determined at present.

slice_qp_delta is set in the 30th line. This slice_qp_delta is a parameter required for the initialization of the CABAC as described above.

alf_cu_control_param( ) is set in the 43rd line. This alf_cu_control_param( ) is an arithmetic coding parameter to control the encoding process or the decoding process in units of a slice or a picture among the parameters of the adaptive loop filter, and is set at the end of the slice header.

sao_param( ) is set in the 45th and 46th lines as if (sample_adaptive_offset_enabled_flag) sao_param( ). This sao_param( ) is a parameter of the adaptive offset filter and is also an arithmetic coding parameter to control the encoding process or the decoding process in units of a slice or a picture, and is set at the end of the slice header.

In addition, in the example shown in FIG. 21, the arrangement of sao_param( ) is changed to the end of the slice header. Therefore, even if slice_qp_delta is present in the 30th line, no parameter to control the encoding process or the decoding process in units of a slice or a picture is present immediately after slice_qp_delta. For this reason, slice_qp_delta in the 30th line is not moved.

[Another Example of Syntax]

FIG. 22 is a diagram showing still another example of the syntax of the slice header generated by the image encoding device 100. The number at the left end of each line is a line number attached for explanation.

In the syntax shown in FIG. 22, an example is illustrated in which arithmetic coding parameters to control the encoding process or the decoding process in units of a slice or a picture are arranged together at the end of the slice header. In addition, in the syntax shown in FIG. 22, the arrangement of slice_qp_delta is moved, and parameters that are parameters required for the initialization of the CABAC are arranged together near the top of the header.

In the example of FIG. 22, slice_type is set in the fourth line. This slice_type indicates to which slice of I, B, and B slices this slice corresponds, and is a parameter required for the initialization of the CABAC as described above.

slice_qp_delta is set in the fifth line. Similar to slice_type, this slice_qp_delta is a parameter required for the initialization of the CABAC.

cabac_init_idc is set in the 25th line. cabac_init_idc is used to set the table of cabac in the H.264/AVC method, but the use in the HEVC method is not determined at present. In addition, when cabac_init_idc is used, slice_qp_delta may be arranged immediately after cabac_init_idc, as shown in FIG. 5 described above, so as to be placed together with cabac_init_idc. In addition, cabac_init_idc may also be arranged immediately after slice_type together with slice_qp_delta.

alf_cu_control_param( ) is set in the 43rd line. This alf_cu_control_param( ) is an arithmetic coding parameter to control the encoding process or the decoding process in units of a slice or a picture among the parameters of the adaptive loop filter, and is set at the end of the slice header.

sao_param( ) is set in the 45th and 46th lines as if (sample_adaptive_offset_enabled_flag) sao_param( ). This sao_param( ) is a parameter of the adaptive offset filter and is also an arithmetic coding parameter to control the encoding process or the decoding process in units of a slice or a picture, and is set at the end of the slice header.

In addition, in the examples shown in FIGS. 18 to 20 described above, only a part of sao_param( ) is arranged at the top of the slice data. Also in the case of alf_cu_control_param( ), the same configuration as in the examples shown in FIGS. 18 to 20 can be adopted.

[Another Example of Syntax]

FIG. 23 is a diagram showing an example of the syntax of alf_cu_control_param( ). The number at the left end of each line is a line number attached for explanation.

In the example shown in FIG. 23, alf_cu_flag[i] is set in the seventh and eighth lines as for (i=0; i<NumAlfCuFlag; i++) alf_cu_flag[i]. In alf_cu_control_param( ), only this alf_cu_flag [i] is an arithmetic coding parameter to control the encoding process or the decoding process in units of a slice or a picture.

Accordingly, although alf_cu_control_param( ) is arranged at the top of the slice data in the example shown in FIG. 18 described above, only alf_cu_flag[i] of alf_cu_control_param( ) may be arranged at the top of the slice data instead of entire alf_cu_control_param( ). Thus, a parameter having other if sentence and the like in alf_cu_control_param ( ) can be subjected to VLC encoding. Undoubtedly, even if alf_cu_control_param( ) is arranged at the top of the slice data as in the example shown in FIG. 18, VLC and CABAC may be mixed, or it is also possible to arrange all parameters at the top of slice data and perform CABAC encoding of all parameters.

In addition, in the examples shown in FIGS. 18 to 23, sao_param( ) that is a parameter of the adaptive offset filter is arranged after alf_cu_control_param( ), which is a parameter of the adaptive loop filter, at the end of the slice data or the top of the slice header. However, these are examples, and the parameter of the adaptive offset filter may also be arranged before the parameter of the adaptive loop filter as long as the arrangement location is the end of slice data or the top of the slice header.

In addition, in the above explanation, alf_cu_control_param( ) that is a parameter of the adaptive loop filter and sao_param( ) that is a parameter of the adaptive offset filter as an arithmetic coding parameter to control the encoding process in units of a slice or picture have been used for explanation. However, the present disclosure is not limited thereto. That is, the present technique can also be applied to other parameters if they are arithmetic coding parameters subjected to arithmetic coding that are parameters to control the encoding process or the decoding process in units of a slice or a picture.

By arranging such arithmetic coding parameters together at the end of the slice header or the top of the slice data, it is possible to increase the speed of the process. As examples of other arithmetic coding parameters to control the encoding process or the decoding process in units of a slice or a picture, parameters, such as a quantization matrix, can be mentioned.

In the above, the H.264/AVC method or the HEVC method has been used as a basis of the encoding method. However, the present disclosure is not limited to this, and it is also possible to apply other encoding methods/decoding methods including at least one of the adaptive offset filter and the adaptive loop filter within the motion estimation/compensation loop.

The present technique can be applied to image encoding devices and image decoding devices used for receiving image information (bit stream) compressed using orthogonal transform such as discrete cosine transform and motion compensation as in MPEG or H.26×, for example, via network media such as satellite broadcasting, cable television, the Internet, or portable telephone devices. The present technique can also be applied to image encoding devices and image decoding devices that are used when compressed image information is processed on a storage medium such as an optical or magnetic disk or a flash memory.

<3. Third Embodiment>
[Applications to Multi-View Image Point Encoding and Multi-View Image Decoding]

Figure 24:
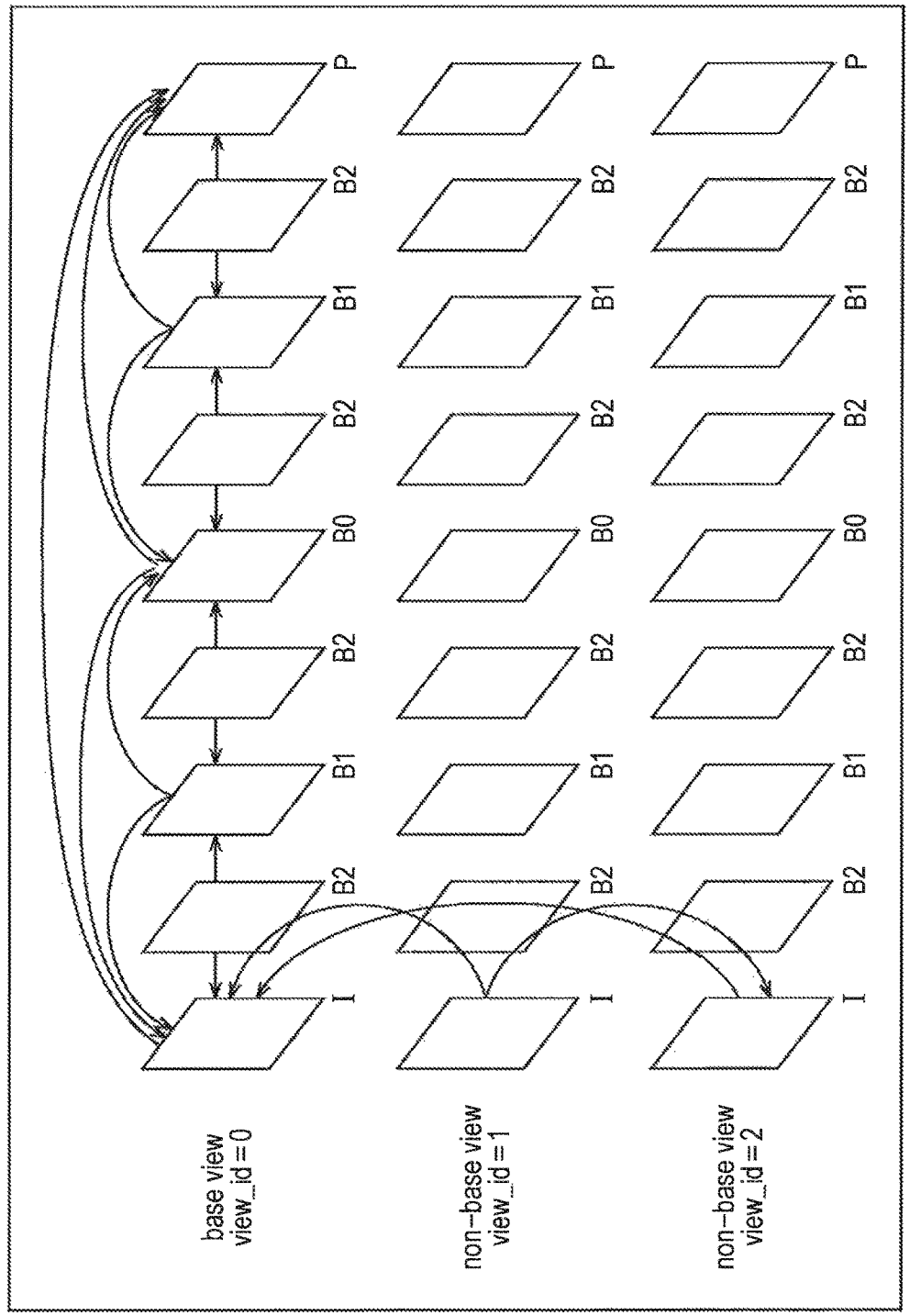
FIG. 24 is a diagram showing an example of a multi-view image encoding method.

The series of processes described above can be applied to multi-view image encoding and multi-view image decoding. FIG. 24 shows an example of a multi-view image encoding method.

As shown in FIG. 24, a multi-view image includes images of a plurality of views, and an image of one predetermined view of the plurality of views is designated as an image of a base view. An image of each view other than the image of the base view is treated as an image of a non-base view.

When performing multi-view image encoding as shown in FIG. 24, arithmetic coding parameters can be arranged together in each view (the same view). In addition, in each view (different views), it is also possible to share arithmetic coding parameters arranged together in other views.

In this case, the arithmetic coding parameters arranged together in a base view are used in at least one non-base view. Alternatively, for example, arithmetic coding parameters arranged together in a non-base view (view_id=0) are used in at least one of the base view and a non-base view (view_id=1).

In addition, in each view (the same view), it is also possible to arrange variable length (or fixed length) encoding parameters together. In addition, in each view (different views), it is also possible to share variable length (or fixed length) encoding parameters arranged together in other views.

In this case, the variable length (or fixed length) encoding parameters arranged together in a base view are used in at least one non-base view. Alternatively, for example, variable length (or fixed length) encoding parameters arranged together in a non-base view (view_id=0) are used in at least one of the base view and a non-base view (view_id=1).

In this manner, processes of arithmetic coding and arithmetic decoding can be efficiently performed together. In addition, processes of variable length (fixed length) coding and variable length (fixed length) decoding can be efficiently performed together.

[Multi-View Image Encoding Device]

Figure 25:
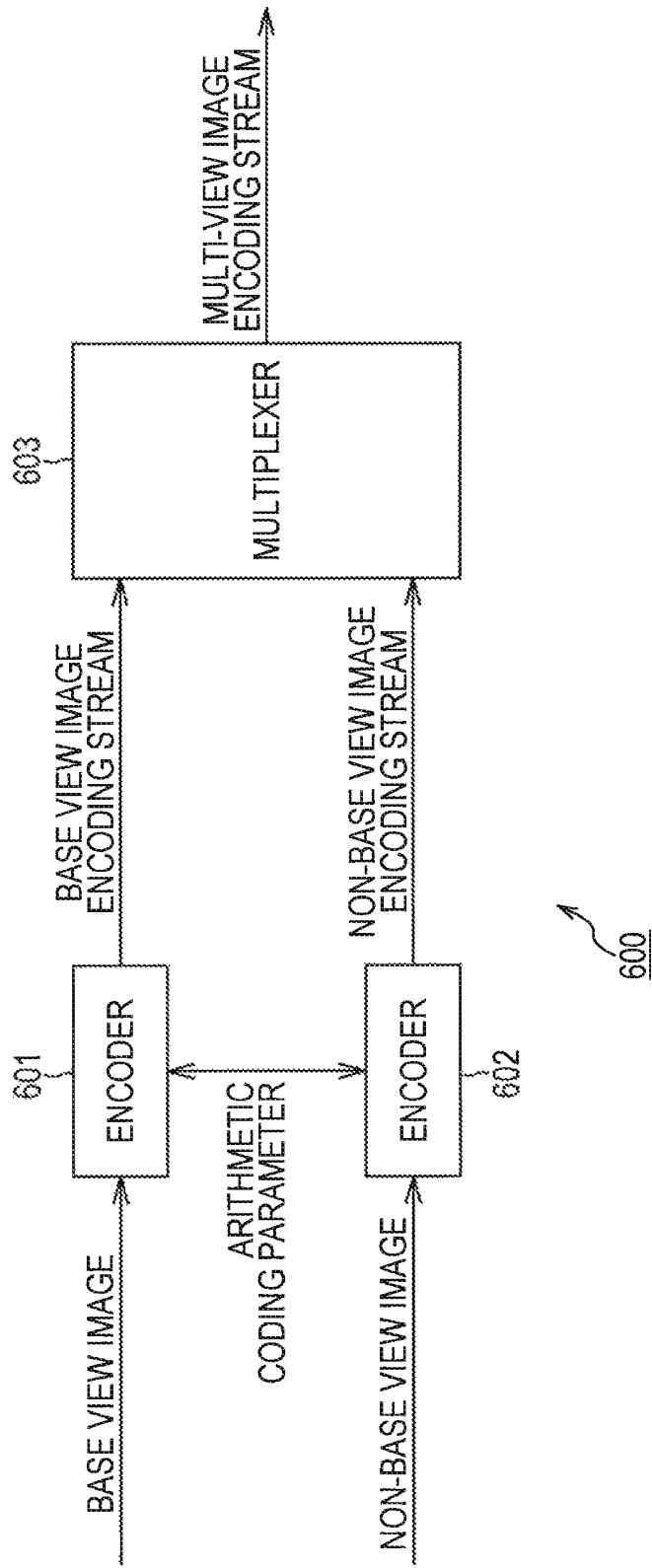
FIG. 25 is a diagram showing an example of the main configuration of a multi-view image encoding device to which the present technique is applied.

FIG. 25 is a diagram showing a multi-view image encoding device that performs the multi-view image encoding described above. As shown in FIG. 25, a multi-view image encoding device 600 includes encoders 601 and 602 and a multiplexer 603.

The encoder 601 encodes a base view image to generate a base view image encoding stream. The encoder 602 encodes a non-base view image to generate a non-base view image encoding stream. The multiplexer 603 multiplexes the base view image encoding stream generated by the encoder 601 and the non-base view image encoding stream generated by the encoder 602 to generate a multi-view image encoding stream.

For the encoders 601 and 602 of the multi-view image encoding device 600, the image encoding device 100 (FIG. 1) can be applied. In this case, the multi-view image encoding device 600 sets and transmits the arithmetic coding parameters arranged together by the encoder 601 and the arithmetic coding parameters arranged together by the encoder 602.

In addition, the arithmetic coding parameters arranged together by the encoder 601 as described above may be set and transmitted so as to be shared between the encoders 601 and 602. Conversely, the arithmetic coding parameters arranged together by the encoder 602 may be set and transmitted so as to be shared between the encoders 601 and 602. The same is true for the case of the variable length (or fixed length) encoding parameter.

[Multi-View Image Decoding Device]

Figure 26:
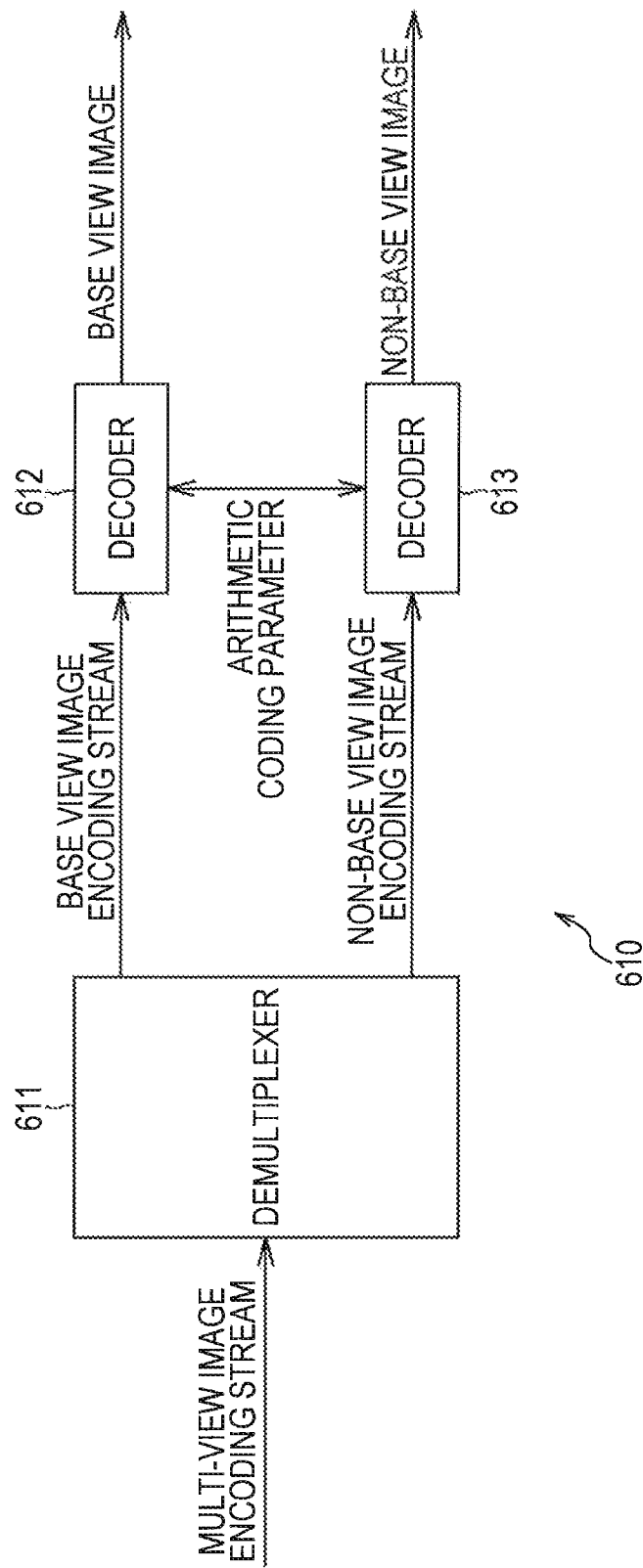
FIG. 26 is a diagram showing an example of the main configuration of a multi-view image decoding device to which the present technique is applied.

FIG. 26 is a diagram showing a multi-view image decoding device that performs the multi-view image decoding described above. As shown in FIG. 26, a multi-view image decoding device 610 includes a demultiplexer 611 and decoders 612 and 613.

The demultiplexer 611 demultiplexes a multi-view image encoding stream, in which a base view image encoding stream and a non-base view image encoding stream are multiplexed, to extract the base view image encoding stream and the non-base view image encoding stream. The decoder 612 decodes the base view image encoding stream extracted by the demultiplexer 611 to obtain a base view image. The decoder 613 decodes the non-base view image encoding stream extracted by the demultiplexer 611 to obtain a non-base view image.

For the decoders 612 and 613 of the multi-view image decoding device 610, the image decoding device 200 (FIG. 14) can be applied. In this case, the multi-view image decoding device 610 performs a process using the arithmetic coding parameters, which have been arranged together by the encoder 601 and decoded by the decoder 612, and the arithmetic coding parameters, which have been arranged together by the encoder 602 and decoded by the decoder 613.

In addition, the arithmetic coding parameters arranged together by the encoder 601 (or the encoder 602) as described above may be set and transmitted so as to be shared between the encoders 601 and 602. In this case, the multi-view image decoding device 610 performs a process using the arithmetic coding parameters, which have been arranged together by the encoder 601 (or the encoder 602) and decoded by the decoder 612 (or the decoder 613). The same is true for the case of the variable length (or fixed length) encoding parameter.

<4. Fourth Embodiment>

[Applications to Hierarchical Image Point Encoding and Hierarchical Image Decoding]

Figure 27:
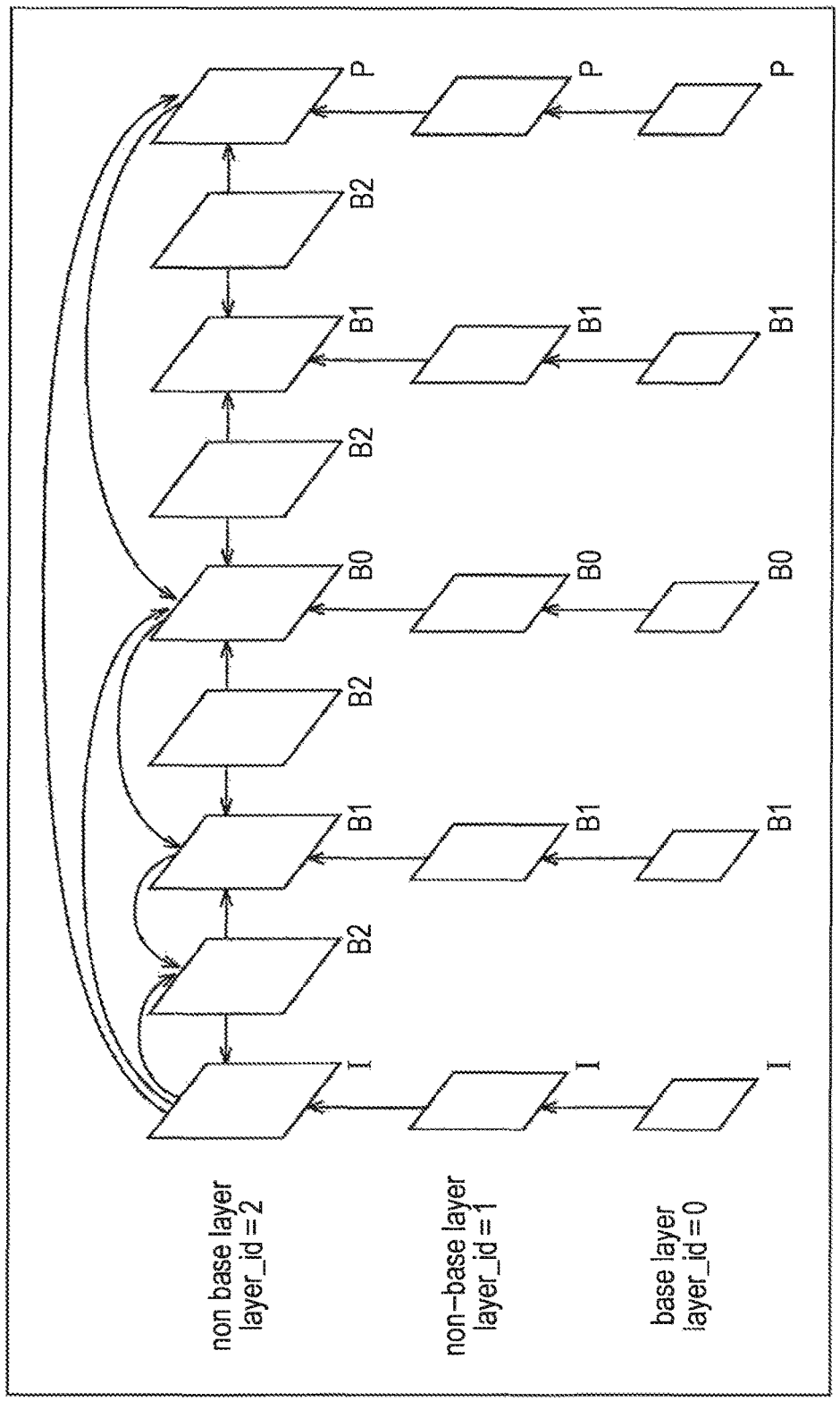
FIG. 27 is a diagram showing an example of a hierarchical image encoding method.

The series of processes described above can be applied to hierarchical image encoding and hierarchical image decoding. FIG. 27 shows an example of a multi-view image encoding method.

As shown in FIG. 27, a hierarchical image includes images of a plurality of hierarchies (resolutions), and an image of one predetermined hierarchy of the plurality of resolutions is designated as an image of a base layer. An image of each hierarchy other than the image of the base layer is treated as an image of a non-base layer.

When performing hierarchical image encoding (spatial scalability) as shown in FIG. 27, arithmetic coding parameters can be arranged together in each layer (the same layer). In addition, in each layer (different layers), it is also possible to share arithmetic coding parameters arranged together in other layers.

In this case, the arithmetic coding parameters arranged together in a base layer are used in at least one non-base layer. Alternatively, for example, arithmetic coding parameters arranged together in a non-base layer (layer_id=0) are used in at least one of the base layer and a non-base layer (layer_id=−1).

In addition, in each layer (the same layer), it is also possible to arrange variable length (or fixed length) encoding parameters together. In addition, in each layer (different layers), it is also possible to share variable length (or fixed length) encoding parameters arranged together in other views.

In this case, the variable length (or fixed length) parameters arranged together in a base layer are used in at least one non-base layer. Alternatively, for example, variable length (or fixed length) parameters arranged together in a non-base layer (layer_id=0) are used in at least one of the base layer and a non-base layer (layer_id=1).

In this manner, processes of arithmetic coding and arithmetic decoding can be efficiently performed together. In addition, processes of variable length (fixed length) coding and variable length (fixed length) decoding can be efficiently performed together.

[Hierarchical Image Encoding Device]

Figure 28:
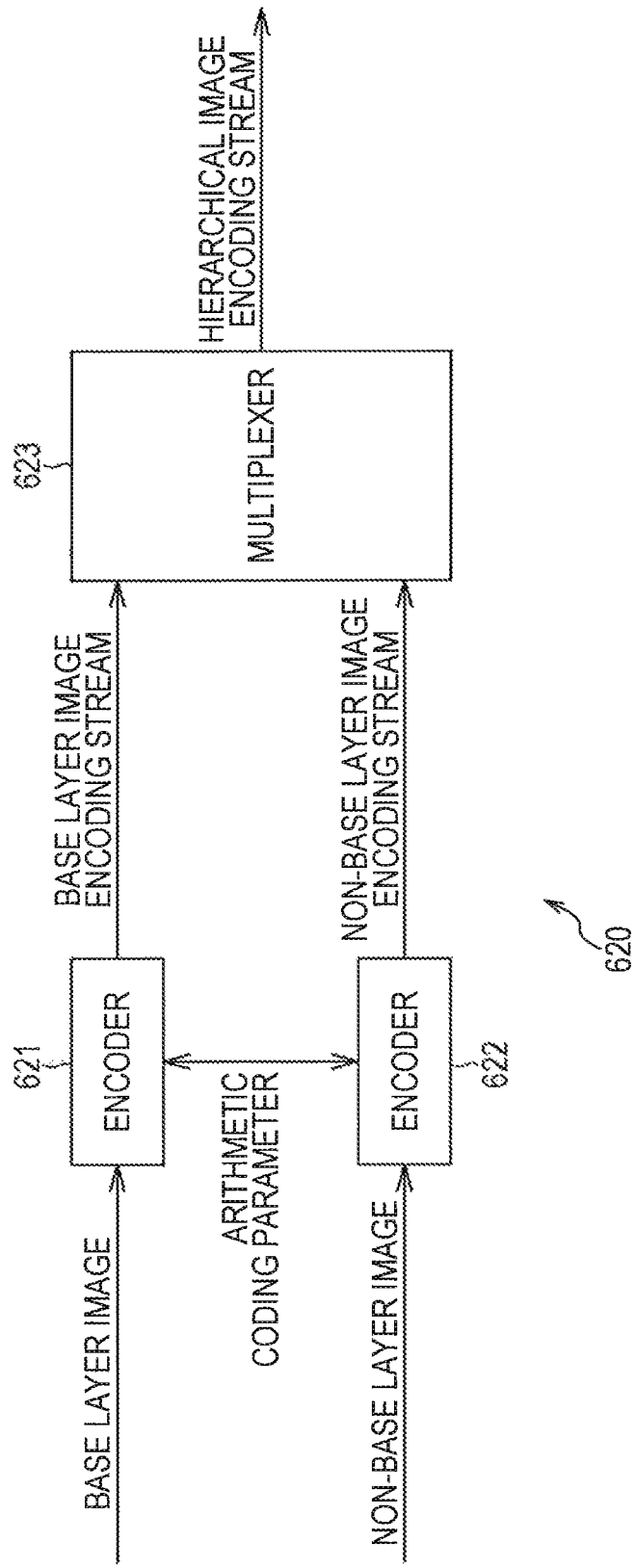
FIG. 28 is a diagram showing an example of the main configuration of a hierarchical image encoding device to which the present technique is applied.

FIG. 28 is a diagram showing a hierarchical image encoding device that performs the hierarchical image encoding described above. As shown in FIG. 28, a hierarchical image encoding device 620 includes encoders 621 and 622 and a multiplexer 623.

The encoder 621 encodes a base layer image to generate a base layer image encoding stream. The encoder 622 encodes a non-base layer image to generate a non-base layer image encoding stream. The multiplexer 623 multiplexes the base layer image encoding stream generated by the encoder 621 and the non-base layer image encoding stream generated by the encoder 622 to generate a hierarchical image encoding stream.

For the encoders 621 and 622 of the hierarchical image encoding device 620, the image encoding device 100 (FIG. 1) can be applied. In this case, the hierarchical image encoding device 620 sets and transmits the arithmetic coding parameters arranged together by the encoder 621 and the arithmetic coding parameters arranged together by the encoder 602.

In addition, the arithmetic coding parameters arranged together by the encoder 621 as described above may be set and transmitted so as to be shared between the encoders 621 and 622. Conversely, the arithmetic coding parameters arranged together by the encoder 622 may be set and transmitted so as to be shared between the encoders 621 and 622. The same is true for the case of the variable length (or fixed length) encoding parameter.

[Hierarchical Image Decoding Device]

Figure 29:
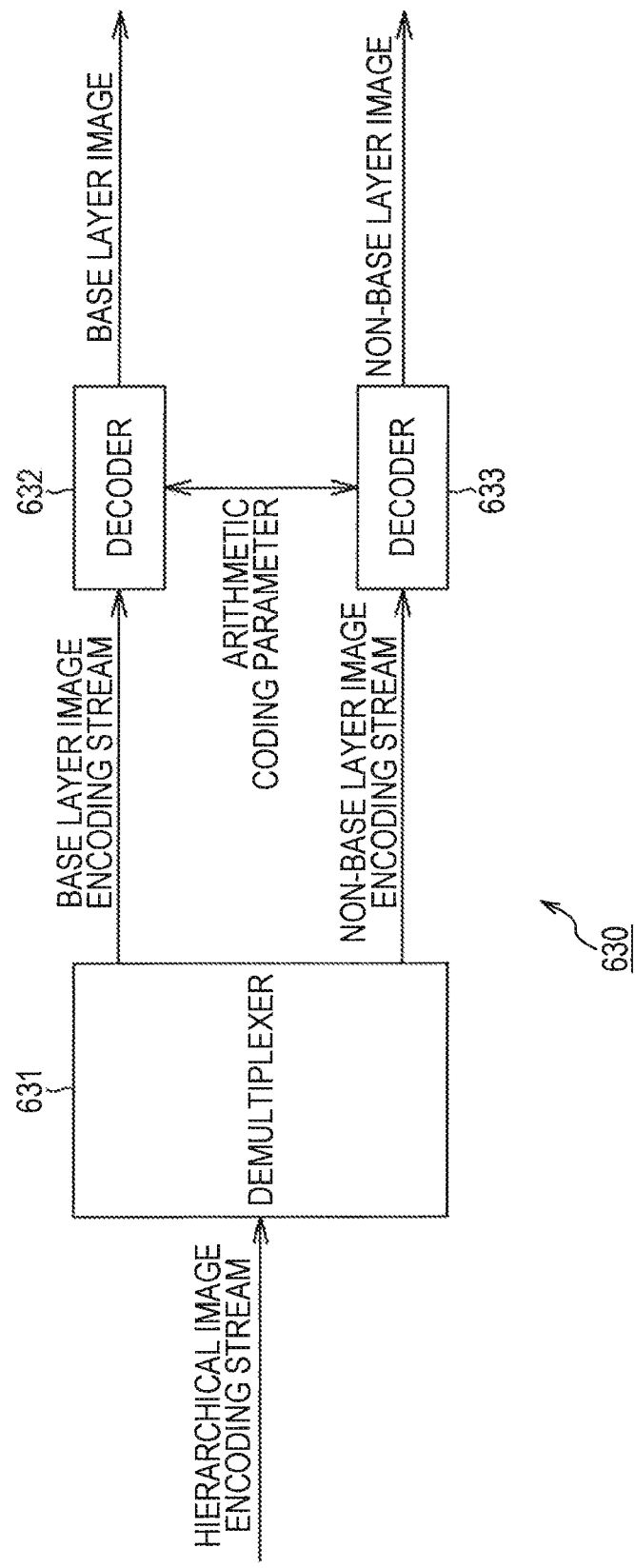
FIG. 29 is a diagram showing an example of the main configuration of a hierarchical image decoding device to which the present technique is applied.

FIG. 29 is a diagram showing a hierarchical image decoding device that performs the hierarchical image decoding described above. As shown in FIG. 29, a hierarchical image decoding device 630 includes a demultiplexer 631 and decoders 632 and 633.

The demultiplexer 631 demultiplexes a hierarchical image encoding stream, in which a base layer image encoding stream and a non-base layer image encoding stream are multiplexed, to extract the base layer image encoding stream and the non-base layer image encoding stream. The decoder 632 decodes the base layer image encoding stream extracted by the demultiplexer 631 to obtain a base layer image. The decoder 633 decodes the non-base layer image encoding stream extracted by the demultiplexer 631 to obtain a non-base layer image.

For the decoders 632 and 633 of the multi-view image decoding device 630, the image decoding device 200 (FIG. 14) can be applied. In this case, the multi-view image decoding device 630 performs a process using the arithmetic coding parameters, which have been arranged together by the encoder 621 and decoded by the decoder 632, and the arithmetic coding parameters, which have been arranged together by the encoder 622 and decoded by the decoder 633.

In addition, the arithmetic coding parameters arranged together by the encoder 621 (or the encoder 622) as described above may be set and transmitted so as to be shared between the encoders 621 and 622. In this case, the multi-view image decoding device 630 performs a process using the arithmetic coding parameters, which have been arranged together by the encoder 621 (or the encoder 622) and decoded by the decoder 632 (or the decoder 633). The same is true for the case of the variable length (or fixed length) encoding parameter.

<5. Fifth Embodiment>

[Computer]

The series of processes described above can be performed either by hardware or by software. When the series of processes described above is performed by software, programs constituting the software are installed in a computer. Note that examples of the computer include a computer embedded in dedicated hardware and a general-purpose personal computer capable of executing various functions by installing various programs therein.

Figure 30:
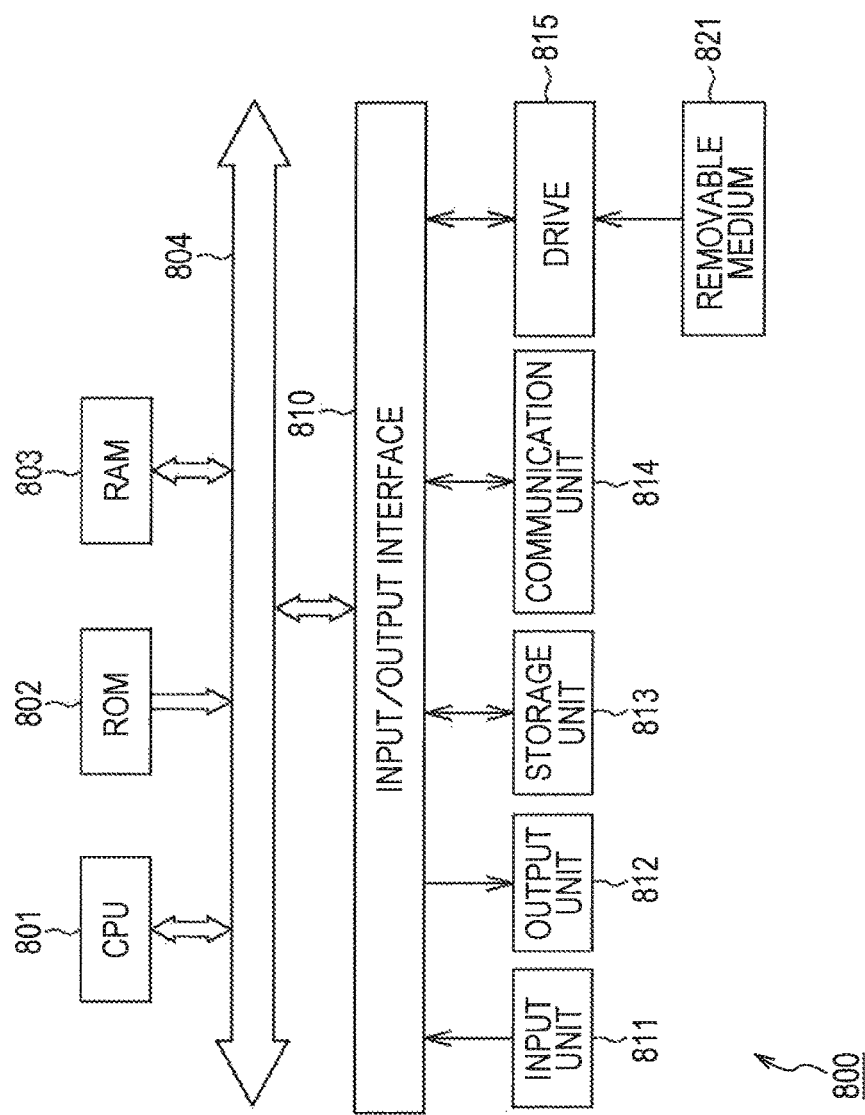
FIG. 30 is a block diagram showing an example of the main configuration of a computer.
Figure 31:
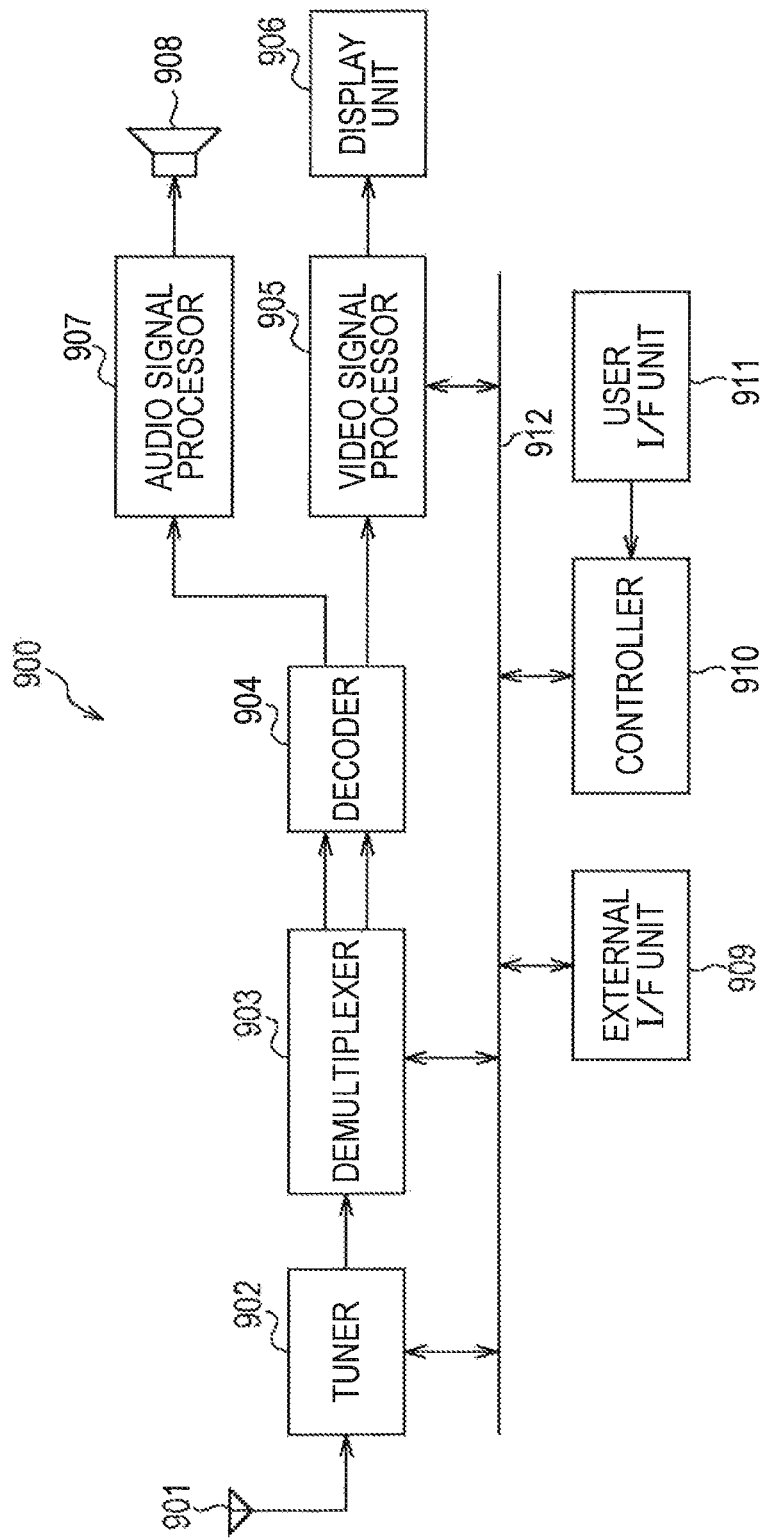
FIG. 31 is a block diagram showing one example of a schematic structure of a television apparatus.
Figure 32:
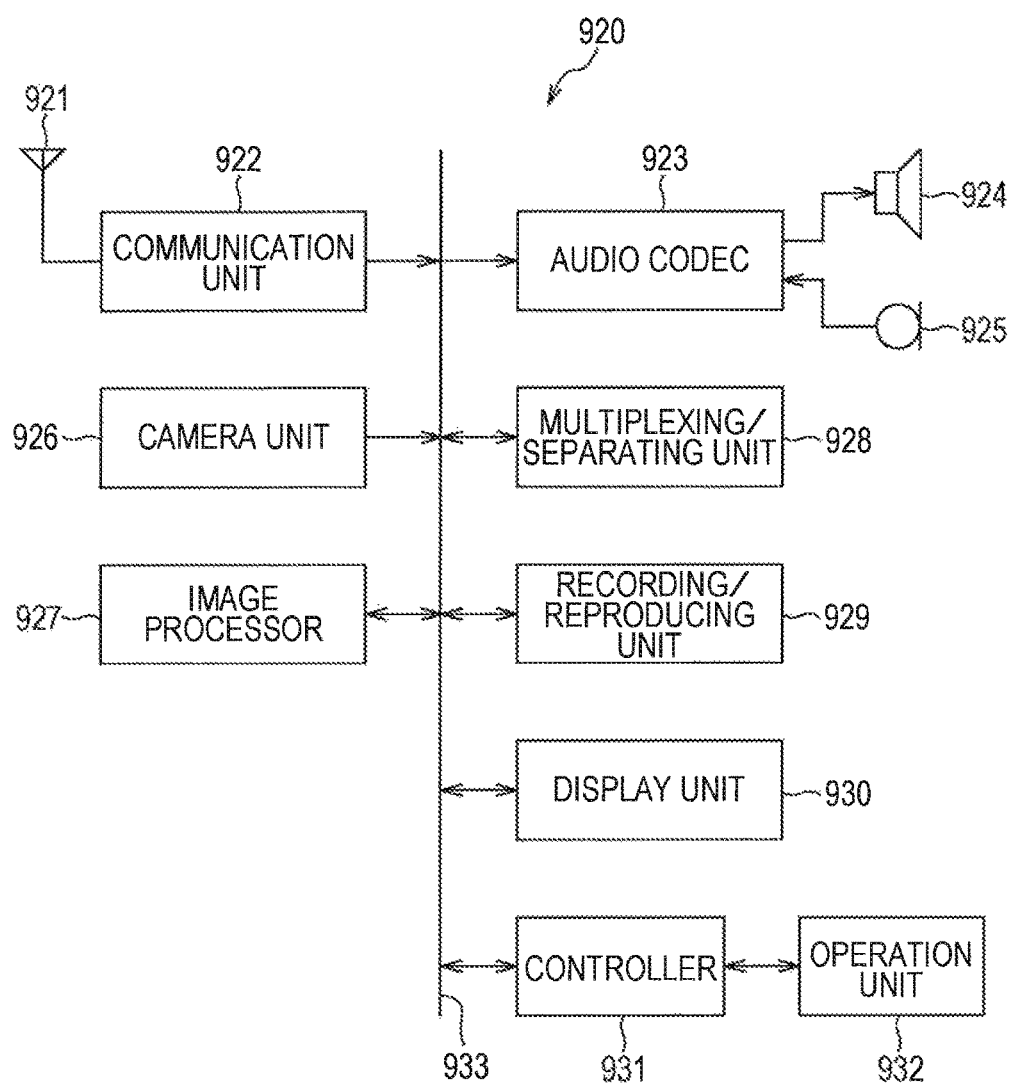
FIG. 32 is a block diagram showing one example of a schematic structure of a portable telephone device.
Figure 33:
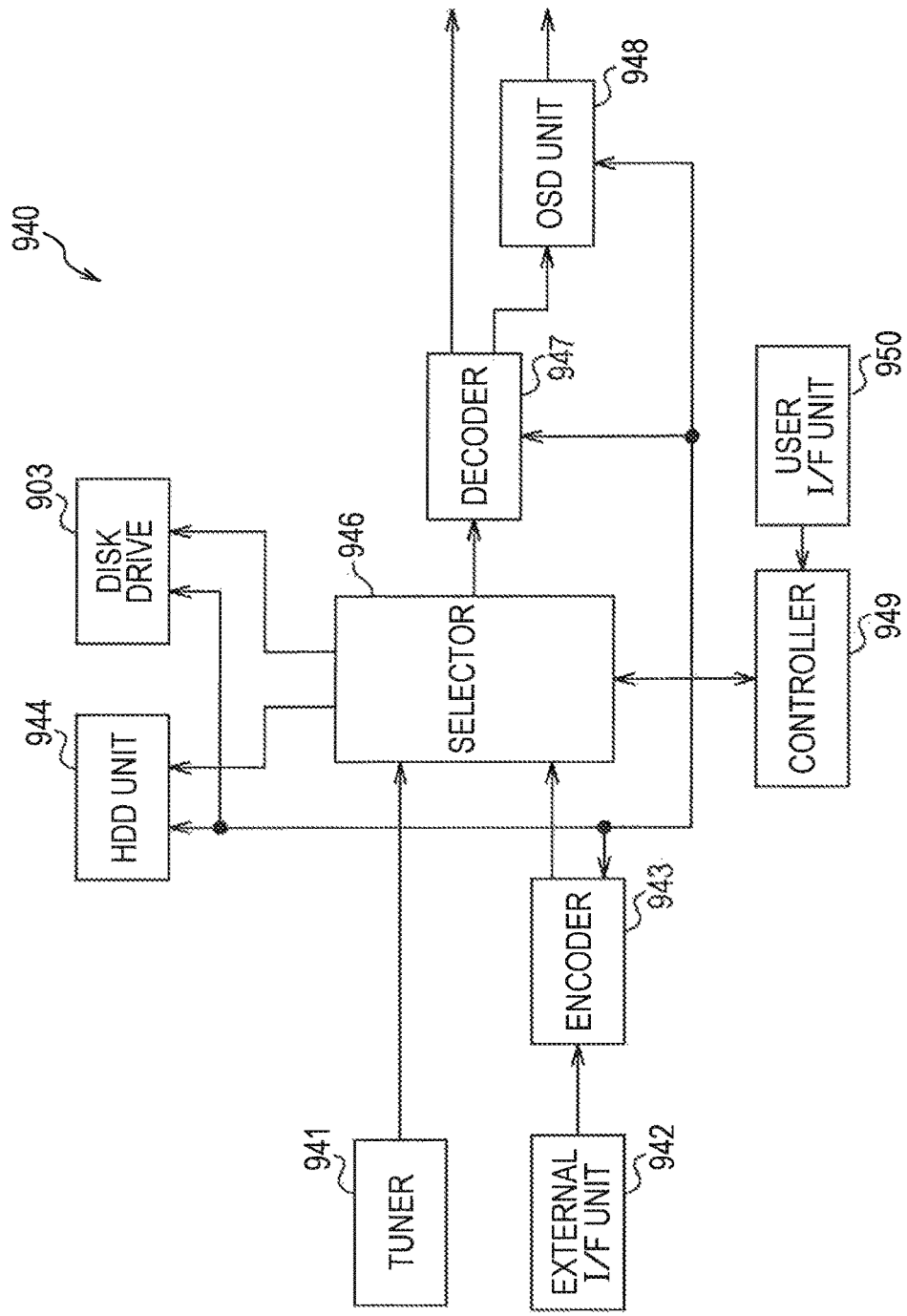
FIG. 33 is a block diagram showing one example of a schematic structure of a recording/reproducing device.
Figure 34:
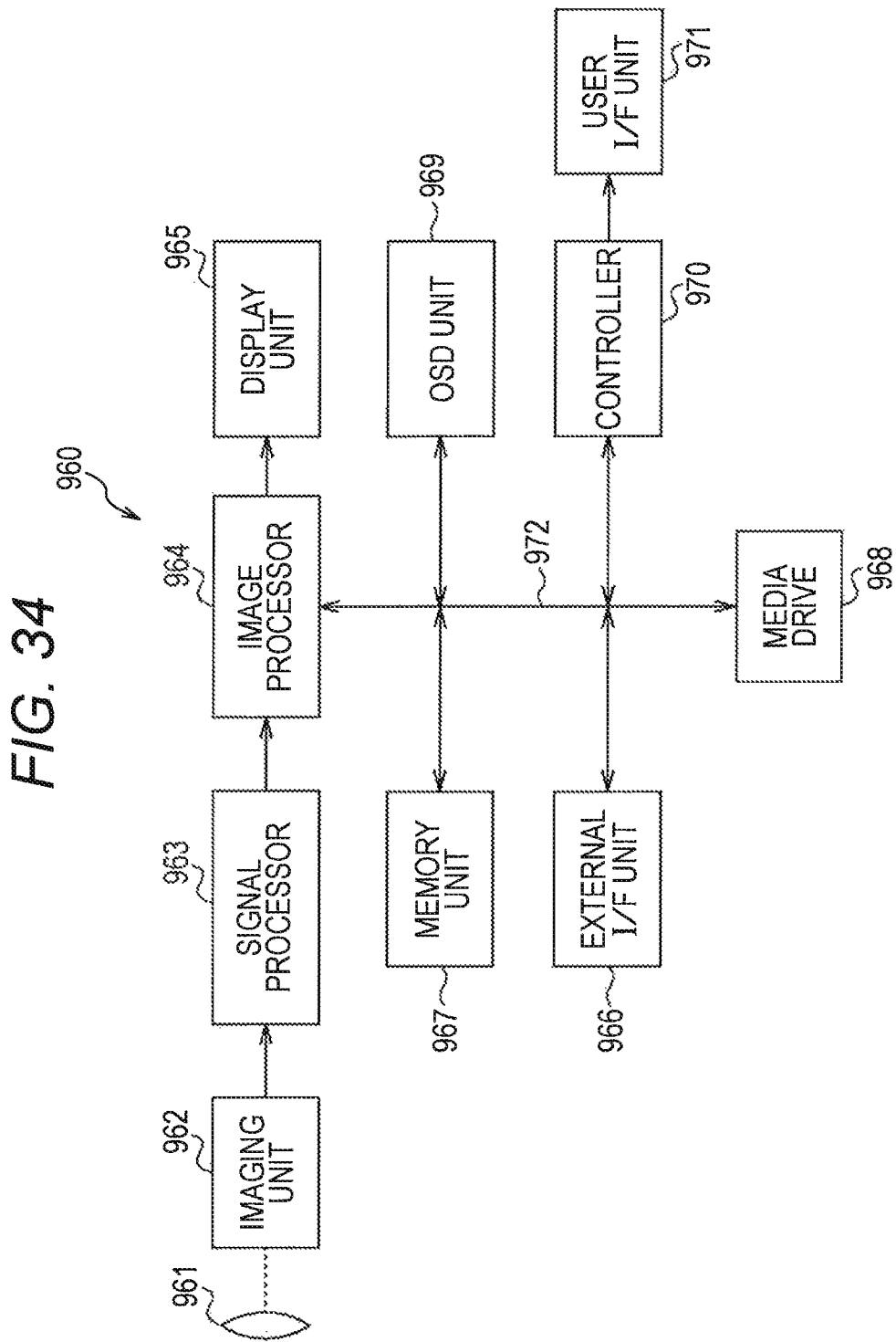
FIG. 34 is a block diagram showing one example of a schematic structure of an imaging device.

In FIG. 30, the CPU (Central Processing Unit) 801 of a computer 800 performs various kinds of operations in accordance with a program stored in a ROM (Read Only Memory) 802, or a program loaded from a storage unit 813 into a RAM (Random Access Memory) 803. The RAM 803 also stores data necessary for the CPU 801 to perform various processes and the like as necessary.

The CPU 801, the ROM 802, and the RAM 803 are connected to one another via a bus 804. An input/output interface 810 is also connected to the bus 804.

The input/output interface 810 has the following components connected thereto: an input unit 811 including a keyboard, a mouse, or the like; an output unit 812 including a display such as a CRT (cathode ray tube) or a LCD (liquid crystal display), and a speaker; the storage unit 813 including a hard disk or the like; and a communication unit 814 including a modem or the like. The communication unit 814 performs communications via networks including the Internet.

A drive 815 is also connected to the input/output interface 810 where necessary, a removable medium 821 such as a magnetic disk, an optical disk, a magneto-optical disk, or a semiconductor memory is mounted on the drive as appropriate, and a computer program read from such a removable disk is installed in the storage unit 813 where necessary.

When the above described series of processes is performed by software, the programs constituting the software are installed from a network or a recording medium.

As shown in FIG. 30, examples of the recording medium include the removable medium 821 that is distributed for delivering programs to users separately from the device, such as a magnetic disk (including a flexible disk), an optical disk (including a CD-ROM (compact disc-read only memory) or a DVD (digital versatile disc)), a magneto-optical disk (including an MD (mini disc)), and a semiconductor memory, which has programs recorded thereon, and alternatively, the ROM 802 having programs recorded therein and a hard disk included in the storage unit 813, which are incorporated beforehand into the device prior to delivery to users.

Programs to be executed by the computer may be programs for carrying out processes in chronological order in accordance with the sequence described in this specification, or programs for carrying out processes in parallel or at necessary timing such as in response to a call.

In this specification, steps describing programs to be recorded in a recording medium include processes to be performed in parallel or independently of one another if not necessarily in chronological order, as well as processes to be performed in chronological order in accordance with the sequence described herein.

In this specification, a system refers to the entirety of equipment including more than one device.

Furthermore, any structure described above as one device (or one processor) may be divided into two or more devices (or processors). Conversely, any structure described above as two or more devices (or processors) may be combined into one device (or processor).

Furthermore, it is of course possible to add components other than those described above to the structure of any of the devices (or processors). Furthermore, some components of a device (or processor) may be incorporated into the structure of another device (or processor) as long as the structure and the function of the system as a whole are substantially the same. That is, the present technique is not limited to the embodiments described above, but various modifications may be made thereto without departing from the scope of the technique.

The image encoding devices and the image decoding devices according to the embodiments described above can be applied to various electronic devices such as transmitters and receivers in satellite broadcasting, cable broadcasting such as cable TV, distribution via the Internet, distribution to terminals via cellular communication, or the like, recording devices configured to record images in media such as optical disks, magnetic disks and flash memory, and reproduction devices configured to reproduce images from the storage media. Four examples of applications will be described below.

<6. Sixth Embodiment>

[First Application: Television Receiver]

FIG. 25 shows an example of a schematic structure of a television apparatus to which the embodiments described above are applied. The television apparatus 900 includes an antenna 901, a tuner 902, a demultiplexer 903, a decoder 904, a video signal processor 905, a display unit 906, an audio signal processor 907, a speaker 908, an external interface 909, a controller 910, a user interface 911, and a bus 912.

The tuner 902 extracts a signal of a desired channel from broadcast signals received via the antenna 901, and demodulates the extracted signal. The tuner 902 then outputs an encoded bit stream obtained by the demodulation to the demultiplexer 903. That is, the tuner 902 serves as transmitting means in the television apparatus 900 that receives an encoded stream of encoded images.

The demultiplexer 903 separates a video stream and an audio stream of a program to be viewed from the encoded bit stream, and outputs the separated streams to the decoder 904. In addition, the demultiplexer 903 extracts auxiliary data, such as EPG (Electronic Program Guide), from the encoded bit stream, and supplies the extracted data to the controller 910. If the encoded bit stream is scrambled, the demultiplexer 903 may descramble the encoded bit stream.

The decoder 904 decodes the video stream and the audio stream input from the demultiplexer 903. The decoder 904 then outputs video data generated by the decoding to the video signal processor 905. The decoder 904 also outputs audio data generated by the decoding to the audio signal processor 907.

The video signal processor 905 reproduces video data input from the decoder 904, and displays the video data on the display unit 906. The video signal processor 905 may also display an application screen supplied via the network on the display unit 906. Furthermore, the video signal processor 905 may perform additional processing such as noise removal on the video data depending on settings. In addition, the video signal processor 905 may generate, for example, a GUI (Graphical User Interface) image, such as a menu, a button, or a cursor, and may superimpose the generated image on the output image.

The display unit 906 is driven by a drive signal supplied from the video signal processor 905, and displays video or images on a video screen of a display device (such as a liquid crystal display, a plasma display, or an OELD (organic electroluminescence display).

The audio signal processor 907 performs reproduction processing such as D/A conversion and amplification on the audio data input from the decoder 904, and outputs audio through the speaker 908. Furthermore, the audio signal processor 907 may perform additional processing such as noise removal on the audio data.

The external interface 909 is an interface for connecting the television apparatus 900 with an external device or a network. For example, a video stream or an audio stream received via the external interface 909 may be decoded by the decoder 904. That is, the external interface 909 also serves as transmitting means in the television apparatus 900 that receives an encoded stream of encoded images.

The controller 910 includes a processor such as a CPU, and a memory such as a RAM and a ROM. The memory stores programs to be executed by the CPU, program data, EPG data, data acquired via the network, and the like. Programs stored in the memory are read and executed by the CPU when the television apparatus 900 is activated, for example. The CPU controls the operation of the television apparatus 900 according to operation signals input from the user interface 911, for example, by executing the programs.

The user interface 911 is connected with the controller 910. The user interface 911 includes buttons and switches for users to operate the television apparatus 900 and a receiving unit for receiving remote control signals, for example. The user interface 911 detects operation by a user via these components, generates an operation signal, and outputs the generated operation signal to the controller 910.

The bus 912 connects the tuner 902, the demultiplexer 903, the decoder 904, the video signal processor 905, the audio signal processor 907, the external interface 909, and the controller 910 to one another.

In the television apparatus 900 having such a structure, the decoder 904 has the functions of the image decoding devices according to the embodiments described above. Accordingly, when decoding an image in the television apparatus 900, it is possible to perform the process at high speed.

[Second Application: Portable Telephone Device]

FIG. 26 shows an example of a schematic structure of a portable telephone device to which the embodiments described above are applied. The portable telephone device 920 includes an antenna 921, a communication unit 922, an audio codec 923, a speaker 924, a microphone 925, a camera unit 926, an image processor 927, a multiplexing/separating unit 928, a recording/reproducing unit 929, a display unit 930, a controller 931, an operation unit 932, and a bus 933.

The antenna 921 is connected to the communication unit 922. The speaker 924 and the microphone 925 are connected to the audio codec 923. The operation unit 932 is connected to the controller 931. The bus 933 connects the communication unit 922, the audio codec 923, the camera unit 926, the image processor 927, the multiplexing/separating unit 928, the recording/reproducing unit 929, the display unit 930, and the controller 931 to one another.

The portable telephone device 920 performs operation such as transmission/reception of audio signals, transmission/reception of electronic mails and image data, capturing of images, recording of data, and the like in various operation modes including a voice call mode, a data communication mode, an imaging mode, and a video telephone mode.

In the voice call mode, an analog audio signal generated by the microphone 925 is supplied to the audio codec 923. The audio codec 923 converts the analog audio signal to audio data, performs A/D conversion on the converted audio data, and compresses the audio data. The audio codec 923 then outputs the audio data resulting from the compression to the communication unit 922. The communication unit 922 encodes and modulates the audio data to generate a signal to be transmitted. Then, the communication unit 922 transmits the generated transmission signal to a base station (not shown) through the antenna 921. The communication unit 922 also amplifies and performs frequency conversion on a radio signal received via the antenna 921 to obtain a received signal. The communication unit 922 then demodulates and decodes the received signal to generate audio data, and outputs the generated audio data to the audio codec 923. The audio codec 923 decompresses and performs D/A conversion on the audio data to generate an analog audio signal. The audio codec 923 then supplies the generated audio signal to the speaker 924 to output audio therefrom.

In the data communication mode, the controller 931 generates text data to be included in an electronic mail according to operation by a user via the operation unit 932, for example. The controller 931 also displays the text on the display unit 930. The controller 931 also generates electronic mail data in response to an instruction for transmission from a user via the operation unit 932, and outputs the generated electronic mail data to the communication unit 922. The communication unit 922 encodes and modulates the electronic mail data to generate a signal to be transmitted. Then, the communication unit 922 transmits the generated transmission signal to a base station (not shown) through the antenna 921. The communication unit 922 also amplifies and performs frequency conversion on a radio signal received via the antenna 921 to obtain a received signal. The communication unit 922 then demodulates and decodes the received signal to restore electronic mail data, and outputs the restored electronic mail data to the controller 931. The controller 931 displays the content of the electronic mail on the display unit 930 and stores the electronic mail data into a storage medium of the recording/reproducing unit 929.

The recording/reproducing unit 929 includes a readable/writable storage medium. For example, the storage medium may be a built-in storage medium such as a RAM or a flash memory, or may be an external storage medium such as a hard disk, a magnetic disk, a magneto-optical disk, an optical disk, a USB (Unallocated Space Bitmap) memory, or a memory card.

In the imaging mode, the camera unit 926 images a subject to generate image data, and outputs the generated image data to the image processor 927, for example. The image processor 927 encodes the image data input from the camera unit 926, and stores an encoded stream in the storage medium of the storage/reproducing unit 929.

In the video telephone mode, the multiplexing/separating unit 928 multiplexes a video stream encoded by the image processor 927 and an audio stream input from the audio codec 923, and outputs the multiplexed stream to the communication unit 922, for example. The communication unit 922 encodes and modulates the stream to generate a signal to be transmitted. Then, the communication unit 922 transmits the generated transmission signal to a base station (not shown) through the antenna 921. The communication unit 922 also amplifies and performs frequency conversion on a radio signal received via the antenna 921 to obtain a received signal. The signal to be transmitted and the received signal may include encoded bit streams. The communication unit 922 then demodulates and decodes the received, signal to restore the stream and outputs the restored stream to the multiplexing/separating unit 928. The multiplexing/separating unit 928 separates a video stream and an audio stream from the input stream, and outputs the video stream to the image processor 927 and the audio stream to the audio codec 923. The image processor 927 decodes the video stream to generate video data. The video data is supplied to the display unit 930, and a series of images is displayed by the display unit 930. The audio codec 923 decompresses and performs D/A conversion on the audio stream to generate an analog audio signal. The audio codec 923 then supplies the generated audio signal to the speaker 924 to output audio therefrom.

In the portable telephone device 920 having such a structure, the image processor 927 has the functions of the image encoding devices and the image decoding devices according to the embodiments described above. Accordingly, when encoding and decoding an image in the portable telephone device 920, it is possible to perform the process at high speed.

[Third Application: Recording/Reproducing Device]

FIG. 27 shows an example of a schematic structure of a recording/reproducing device to which the embodiments described above are applied. The recording/reproducing device 940 encodes audio data and video data of a received broadcast program and records the encoded data into a recording medium, for example. The recording/reproducing device 940 may also encode audio data and video data acquired from another device and record the encoded data into a recording medium, for example. The recording/reproducing device 940 also reproduces data recorded in the recording medium on a monitor and through a speaker in response to an instruction from a user, for example. In this case, the recording/reproducing device 940 decodes audio data and video data.

The recording/reproducing device 940 includes a tuner 941, an external interface 942, an encoder 943, an HDD (hard disk drive) 944, a disk drive 945, a selector 946, a decoder 947, an OSD (on-screen display) 948, a controller 949, and a user interface 950.

The tuner 941 extracts a signal of a desired channel from broadcast signals received via an antenna (not shown), and demodulates the extracted signal. The tuner 941 then outputs an encoded bit stream obtained by the demodulation to the selector 946. That is, the tuner 941 has a role as transmission means in the recording/reproducing device 940.

The external interface 942 is an interface for connecting the recording/reproducing device 940 with an external device or a network. The external interface 942 may be an IEEE 1394 interface, a network interface, a USE interface, or a flash memory interface, for example. For example, video data and audio data received via the external interface 942 are input to the encoder 943. That is, the external interface 942 has a role as transmission means in the recording/reproducing device 940.

The encoder 943 encodes the video data and the audio data if the video data and the audio data input from the external interface 942 are not encoded. The encoder 943 then outputs the encoded bit stream to the selector 946.

The HDD 944 records an encoded bit stream of compressed content data such as video and audio, various programs and other data in an internal hard disk. The HDD 944 also reads out the data from the hard disk for reproduction of video and audio.

The disk drive 945 records and reads out data into/from a recording medium mounted thereon. The recording medium mounted on the disk drive 945 may be a DVD disk (DVD-Video, DVD-RAM, DVD-R, DVD-RW, DVD+R, DVD+RW, and the like) or a Blu-ray (registered trademark) disk, for example.

For recording video and audio, the selector 946 selects an encoded bit stream input from the tuner 941 or the encoder 943 and outputs the selected encoded bit stream to the HDD 944 or the disk drive 945. For reproducing video and audio, the selector 946 selects an encoded bit stream input from the HDD 944 or the disk drive 945 to the decoder 947.

The decoder 947 decodes the encoded bit stream to generate video data and audio data. The decoder 947 then outputs the generated video data to the OSD 948. The decoder 904 also outputs the generated audio data to an external speaker.

The OSD 948 reproduces the video data input from the decoder 947 and displays the video. The OSD 948 may also superimpose a GUI image such as a menu, a button or a cursor on the video to be displayed.

The controller 949 includes a processor such as a CPU, and a memory such as a RAM and a ROM. The memory stores programs to be executed by the CPU, program data, and the like. Programs stored in the memory are read and executed by the CPU when the recording/reproducing device 940 is activated, for example. The CPU controls the operation of the recording/reproducing device 940 according to operation signals input from the user interface 950, for example, by executing the programs.

The user interface 950 is connected with the controller 949. The user interface 950 includes buttons and switches for users to operate the recording/reproducing device 940 and a receiving unit for receiving remote control signals, for example. The user interface 950 detects operation by a user via these components, generates an operation signal, and outputs the generated operation signal to the controller 949.

In the recording/reproducing device 940 having such a structure, the encoder 943 has the functions of the image encoding devices according to the embodiments described above. Furthermore, the decoder 947 has the functions of the image decoding devices according to the embodiments described above. Accordingly, when encoding and decoding an image in the recording/reproducing device 940, it is possible to perform the process at high speed.

[Fourth Application: Imaging Device]

FIG. 28 shows one example of a schematic structure of an imaging device to which the embodiments described above are applied. The imaging device 960 images a subject to generate an image, encodes the image data, and records the encoded image data in a recording medium.

The imaging device 960 includes an optical block 961, an imaging unit 962, a signal processor 963, an image processor 964, a display unit 965, an external interface 966, a memory 967, a media drive 968, an OSD 969, a controller 970, a user interface 971, and a bus 972.

The optical block 961 is connected to the imaging unit 962. The imaging unit 962 is connected to the signal processor 963. The display unit 965 is connected to the image processor 964. The user interface 971 is connected to the controller 970. The bus 972 connects the image processor 964, the external interface 966, the memory 967, the media drive 968, the OSD 969, and the controller 970 to one another.

The optical block 961 includes a focus lens, a diaphragm, and the like. The optical block 961 forms an optical image of a subject on the imaging surface of the imaging unit 962. The imaging unit 962 includes an image sensor, such as a CCD (Charge Coupled Device) or a CMOS (Complementary Metal Oxide Semiconductor), and converts an optical image, which is formed on the imaging surface, into an image signal as an electrical signal by photoelectric conversion. The imaging unit 962 then outputs the image signal to the signal processor 963.

The signal processor 963 performs various kinds of camera signal processing such as knee correction, gamma correction, and color correction on the image signal input from the imaging unit 962. The signal processor 963 outputs image data subjected to the camera signal processing to the image processor 964.

The image processor 964 encodes the image data input from the signal processor 963 to generate encoded data. The image processor 964 then outputs the generated encoded data to the external interface 966 or the media drive 968. The image processor 964 also decodes encoded data input from the external interface 966 or the media drive 968 to generate image data. The image processor 964 then outputs the generated image data to the display unit 965. The image processor 964 may output image data input from the signal processor 963 to the display unit 965 to display images. The image processor 964 may also superimpose data for display acquired from the OSD 969 on the images to be output to the display unit 965.

The OSD 969 may generate a GUI image such as a menu, a button or a cursor and output the generated image to the image processor 964, for example.

The external interface 966 is a USB input/output terminal, for example. The external interface 966 connects the imaging device 960 and a printer for printing of an image, for example. In addition, a drive is connected to the external interface 966 as necessary. A removable medium such as a magnetic disk or an optical disk is mounted to the drive, for example, and a program read out from the removable medium can be installed in the imaging device 960. Furthermore, the external interface 966 may be a network interface connected to a network such as a LAN or the Internet. That is, the external interface 966 has a role as transmission means in the imaging device 960.

The recording medium to be mounted on the media drive 968 may be a readable/writable removable medium such as a magnetic disk, a magneto-optical disk, an optical disk or a semiconductor memory. In addition, a recording medium may be fixedly mounted on the media drive 968 in order to form a non-portable storage unit, such as a built-in hard disk drive or an SSD (Solid State Drive).

The controller 970 includes a processor such as a CPU, and a memory such as a RAM and a ROM. The memory stores programs to be executed by the CPU, program data, and the like. Programs stored in the memory are read and executed by the CPU when the imaging device 960 is activated, for example. The CPU controls the operation of the imaging device 960 according to operation signals input from the user interface 971, for example, by executing the programs.

The user interface 971 is connected with the controller 970. The user interface 971 includes buttons and switches for users to operate the imaging device 960, for example. The user interface 971 detects operation by a user via these components, generates an operation signal, and outputs the generated operation signal to the controller 970.

In the imaging device 960 having such a structure, the image processor 964 has the functions of the image encoding devices and the image decoding devices according to the embodiments described above. Accordingly, when encoding and decoding an image in the imaging device 960, it is possible to perform the process at high speed.

In this specification, examples in which various information pieces such as difference quantized parameters are multiplexed with the encoded stream and transmitted from the encoding side to the decoding side have been described. Each parameter is an adaptive loop filter, an adaptive offset filter, an arithmetic coding parameter of the quantization matrix, an encoding parameter to perform variable length (fixed length) coding (decoding), or an initialization (encoding) parameter required for the initialization of the CABAC, for example. The method in which the information pieces are transmitted, however, is not limited to these examples. For example, the information pieces may be transmitted or recorded as separate data associated with the encoded bit stream without being multiplexed with the encoded bit stream. Note that the term "associate" means to allow images (which may be part of images such as slices or blocks) contained in a bit stream to be linked with information on the images in decoding. That is, information may be transmitted on the separate transmission path from an image (or a bit stream). Alternatively, the information may be recorded in a recording medium other than that for the images (or bit stream) (or on a different area of the same recording medium). Furthermore, the information and the images (or bit stream) may be associated with each other in any units such as in units of some frames, one frame or part of a frame.

While preferred embodiments of the present disclosure have been described above with reference to the accompanying drawings, the present disclosure is not limited to these examples. It is apparent that a person ordinary skilled in the art to which the present disclosure belongs can conceive various variations and modifications within the technical idea described in the claims, and it is naturally appreciated that these variations and modification belongs within the technical scope of the present disclosure.

The present technique can also have the following structures.

(1) An image processing device, including:

a receiving unit that receives an encoded stream, in which arithmetic coding parameters subjected to an arithmetic coding process are arranged together in syntax of an encoded stream obtained by encoding image data in a unit having a hierarchical structure, and the arithmetic coding parameters; and a decoder that performs an arithmetic decoding process on the arithmetic coding parameters received by the receiving unit and decodes the encoded stream received by the receiving unit using the arithmetic coding parameters subjected to the arithmetic decoding process.

(2) The image processing device according to (1),
wherein encoding parameters subjected to a variable length coding process or a fixed length coding process are arranged together in the syntax of the encoded stream,
the receiving unit receives the encoding parameters from the encoded stream, and
the decoder decodes the encoding parameters received by the receiving unit and decodes the encoded stream using the decoded encoding parameters.

(3) The image processing device according to (2),
wherein the arithmetic coding parameters are arranged after the encoding parameters in the syntax of the encoded stream.

(4) The image processing device according to any of (1) to (3),
wherein initialization parameters used when initializing the arithmetic coding process or the arithmetic decoding process are arranged together in the syntax of the encoded stream,
the receiving unit receives the initialization parameters from the encoded stream, and
a controller, which performs control to initialize the arithmetic decoding process with reference to the initialization parameters received by the receiving unit, is further provided.

(5) The image processing device according to any of (1) to (4),
wherein the arithmetic coding parameters are parameters to control an encoding process or a decoding process at the picture level or a slice level.

(6) The image processing device according to any of (1) to (5),
wherein the arithmetic coding parameters are parameters of a filter used when performing the encoding process or the decoding process.

(7) The image processing device according to (6),
wherein a parameter of the adaptive loop filter and a parameter of the adaptive offset filter are arranged together at a top of slice data of the encoded stream, and
the receiving unit receives the parameter of the adaptive loop filter and the parameter of the adaptive offset filter from the top of the slice data of the encoded stream.

(8) The image processing device according to (6),
wherein a parameter of the adaptive loop filter and a parameter of the adaptive offset filter are arranged together at an end of a slice header of the encoded stream, and
the receiving unit receives the parameter of the adaptive loop filter and the parameter of the adaptive offset filter from the end of the slice data of the encoded stream.

(9) The image processing device according to (4),
wherein the initialization parameters are arranged near a top of a slice header of the encoded stream, and
the receiving unit receives the initialization parameters from the vicinity of the top of the slice header of the encoded stream.

(10) An image processing method, including:
causing an image processing device to receive an encoded stream, in which arithmetic coding parameters subjected to an arithmetic coding process are arranged together in syntax of an encoded stream obtained by encoding image data in a unit having a hierarchical structure, and the arithmetic coding parameters; and
causing the image processing device to perform an arithmetic decoding process on the received arithmetic coding parameters and decode the received encoded stream using the arithmetic coding parameters subjected to the arithmetic decoding process.

(11) An image processing device, including:
an encoder that encodes image data in a unit having a hierarchical structure to generate an encoded stream;
an arrangement unit that arranges arithmetic coding parameters, which are subjected to an arithmetic coding process, together in syntax of the encoded stream generated by the encoder; and
a transmission unit that transmits the encoded stream generated by the encoder and the arithmetic coding parameters arranged by the arrangement unit.

(12) The image processing device according to (11),
wherein the arrangement unit arranges encoding parameters, which are subjected to a variable length coding process or a fixed length coding process, together, and
the transmission unit transmits the encoding parameters arranged by the arrangement unit.

(13) The image processing device according to (12),
wherein the arrangement unit arranges the arithmetic coding parameters after the encoding parameters.

(14) The image processing device according to (13),
wherein the arrangement unit arranges initialization parameters, which are used when initializing an arithmetic coding process or an arithmetic decoding process, together, and
the transmission unit transmits the initialization parameters arranged by the arrangement unit.

(15) The image processing device according to any of (11) to (14),
wherein the arithmetic coding parameters are parameters to control an encoding process or a decoding process at the picture level or a slice level.

(16) The image processing device according to any of (11) to (15),
wherein the arithmetic coding parameters are parameters of a filter used when performing the encoding process or the decoding process.

(17) The image processing device according to (16),
wherein the arrangement unit arranges a parameter of the adaptive loop filter and a parameter of the adaptive offset filter together at a top of slice data of the encoded stream, and
the transmission unit transmits the parameter of the adaptive loop filter and the parameter of the adaptive offset filter arranged by the arrangement unit.

(18) The image processing device according to (16),
wherein the arrangement unit arranges a parameter of the adaptive loop filter and a parameter of the adaptive offset filter together at an end of a slice header of the encoded stream, and
the transmission unit transmits the parameter of the adaptive loop filter and the parameter of the adaptive offset filter arranged by the arrangement unit.

(19) The image processing device according to (14),
wherein the arrangement unit arranges the initialization parameters near a top of a slice header of the encoded stream.

(20) An image processing method, including:
causing an image processing device to generate an encoded stream by encoding image data in a unit having a hierarchical structure;
causing the image processing device to arrange arithmetic coding parameters, which are subjected to an arithmetic coding process, together in syntax of the generated encoded stream; and
causing the image processing device to transmit the generated encoded stream and the arranged arithmetic coding parameters.

REFERENCE SIGNS LIST 100 image encoding device, 105 quantizer, 106 lossless encoder, 114 intra prediction unit, 115 motion estimator/compensator, 121 adaptive offset unit, 122 adaptive loop filter, 131 VLC encoder, 132 encoding controller, 133 setting unit, 134 CABAC encoder, 141 firmware, 142 hardware, 200 image decoding device, 202 lossless decoder, 203 inverse quantizer, 211 intra prediction unit, 212 motion estimator/compensator, 221 adaptive offset unit, 222 adaptive loop filter, 231 VLC decoder, 232 decoding controller, 233 acquisition unit, 234 CABAC decoder, 241 firmware, 242 hardware

The invention claimed is:

1. An image processing device, comprising:
circuitry configured to:
parse initialization parameters that are used when initializing an arithmetic decoding process and are arranged together in the syntax of an encoded stream;
perform a variable length coding process on the initialization parameters;
perform the arithmetic decoding process on the encoded stream;
perform control to initialize the arithmetic decoding process with reference to the parsed initialization parameters;
parse arithmetic coding parameters that are used in an arithmetic coding process and are arranged together in the syntax of the encoding stream; and
perform a filter process using the parsed arithmetic coding parameters,
wherein the initialization parameters are arranged together at a top of a slice header of the encoded stream, and
wherein the arithmetic coding parameters are arranged together at an end of the slice header of the encoded stream.

2. The image processing device according to claim 1,
wherein the arithmetic coding parameters comprise parameters of an adaptive offset filter,
wherein the parameters of the adaptive offset filter are arranged together at the end of the slice header of the encoded stream, and
wherein the circuitry is further configured to perform parsing of the parameters of the adaptive offset filter from the end of the slice header of the encoded stream.

3. The image processing device according to claim 1,
wherein the arithmetic coding parameters comprise parameters of an adaptive loop filter,
wherein the parameters of the adaptive loop filter are arranged together at the end of the slice header of the encoded stream, and
wherein the parsing unit is further configured to perform parsing of the parameters of the adaptive loop filter from the end of the slice header of the encoded stream.

4. The image processing device according to claim 1,
wherein the filter process comprises at least one of an adaptive offset filter process and an adaptive loop filter process.

5. An image processing method, executed via at least one processor, the method comprising:
parsing initialization parameters that are used when initializing an arithmetic decoding process and are arranged together in the syntax of an encoded stream;
performing a variable length coding process on the initialization parameters;
performing the arithmetic decoding process on the encoded stream;
controlling initialization of the arithmetic decoding process with reference to the parsed initialization parameters;
parsing arithmetic coding parameters that are used in an arithmetic coding process and are arranged together in the syntax of the encoding stream; and
performing a filter process using the parsed arithmetic coding parameters,
wherein the initialization parameters are arranged together at a top of a slice header of the encoded stream, and
wherein the arithmetic coding parameters are arranged together at an end of the slice header of the encoded stream.

6. The image processing method according to claim 5,
wherein the filter process comprises at least one of an adaptive offset filter process and an adaptive loop filter process.

* * * * *